(12) United States Patent
Jeong et al.

(10) Patent No.: US 12,225,208 B2
(45) Date of Patent: Feb. 11, 2025

(54) ENCODING METHOD AND DEVICE THEREOF, AND DECODING METHOD AND DEVICE THEREOF

(71) Applicant: SAMSUNG ELECTRONICS CO., LTD., Suwon-si (KR)

(72) Inventors: Seung-soo Jeong, Seoul (KR); Minwoo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/461,271

(22) Filed: Sep. 5, 2023

(65) Prior Publication Data
US 2023/0412819 A1     Dec. 21, 2023

Related U.S. Application Data

(63) Continuation of application No. 18/165,126, filed on Feb. 6, 2023, now Pat. No. 11,825,100, which is a
(Continued)

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/176* (2014.11); *H04N 19/184* (2014.11); *H04N 19/521* (2014.11)

(58) Field of Classification Search
CPC .. H04N 19/159; H04N 19/105; H04N 19/176; H04N 19/184; H04N 19/521;
(Continued)

(56) References Cited

U.S. PATENT DOCUMENTS 9,282,332 B2   1/2016 Koyama et al.
9,648,329 B2   5/2017 Lim et al.
(Continued)

FOREIGN PATENT DOCUMENTS

CN   101506845 A   8/2009
CN   103037184 A   4/2013
(Continued)

OTHER PUBLICATIONS

Akula, Sri Nitchith, "Description of SDR, HDR and 360 video coding technology proposal considering mobile application scenario by Samsung, Huawei, GoPro, and HiSilicon", Joint Video Exploration Team (JVET) of ITU-T SG 16 WP 3 and ISO/IEC JTC 1/SC 29/VG 11, 10th Meeting: San Diego, Apr. 10-20, 2018, Document: JVET-J0024 V2, XP030248222. (124 pages total).
(Continued)

*Primary Examiner* — Boubacar Abdou Tchoussou
(74) *Attorney, Agent, or Firm* — Sughrue Mion, PLLC

(57) ABSTRACT

A video decoding method includes determining whether an ultimate motion vector expression (UMVE) mode is allowed for an upper data unit including a current block, when the UMVE mode is allowed for the upper data unit, determining whether the UMVE mode is applied to the current block, when the UMVE mode is applied to the current block, determining a base motion vector of the current block, determining a correction distance and a correction direction for correction of the base motion vector, determining a motion vector of the current block by correcting the base motion vector according to the correction distance and the correction direction, and reconstructing the current block based on the motion vector of the current block.

3 Claims, 27 Drawing Sheets

Related U.S. Application Data continuation of application No. 17/402,084, filed on Aug. 13, 2021, now Pat. No. 11,611,762, which is a continuation of application No. 16/983,242, filed on Aug. 3, 2020, now Pat. No. 11,095,903, which is a continuation of application No. PCT/KR2018/007973, filed on Jul. 13, 2018.

(60) Provisional application No. 62/636,459, filed on Feb. 28, 2018.

(51) Int. Cl.
  *H04N 19/176* (2014.01)
  *H04N 19/184* (2014.01)
  *H04N 19/513* (2014.01)

(58) Field of Classification Search
  CPC ...... H04N 19/70; H04N 19/52; H04N 19/573; H04N 19/103; H04N 19/109; H04N 19/139; H04N 19/513
  See application file for complete search history.

(56) References Cited

U.S. PATENT DOCUMENTS

| | | | |
|---|---|---|---|
| 9,888,260 | B2 | 2/2018 | Kosaka |
| 9,900,596 | B2 | 2/2018 | Takehara et al. |
| 10,992,951 | B2 | 4/2021 | Jeong et al. |
| 2008/0043845 | A1 | 2/2008 | Nakaishi |
| 2008/0170618 | A1 | 7/2008 | Choi et al. |
| 2011/0200229 | A1 | 8/2011 | Tuzel et al. |
| 2011/0243233 | A1 | 10/2011 | Alshina et al. |
| 2012/0128071 | A1 | 5/2012 | Celetto et al. |
| 2013/0083167 | A1 | 4/2013 | Miyauchi |
| 2013/0093926 | A1 | 4/2013 | Nakanishi |
| 2013/0128976 | A1 | 5/2013 | Koyama et al. |
| 2014/0016704 | A1 | 1/2014 | Lin et al. |
| 2014/0044181 | A1 | 2/2014 | Siast et al. |
| 2014/0146876 | A1 | 5/2014 | Takehara et al. |
| 2014/0161185 | A1 | 6/2014 | Takeda |
| 2014/0211851 | A1 | 7/2014 | Miyoshi |
| 2014/0247874 | A1 | 9/2014 | Sato |
| 2014/0254686 | A1 | 9/2014 | Lim et al. |
| 2015/0055706 | A1 | 2/2015 | Xu et al. |
| 2016/0286228 | A1 | 9/2016 | Sung et al. |
| 2016/0381383 | A1 | 12/2016 | Oh et al. |
| 2017/0085906 | A1 | 3/2017 | Chen et al. |
| 2017/0339425 | A1 | 11/2017 | Jeong et al. |
| 2019/0208223 | A1 | 7/2019 | Galpin et al. |
| 2019/0342557 | A1* | 11/2019 | Robert .................. H04N 19/52 |
| 2019/0342572 | A1 | 11/2019 | Xu et al. |
| 2019/0349600 | A1 | 11/2019 | Sasai et al. |
| 2020/0084441 | A1 | 3/2020 | Lee et al. |
| 2020/0169746 | A1 | 5/2020 | Jeong et al. |
| 2020/0177884 | A1 | 6/2020 | Sasai et al. |
| 2020/0228797 | A1 | 7/2020 | Park et al. |
| 2020/0267408 | A1 | 8/2020 | Lee |
| 2020/0275117 | A1 | 8/2020 | Jeong et al. |
| 2023/0081809 | A1 | 3/2023 | Lee et al. |

FOREIGN PATENT DOCUMENTS

| | | |
|---|---|---|
| CN | 103843344 A | 6/2014 |
| CN | 103873865 A | 6/2014 |
| CN | 105791855 A | 7/2016 |
| CN | 106851304 A | 6/2017 |
| CN | 107027038 A | 8/2017 |
| CN | 107113440 A | 8/2017 |
| CN | 107645663 A | 1/2018 |
| EP | 2061007 A1 | 5/2009 |
| EP | 3 203 743 A1 | 8/2017 |
| JP | 2009-182657 A | 8/2009 |
| JP | 2009-251883 A | 10/2009 |
| JP | 2010-200147 A | 9/2010 |
| JP | 2013-16934 A | 1/2013 |
| JP | 2013-89989 A | 5/2013 |
| JP | 2013-102273 A | 5/2013 |
| JP | 2014-27448 A | 2/2014 |
| JP | 2015-76781 A | 4/2015 |
| JP | 2015-100065 A | 5/2015 |
| JP | 2016-158258 A | 9/2016 |
| JP | 2017-537529 A | 12/2017 |
| KR | 10-2008-0066522 A | 7/2008 |
| KR | 10-2014-0032930 A | 3/2014 |
| KR | 10-2016-0111293 A | 9/2016 |
| KR | 10-2017-0078672 A | 7/2017 |
| KR | 10-2017-0078673 A | 7/2017 |
| KR | 10-2017-0140196 A | 12/2017 |
| WO | 2013/040394 A1 | 3/2013 |
| WO | 2013/077659 A1 | 5/2013 |
| WO | 2014/077573 A2 | 5/2014 |
| WO | 2017/039117 A1 | 3/2017 |

OTHER PUBLICATIONS

Chen, Jianle et al., "Algorithm Description of Joint Exploration Test Model 2 (JEM2)", International Organisation for Standardisation, Coding of Moving Pictures and Audio, ISO/IEC JTC 1/SC 29/WG 11, N16066, Feb. 2016, San Diego, CA, US, XP030022739. (33 pages total).
Communication dated Apr. 23, 2021, issued by the State Intellectual Property Office of P.R. China in counterpart Chinese Application No. 201880090461.9.
Communication dated Aug. 29, 2022 issued by the Intellectual Property Office of India in IN Patent Application No. 202047038961.
Communication issued Dec. 21, 2022 by the Korean Patent Office for Korean Patent Application No. 10-2022-7003781.
Communication issued Dec. 8, 2022 by the National Intellectual Property Administration for the People's Republic of China for Chinese Patent Application No. 202210053129.3.
Communication issued Dec. 8, 2022 by the National Intellectual Property Administration for the People's Republic of China for Chinese Patent Application No. 202210053358.5.
Communication issued Dec. 8, 2022 by the National Intellectual Property Administration for the People's Republic of China for Chinese Patent Application No. 202210053418.3.
Communication issued Dec. 8, 2022 by the National Intellectual Property Administration for the People's Republic of China for Chinese Patent Application No. 202210053612.1.
Communication issued Sep. 7, 2021 by the Japanese Patent Office in Japanese Application No. 2020-543270.
Gao et al., "Research on Fast Decision of H.264 Inter Frame Based on Modification Motion Vector", 2010, Image Processing and Multimedia Technology, 4 pages total.
International Search Report (PCT/ISA/210), issued by International Searching Authority in corresponding International Application No. PCT/KR2018/007973, on Jan. 2, 2019.
Notice of Allowance dated Mar. 30, 2023, issued by Korean Patent Office in Korean Patent Application No. 10-2021-7005096.
Notice of Allowance dated Mar. 30, 2023, issued by Korean Patent Office in Korean Patent Application No. 10-2022-7003781.
Notice of Allowance dated May 9, 2023, issued by Chinese Patent Office in Chinese Patent Application No. 202210053358.5.
Notice of Allowance dated May 9, 2023, issued by Chinese Patent Office in Chinese Patent Application No. 202210053612.1.
Office Action dated Apr. 25, 2023, issued by European Patent Office in European Patent Application No. 18907926.2.
Written Opinion (PCT/ISA/237) issued by the International Searching Authority in corresponding International Application No. PCT/KR2018/007973, on Jan. 2, 2019.
Communicated dated Sep. 22, 2022 by the Korean Intellectual Property Office in KR Patent Application No. 10-2022-7003781.
Communication issued Dec. 13, 2021 by the European Patent Office in counterpart European Patent Application No. 18907926.2.
Notice of Allowance dated Jan. 2, 2024, issued by Chinese Patent Office in Chinese Patent Application No. 202210053418.3.

(56) References Cited

OTHER PUBLICATIONS

Notice of Allowance dated Jan. 2, 2024, issued by Chinese Patent Office in Chinese Patent Application No. 202210053129.3.
Communication dated Apr. 23, 2024, issued by the National Intellectual Property Administration, PRC in Chinese Application No. 202210053631.4.
Communication dated Apr. 2, 2024, issued by the Japanese Patent Office in Japanese Application No. 2023-085992.

\* cited by examiner

FIG. 3
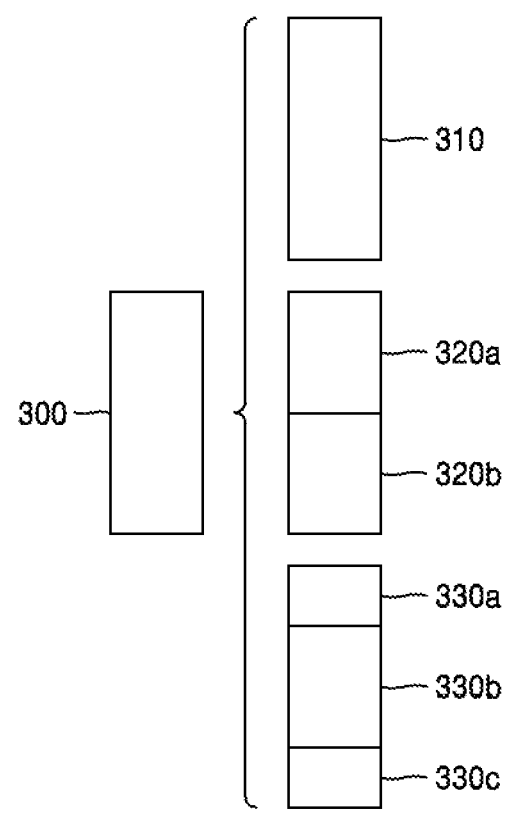
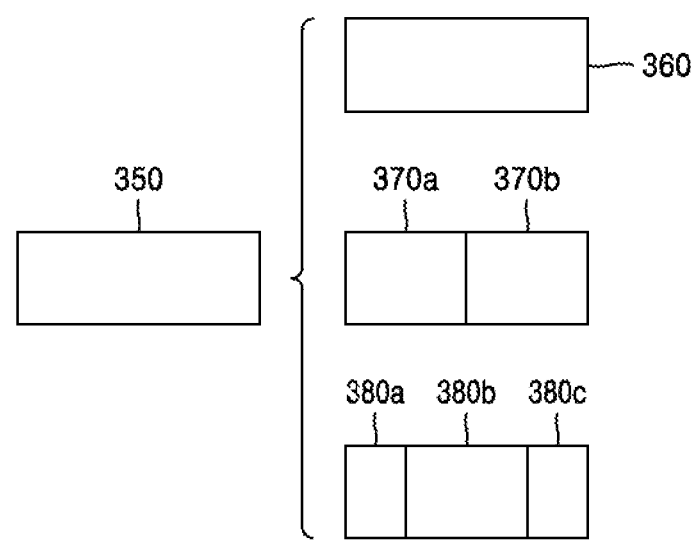

FIG. 12

| BLOCK SHAPE / DEPTH | 0: SQUARE | 1: NS_VER | 2: NS_HOR |
|---|---|---|---|
| DEPTH OF D | 1200 □ | □—1210 | 1220 □ |
| DEPTH OF D+1 | □—1202 | □—1212 | □—1222 |
| DEPTH OF D+2 | □—1204 | □—1214 | □—1224 |
| ... | ... | ... | ... |

- OBTAIN BASE MOTION VECTOR FROM UMVE CANDIDATES
- DETERMINE CORRECTION MOTION VECTOR ACCORDING TO CORRECTION DISTANCE AND CORRECTION DIRECTION
- DETERMINE MOTION VECTOR OF CURRENT BLOCK ACCORDING TO BASE MOTION VECTOR AND CORRECTION MOTION VECTOR

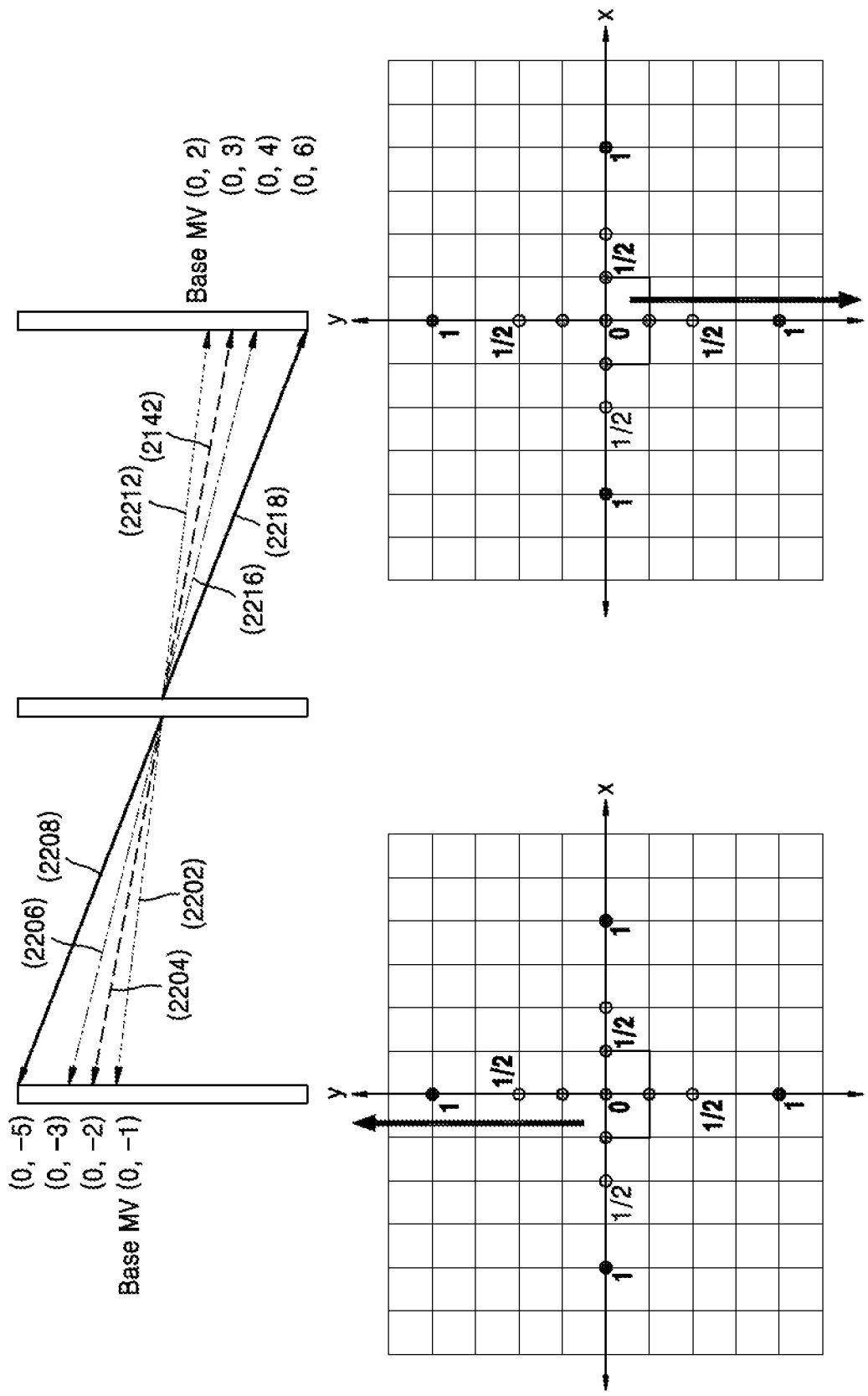

FIG. 23

| coding_unit( x0, y0, log2width, log2height ) { | Descriptor |
|---|---|
|   if( slice_type != I &&<br>    !(log2width <= LOG2_MIN_CU && log2height <= LOG2_MIN_CU) { | |
|     cu_skip_flag[ x0 ][ y0 ] | ae(v) |
|     if( cu_skip_flag[ x0 ][ y0 ] ) { | |
|       cu_skip_umve[ x0 ][ y0 ] | ae(v) |
|       if( cu_skip_umve[ x0 ][ y0 ] ) { | |
|         cu_mode = SKIP_UMVE | |
|         mvp_idx_umve( x0, y0, identical_list0_list1_flag ) | |
|       } | |
|       else if( log2width >= 3 && log2height >= 3 ) { | |
|         cu_skip_affine[ x0 ][ y0 ] | ae(v) |
|         if( cu_skip_affine[ x0 ][ y0 ] ) { | |
|           cu_mode = SKIP_AFFINE | |
|         } | |
|         else { | |
|           mvp_idx[ x0 ][ y0 ] | ae(v) |
|           cu_mode = SKIP | |
|         } | |
|       } | |
|       else { | |
|         mvp_idx[ x0 ][ y0 ] | ae(v) |
|         cu_mode = SKIP | |
|       } | |

FIG. 24

| | |
|---|---|
| if( cu_mode = = MODE_INTER ) { | |
|   if(slice_type = = P) { | |
|     if( pred_mvr_idx[ x0 ][ y0 ] = = 0 ) { | |
|       cu_direct[ x0 ][ y0 ] | ae(v) |
|     } | |
|     if( cu_direct[ x0 ][ y0 ] ) { | |
|       affine_dir[ x0 ][ y0 ] = 0 | |
|       if( log2width >= 3 && log2height >= 3) { | |
|         affine_dir[ x0 ][ y0 ] | ae(v) |
|         if(affine_dir[ x0 ][ y0 ]) { | |
|           affine_flag[ x0 ][ y0 ] = 1 | |
|           cu_mode = DIR_AFFINE | |
|         } | |
|       } | |
|       if( !affine_dir[ x0 ][ y0 ]) { | |
|         mvp_idx_umve( x0, y0, identical_list0_list1 flag ) | |
|         cu_mode = DIR_UMVE | |
|       } | |
|     } | |
|   } | |

FIG. 25

```
else { // slice_type == B
    if( pred_mvr_idx[ x0 ][ y0 ] == 0 ){
        cu_direct[ x0 ][ y0 ]                                              ae(v)
    }
    if( cu_direct[ x0 ][ y0 ] ) {
        cu_direct_umve[ x0 ][ y0 ]                                         ae(v)
        if( cu_direct_umve[ x0 ][ y0 ] ) {
            cu_mode = DIR_UMVE
            get_skip_cand( )
            mvp_idx_umve( x0, y0, identical_list0_list1_flag )
        }
        else {
            affine_dir[ x0 ][ y0 ] = 0
            if( log2width >= 3 && log2height >= 3 ) {
                affine_dir[ x0 ][ y0 ]                                     ae(v)
                if( affine_dir[ x0 ][ y0 ] ) {
                    cu_mode = DIR_AFFINE
                    affine_flag[ x0 ][ y0 ] = 1
                }
            }
            if( !affine_dir[ x0 ][ y0 ] ) {
                cu_mode = DIR
                get_skip_cand()
                mvp_idx_dir[ x0 ][ y0 ][ 0 ]                               ae(v)
                mvp_idx_dir[ x0 ][ y0 ][ 1 ] = mvp_idx_dir[ x0 ][ y0 ][ 0 ]
            }
        }
    }
}
```

ENCODING METHOD AND DEVICE THEREOF, AND DECODING METHOD AND DEVICE THEREOF

CROSS-REFERENCE TO RELATED APPLICATIONS

This is a Continuation application of U.S. application Ser. No. 18/165,126 filed Feb. 6, 2023, which is a Continuation application of U.S. application Ser. No. 17/402,084 filed Aug. 13, 2021, which is a Continuation application of U.S. patent application Ser. No. 16/983,242 filed Aug. 3, 2020, which is a Continuation of International Application No. PCT/KR2018/007973 filed on Jul. 13, 2018, which claims priority to Provisional U.S. Application 62/636,459 filed on Feb. 28, 2018, the disclosures of which are incorporated herein in their entireties by reference.

TECHNICAL FIELD

The present disclosure relates to a video encoding method and a video decoding method, and more particularly, to a method of efficiently encoding and decoding information about a motion vector.

BACKGROUND ART

A large amount of data is required when a high-quality video is encoded. However, because a bandwidth allowed to transmit video data is limited, a data rate applied to transmit the video data may be limited. Hence, in order to efficiently transmit video data, there is demand for video data encoding and decoding methods with minimal degradation of image quality and increased compression rates.

Video data may be compressed by removing spatial redundancy and temporal redundancy between pixels. Because adjacent pixels generally have common characteristics, encoding information is transmitted in a data unit consisting of pixels in order to remove redundancy between the adjacent pixels.

Pixel values of the pixels included in the data unit are not directly transmitted, but information about a method of obtaining the pixel values is transmitted. A prediction method of predicting a pixel value that is similar to an original value is determined for each data unit, and encoding information about the prediction method is transmitted from an encoder to a decoder. Because a predicted value is not completely the same as the original value, residual data of a difference between the original value and the predicted value is transmitted from the encoder to the decoder.

As the accuracy of prediction increases, encoding information required to specify a prediction method increases but a size of residual data decreases. Accordingly, a prediction method is determined in consideration of a size of residual data and encoding information. In particular, data units split from a picture have various sizes, and as a size of a data unit increases, the likelihood of the accuracy of prediction decreasing increases whereas encoding information decreases. Accordingly, a size of a block is determined in accordance with characteristics of the picture.

Also, prediction methods include intra prediction and inter prediction. Intra prediction is a method of predicting pixels of a block from neighboring pixels around the block. Inter prediction is a method of predicting pixels by referring to pixels of another picture referenced by a picture including the block. Accordingly, spatial redundancy is removed in intra prediction, and temporal redundancy is removed in inter prediction.

As the number of prediction methods increases, the amount of encoding information for indicating the prediction methods increases. Accordingly, when encoding information applied to a block is predicted from another block, a size of the encoding information may be reduced.

Because loss of video data is allowed to the extent that the human eye may not recognize the loss, the amount of residual data may be reduced by performing lossy compression on the residual data according to transformation and quantization processes.

DESCRIPTION OF EMBODIMENTS

Technical Problem

Provided are a video encoding method and a video encoding device which perform inter prediction according to an ultimate motion vector expression (UMVE) mode. Provided are a video decoding method and a video decoding device which perform inter prediction according to a UMVE mode. Also provided is a computer-readable recording medium having recorded thereon a program for executing a video encoding method and a video decoding method, according to an embodiment of the present disclosure, on a computer.

Solution to Problem

The present disclosure provides a video decoding method including determining whether an ultimate motion vector expression (UMVE) mode is allowed for an upper data unit including a current block, when the UMVE mode is allowed for the upper data unit, determining whether the UMVE mode is applied to the current block, when the UMVE mode is applied to the current block, determining a base motion vector of the current block, determining a correction distance and a correction direction for correction of the base motion vector, determining a motion vector of the current block by correcting the base motion vector according to the correction distance and the correction direction, and reconstructing the current block based on the motion vector of the current block.

The present disclosure provides a video decoding device including a processor configured to determine whether an ultimate motion vector expression (UMVE) mode is allowed for an upper data unit including a current block, when the UMVE mode is allowed for the upper data unit, determine whether the UMVE mode is applied to the current block, when the UMVE mode is applied to the current block, determine a base motion vector of the current block and determine a correction distance and a correction direction for correction of the base motion vector, determine a motion vector of the current block by correcting the base motion vector according to the correction distance and the correction direction, and reconstruct the current block based on the motion vector of the current block.

The present disclosure provides a video encoding method including determining whether an ultimate motion vector expression (UMVE) mode is allowed for an upper data unit including a current block, determining a motion vector of the current block, when the UMVE mode is allowed for the upper data unit, determining whether the UMVE mode is applied to the current block according to the motion vector, determining a base motion vector of the current block and a correction distance and a correction direction for correction of the base motion vector according to the motion vector, and outputting a bitstream including information about the UMVE mode of the current block.

The present disclosure provides A video encoding device including a processor configured to determine whether an ultimate motion vector expression (UMVE) mode is allowed for an upper data unit including a current block, determine a motion vector of the current block, when the UMVE mode is allowed for the upper data unit, determine whether the UMVE mode is applied to the current block according to the motion vector, determine a base motion vector of the current block and a correction distance and a correction direction for correction of the base motion vector according to the motion vector, and output a bitstream including encoding information according to the UMVE mode of the current block.

The present disclosure provides a computer-readable recording medium having recorded thereon a program for executing the video encoding method and the video decoding method.

The technical problems of the present embodiment are not limited to the aforementioned technical problems, and other unstated technical problems may be inferred from embodiments below.

Advantageous Effects of Disclosure

Because blocks included in an image are inter predicted according to an ultimate motion vector expression (UMVE) mode, a coding rate of the image may be improved.

BRIEF DESCRIPTION OF DRAWINGS

FIG. 3 illustrates a process of determining at least one coding unit by splitting a non-square coding unit, according to an embodiment.

FIG. 12 illustrates a process of determining a depth of a coding unit as a shape and a size of the coding unit change, when the coding unit is recursively split such that a plurality of coding units are determined, according to an embodiment.

FIG. 22 illustrates a method of correcting two base motion vectors according to bi-prediction, according to an embodiment.

FIG. 23 illustrates a method of selecting an inter mode tool of a current block in a skip mode.

FIG. 24 illustrates a method of selecting an inter mode tool of a current block in a direct mode, when a slice type of a current slice including the current block is P-type.

FIG. 25 illustrates a method of selecting an inter mode tool of a current block in a direct mode, when a slice type of a current slice including the current block is B-type.

BEST MODE

Figure 1A:
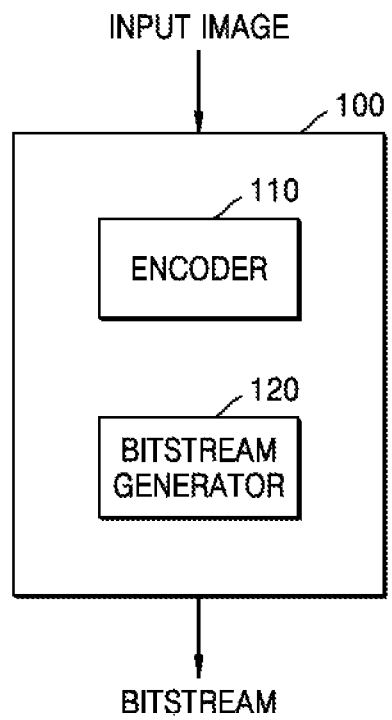
FIG. 1A is a block diagram of an image encoding device based on coding units having a tree structure, according to an embodiment of the present disclosure.

Provided is a video decoding method including determining whether an ultimate motion vector expression (UMVE) mode is allowed for an upper data unit including a current block, when the UMVE mode is allowed for the upper data unit, determining whether the UMVE mode is applied to the current block, when the UMVE mode is applied to the current block, determining a base motion vector of the current block, determining a correction distance and a correction direction for correction of the base motion vector, determining a motion vector of the current block by correcting the base motion vector according to the correction distance and the correction direction, and reconstructing the current block based on the motion vector of the current block.

Mode of Disclosure

The advantages and features of the present disclosure and methods of achieving the advantages and features will be described more fully with reference to the accompanying drawings, in which embodiments of the invention are shown. The present disclosure may, however, be embodied in many different forms and should not be construed as being limited to the embodiments set forth herein; rather these embodiments are provided so that this disclosure will be thorough and complete, and will fully convey the concept of the present disclosure to one of ordinary skill in the art.

The terms used herein will be briefly described, and disclosed embodiments will be described in detail.

The terms used herein are those general terms currently widely used in the art in consideration of functions in the present disclosure but the terms may vary according to the intention of one of ordinary skill in the art, precedents, or new technology in the art. Also, some of the terms used herein may be arbitrarily chosen by the present applicant, and in this case, these terms are defined in detail below. Accordingly, the specific terms used herein should be defined based on the unique meanings thereof and the whole context of the present disclosure.

It is to be understood that the singular forms "a," "an," and "the" include plural referents unless the context clearly dictates otherwise.

It will be understood that when a certain part "includes" a certain component, the part does not exclude another component but may further include another component, unless the context clearly dictates otherwise. The term "~unit" used herein refers to a software component or a hardware component such as a field-programmable gate array (FPGA) or an application-specific integrated circuit (ASIC), which performs certain tasks. However, the term "~unit" is not limited to software or hardware. A "~unit" may be configured to be in an addressable storage medium or configured to operate one or more processors. Thus, a "~unit" may include, by way of example, components such as software components, object-oriented software components, class components, and task components, processes, functions, attributes, procedures, subroutines, segments of program code, drivers, firmware, microcode, circuitry, data, databases, data structures, tables, arrays, and variables. The functionality provided by the components and "~units" may be combined into fewer components and "~units" or further separated into additional components and "~units".

The term "current block" refers to one of a coding unit, a prediction unit, and a transform unit which are currently encoded or decoded. For convenience of explanation, a "current coding unit", a "current prediction unit", and a "current transform unit" may be used when other types of blocks such as a prediction unit and a transform unit need to be distinguished from one another. In addition, the term "lower block" refers to a data unit split from the "current block". The term "upper block" refers to a data unit including the "current block".

Also, the term 'sample' used herein refers to data that is assigned to a sampling location of an image and is to be processed. For example, pixel values in an image of a spatial domain or transform coefficients in a transform domain may be samples. A unit including at least one sample may be defined as a block.

The present disclosure will now be described more fully with reference to the accompanying drawings for one of ordinary skill in the art to be able to perform the present disclosure without any difficulty. In addition, portions irrelevant to the descriptions of the present disclosure will be omitted in the drawings for clear descriptions of the present disclosure.

FIG. 1A is a block diagram of an image encoding device 100 based on coding units having a tree structure according to an embodiment of the present disclosure.

The image encoding device 100 includes an encoder 110 and a bitstream generator 120.

The encoder 110 splits a picture or a slice included in the picture into a plurality of largest coding units according to a size of a largest coding unit. The largest coding unit may be a data unit having a size of 32×32, 64×64, 128×128, 256×256, or the like, wherein a shape of the data unit is a square shape having a width and length in powers of 2. The encoder 110 may provide largest coding unit size information indicating the size of the largest coding unit to the bitstream generator 120. The bitstream generator 120 may cause the largest coding unit size information to be included in a bitstream.

The encoder 110 determines coding units by splitting the largest coding unit. Whether to split a coding unit is determined according to whether splitting the coding unit is efficient according to rate-distortion optimization. Then, split information indicating whether the coding unit is split may be generated. The split information may be expressed by using a flag.

A coding unit may be split by using various methods. For example, a square coding unit may be split into four square coding units whose width and height are half those of the square coding unit. A square coding unit may be split into two rectangular coding units whose width is half that of the square coding unit. A square coding unit may be split into two rectangular coding units whose height is half that of the square coding unit. A square coding unit may be split into three coding units by splitting a width or height at 1:2:1.

A rectangular coding unit whose width is twice a height may be split into two square coding units. A rectangular coding unit whose width is twice a height may be split into two rectangular coding units whose width is four times a height. A rectangular coding unit whose width is twice a height may be split into two rectangular coding units and one square coding unit by splitting a width at 1:2:1.

Likewise, a rectangular coding unit whose height is twice a width may be split into two square coding units. Also, a rectangular coding unit whose height is twice a width may be split into two rectangular coding units whose height is four times a width. Likewise, a rectangular coding unit whose height is twice a width may be split into two rectangular coding units and one square coding unit by splitting a height at 1:2:1.

When the image encoding device 100 may use two or more splitting methods, information about splitting methods that may be used for coding units among the splitting methods that may be used by the image encoding device 100 may be determined for each picture. Therefore, only specific splitting methods specific may be determined to be used for each picture. When the image encoding device 100 uses only one splitting method, information about a splitting method that may be used for coding units is not separately determined.

A coding unit having a certain size may be split by using a specific splitting method. For example, when a size of a coding unit is 256×265, the coding unit may be set to be split into only four square units whose width and height are half those of the coding unit.

When split information of a coding unit indicates that the coding unit is split, split shape information indicating a splitting method of the coding unit may be generated. When there is only one splitting method that may be used in a picture to which a coding unit belongs, split shape information may not be generated. When a splitting method is determined adaptively determined to encoding information around a coding unit, split shape information may not be generated.

As described above, image data of a current picture is split into largest coding units according to a maximum size of a coding unit. Each of the largest coding units may include coding units hierarchically split from the largest coding unit. A shape and a position of a lower coding unit may be determined according to a split shape of an upper coding unit. A minimum size of a coding unit that limits splitting of the coding unit may be preset.

The encoder 110 compares coding efficiency when a coding unit is hierarchically split and coding efficiency when the coding unit is not split. Then, the encoder 110 determines whether to split the coding unit according to a comparison result. When it is determined that it is more efficient to split the coding unit, the encoder 110 splits the coding unit hierarchically. When it is determined that it is efficient not to split the coding unit according to the comparison result, the encoder 110 does not split the coding unit. Whether to split a coding unit may be determined regardless of whether adjacent coding units are split.

A finally split coding unit may be predicted by using intra prediction or inter prediction. Intra prediction is a method of predicting samples of a prediction unit by using reference samples around the prediction unit. Inter prediction is a method of predicting samples of a prediction unit by obtaining reference samples from a reference picture referenced by a current picture.

For intra prediction, the encoder 110 may select a most efficient intra prediction method by applying a plurality of intra prediction methods to a prediction unit. The intra prediction method includes a DC mode, a planar mode, and a directional mode such as a vertical mode or a horizontal mode.

When a reconstructed sample around a coding unit is used as a reference sample, intra prediction may be performed for each prediction unit. However, when a reconstructed sample in a coding unit is used as a reference sample, reconstruction of the reference sample in the coding unit has to precede prediction, and thus a prediction order of a prediction unit may depend on a transformation order of a transform unit. Therefore, when the reconstructed sample in the coding unit is used as the reference sample, only an intra prediction method for transform units corresponding to the prediction unit may be determined, and actual intra prediction may be performed for each transform unit.

The encoder 110 may select a most efficient inter prediction method by determining an optimal motion vector and an optimal reference picture. For inter prediction, the encoder 110 may determine a plurality of motion vector candidates from a coding unit that is spatially and temporally adjacent to a current coding unit, and may determine, from among the motion vector candidates, a most efficient motion vector as a motion vector. Likewise, the encoder 110 may determine a plurality of reference picture candidates from the coding unit that is spatially and temporally adjacent to the current coding unit, and may determine a most efficient reference picture from among the reference picture candidates. According to an embodiment, the reference picture may be determined from reference picture lists that are pre-determined for a current picture. According to the embodiment, for accuracy of prediction, the most efficient motion vector from among the plurality of motion vector candidates may be determined as a prediction motion vector, and a motion vector may be determined by correcting the prediction motion vector. Inter prediction may be performed in parallel for each prediction unit in the coding unit.

The encoder 110 may reconstruct a coding unit by obtaining only information indicating a motion vector and a reference picture according to a skip mode. According to the skip mode, all encoding information including a residual signal is skipped, except for the information indicating the motion vector and the reference picture. Because the residual signal is skipped, the skip mode may be used when accuracy of prediction is very high.

A partition mode to be used may be limited according to a prediction method for a prediction unit. For example, only partition modes for a prediction unit having a size of 2N×2N or N×N may be applied to intra prediction, whereas partition modes for a prediction unit having a size of 2N×2N, 2N×N, N×2N, or N×N may be applied to inter prediction. In addition, only a partition mode for a prediction unit having a size of 2N×2N may be applied to a skip mode of the inter prediction. A partition mode for each prediction method in the image encoding device 100 may vary according to coding efficiency.

The image encoding device 100 may perform transformation based on a coding unit. The image encoding device 100 may transform residual data that is a difference value between an original value and a prediction value with respect to pixels included in a coding unit, through a certain process. For example, the image encoding device 100 may perform lossy-compression on the residual data through quantization and discrete cosine transform (DCT)/discrete sine transform (DST). Alternatively, the image encoding device 100 may perform lossless-compression on the residual data without quantization.

In conclusion, the encoder 110 determines a most efficient prediction method for a current prediction unit from among a plurality of intra prediction methods and inter prediction methods. Then, the encoder 110 determines a prediction method for the current coding unit according to coding efficiency according to a prediction result. Likewise, the encoder 110 determines a transformation method according to coding efficiency according to a transformation result. Coding efficiency of a coding unit is finally determined according to a most efficient coding unit prediction method and transformation method determination scheme. The encoder 110 finalizes a hierarchical structure of a largest coding unit according to coding efficiency of a coding unit that is finally split.

The encoder 110 may measure coding efficiency of coding units, prediction efficiency of prediction methods, or the like by using rate-distortion optimization based on Lagrangian multipliers.

The encoder 110 may generate split information indicating whether to split a coding unit according to a determined hierarchical structure of a largest coding unit. Then, the encoder 110 may generate, for split coding units, partition mode information for determining a prediction unit and transform unit split information for determining a transform unit. In addition, when the coding unit may be split by using at least two splitting methods, the encoder 110 may generate both split information and split shape information that indicates a splitting method. The encoder 110 may generate information about a prediction method and a transformation method that are used for the prediction unit and the transform unit.

The bitstream generator 120 may output, in a bitstream, a plurality of pieces of information generated by the encoder 110 according to a hierarchical structure of a largest coding unit.

A method of determining a coding unit, a prediction unit, and a transform unit according to a tree structure of a largest coding unit according to an embodiment will be described below with reference to FIGS. 3 through 12.

Figure 1B:
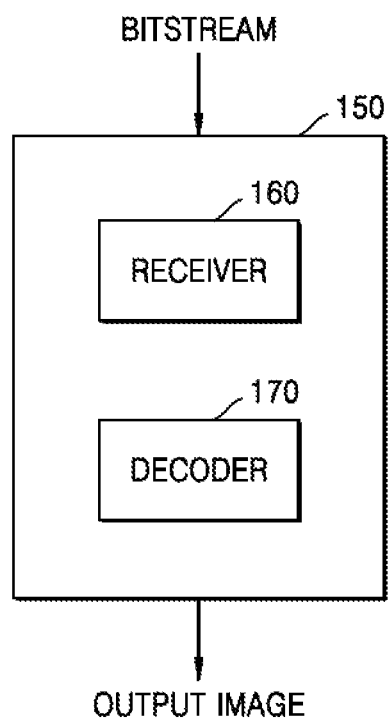
FIG. 1B is a block diagram of an image decoding device based on coding units having a tree structure, according to an embodiment.

FIG. 1B is a block diagram of an image decoding device 150 based on coding units having a tree structure according to an embodiment.

The image decoding device 150 includes a receiver 160 and a decoder 170.

Definitions of the terms including a coding unit, a prediction unit, a transform unit, various split information, or the like for a decoding operation performed by the image decoding device 150 are the same as those described above with reference to FIG. 1 and the image encoding device 100. Also, because the image decoding device 150 is designed to reconstruct image data, various encoding methods used by the image encoding device 100 may be applied to the image decoding device 150.

The receiver 160 receives and parses a bitstream regarding an encoded video. The decoder 170 extracts, from the parsed bitstream, a plurality of pieces of information for decoding largest coding units, and provides the information to the decoder 170. The decoder 170 may extract information about a maximum size of a coding unit of a current picture from a header, a sequence parameter set, or a picture parameter set of the current picture.

The decoder 170 extracts, from the parsed bitstream, split information of coding units having a tree structure according to each largest coding unit. The extracted split information is output to the decoder 170. The decoder 170 may split a largest coding unit according to the extracted split information, to determine a tree structure of the largest coding unit.

The split information extracted by the decoder 170 is split information of a tree structure determined by the image encoding device 100 to generate a minimum coding error. Therefore, the image decoding device 150 may reconstruct an image by decoding data according to a decoding method that generates the minimum coding error.

The decoder 170 may extract split information of a data unit, such as a prediction unit and a transform unit included in a coding unit. For example, the decoder 170 may extract information about a most efficient partition mode for a prediction unit. The decoder 170 may extract transformation split information of a most efficient tree structure for a transform unit.

Also, the decoder 170 may obtain information about a most efficient prediction method for prediction units split from a coding unit. Then, the decoder 170 may obtain information about a most efficient transformation method for transform units split from a coding unit.

The decoder 170 extracts information from a bitstream according to a method in which the bitstream generator 120 of the image encoding device 100 constructs the bitstream.

The decoder 170 may split a largest coding unit into coding units having a most efficient tree structure based on split information. Then, the decoder 170 may split a coding unit into prediction units according to information about a partition mode. The decoder 170 may split a coding unit into transform units according to transformation split information.

The decoder 170 may predict a prediction unit according to information about a prediction method. The decoder 170 may perform inverse quantization and inverse transformation on residual data that is a difference between an original value and a prediction value of a pixel according to information about a method of transforming a transform unit. The decoder 170 may reconstruct pixels of a coding unit according to a prediction result of the prediction unit and a transformation result of the transform unit.

Figure 2:
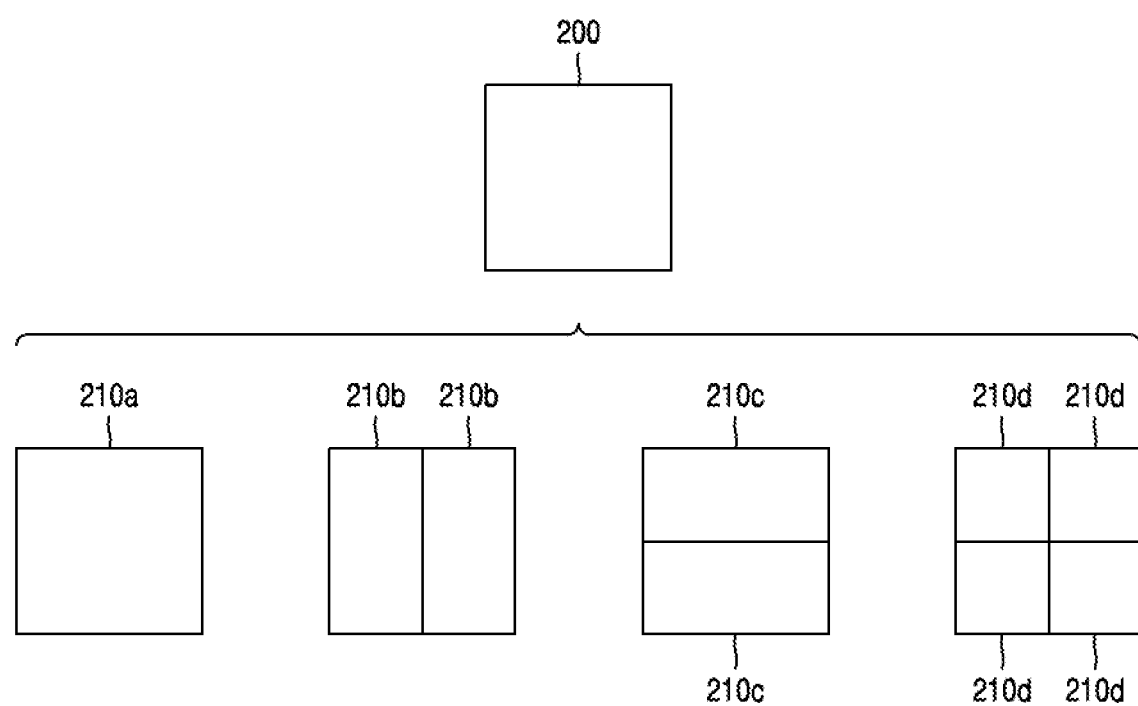
FIG. 2 illustrates a process of determining at least one coding unit by splitting a current coding unit, according to an embodiment.

FIG. 2 illustrates a process, performed by the image decoding device 150, of determining at least one coding unit by splitting a current coding unit according to an embodiment.

According to an embodiment, the image decoding device 150 may determine a shape of a coding unit by using block shape information, and may determine a shape according to which the coding unit is to be split by using split shape information. That is, a coding unit splitting method, which is indicated by the split shape information, may be determined according to which block shape is indicated by the block shape information used by the image decoding device 150.

According to an embodiment, the image decoding device 150 may use the block shape information indicating that the current coding unit has a square shape. For example, the image decoding device 150 may determine whether not to split a square coding unit, whether to vertically split the square coding unit, whether to horizontally split the square coding unit, or whether to split the square coding unit into four coding units according to the split shape information. Referring to FIG. 2, when block shape information of a current coding unit 200 indicates a square shape, a decoder 180 may not split a coding unit 210a having the same size as the current coding unit 200 according to split shape information indicating not to perform splitting, or may determine coding units 210b, 210c, and 210d split based on split shape information indicating a certain splitting method.

Referring to FIG. 2, the image decoding device 150 may determine two coding units 210b obtained by vertically splitting the current coding unit 200 based on split shape information indicating to vertically perform splitting according to an embodiment. The image decoding device 150 may determine two coding units 210c obtained by horizontally splitting the current coding unit 200 based on split shape information indicating to horizontally perform splitting. The image decoding device 150 may determine four coding units 210d obtained by vertically and horizontally splitting the current coding unit 200 based on split shape information indicating to vertically and horizontally perform splitting. However, a split shape for splitting a square coding unit may not be limited to the above shapes, and may include various shapes that may be indicated by split shape information. Split shapes for splitting a square coding unit will be described in detail below through various embodiments.

FIG. 3 illustrates a process, performed by the image decoding device 150, of determining at least one coding unit by splitting a non-square coding unit according to an embodiment.

According to an embodiment, the image decoding device 150 may use block shape information indicating that a current coding unit has a non-square shape. The image decoding device 150 may determine, according to split shape information, whether not to split the current non-square coding unit or whether to split the non-square current coding unit by using a certain method. Referring to FIG. 3, when block shape information of a current coding unit 300 or 350 indicates a non-square shape, the image decoding device 150 may not split a coding unit 310 or 360 having the same size as the current coding unit 300 or 350 according to split shape information indicating not to perform splitting, or may determine coding units 320a, 320b, 330a, 330b, 330c, 370a, 370b, 380a, 380b, and 380c split according to split shape information indicating a certain splitting method. A certain splitting method of splitting a non-square coding unit will be described in detail below through various embodiments.

According to an embodiment, the image decoding device 150 may determine a shape according to which a coding unit is split by using the split shape information, and in this case, the split shape information may indicate the number of at least one coding unit generated when the coding unit is split. Referring to FIG. 3, when the split shape information indicates that the current coding unit 300 or 350 is split into two coding units, the image decoding device 150 may determine two coding units 320a and 320b or 370a and 370b, which are respectively included in the current coding unit 300 or 350 by splitting the current coding unit 300 or 350 based on the split shape information.

According to an embodiment, when the image decoding device 150 splits the current coding unit 300 or 350 having the non-square shape based on the split shape information, the image decoding device 150 may split the current coding unit 300 or 350 having the non-square shape in consideration of a location of a long side o the current coding unit 300 or 350. For example, the image decoding device 150 may determine a plurality of coding units by splitting the current coding unit 300 or 350 in a direction of splitting the long side of the current coding unit 300 or 350 in consideration of the shape of the current coding unit 300 or 350.

According to an embodiment, when the split shape information indicates that a coding unit is split into an odd number of blocks, the image decoding device 150 may determine an odd number of coding units included in the current coding unit 300 or 350. For example, when the split shape information indicates that the current coding unit 300 or 350 is split into three coding units, the image decoding device 150 may split the current coding unit 300 or 350 into three coding units 330a, 330b, and 330c or 380a, 380b, and 380c. According to an embodiment, the image decoding device 150 may determine the odd number of coding units included in the current coding unit 300 or 350, and sizes of the determined coding units may not be the same. For example, a size of the coding unit 330b or 380b from among the odd number of coding units 330a, 330b, and 330c or 380a, 380b, and 380c may be different from sizes of the coding units 330a and 330c or 380a and 380c. That is, coding units that may be determined when the current coding unit 300 or 350 is split may have multiple sizes.

According to an embodiment, when the split shape information indicates that a coding unit is split into an odd number of blocks, the image decoding device 150 may determine an odd number of coding units included in the current coding unit 300 or 350 and may put a restriction on at least one coding unit from among the odd number of coding units generated by splitting the current coding unit 300 or 350. Referring to FIG. 3, the image decoding device 150 may decode the coding unit 330b or 380b at the center of the three coding units 330a, 330b, and 330c or 380a, 380b, and 380c generated when the current coding unit 300 or 350 is split in a different manner from the coding units 330a and 330c or 380a and 380c. For example, the image decoding device 150 may restrict the coding unit 330b or 380b at the center not to be further split or to be split only a certain number of times, unlike the coding units 330a and 330c or 380a and 380c.

Figure 4:
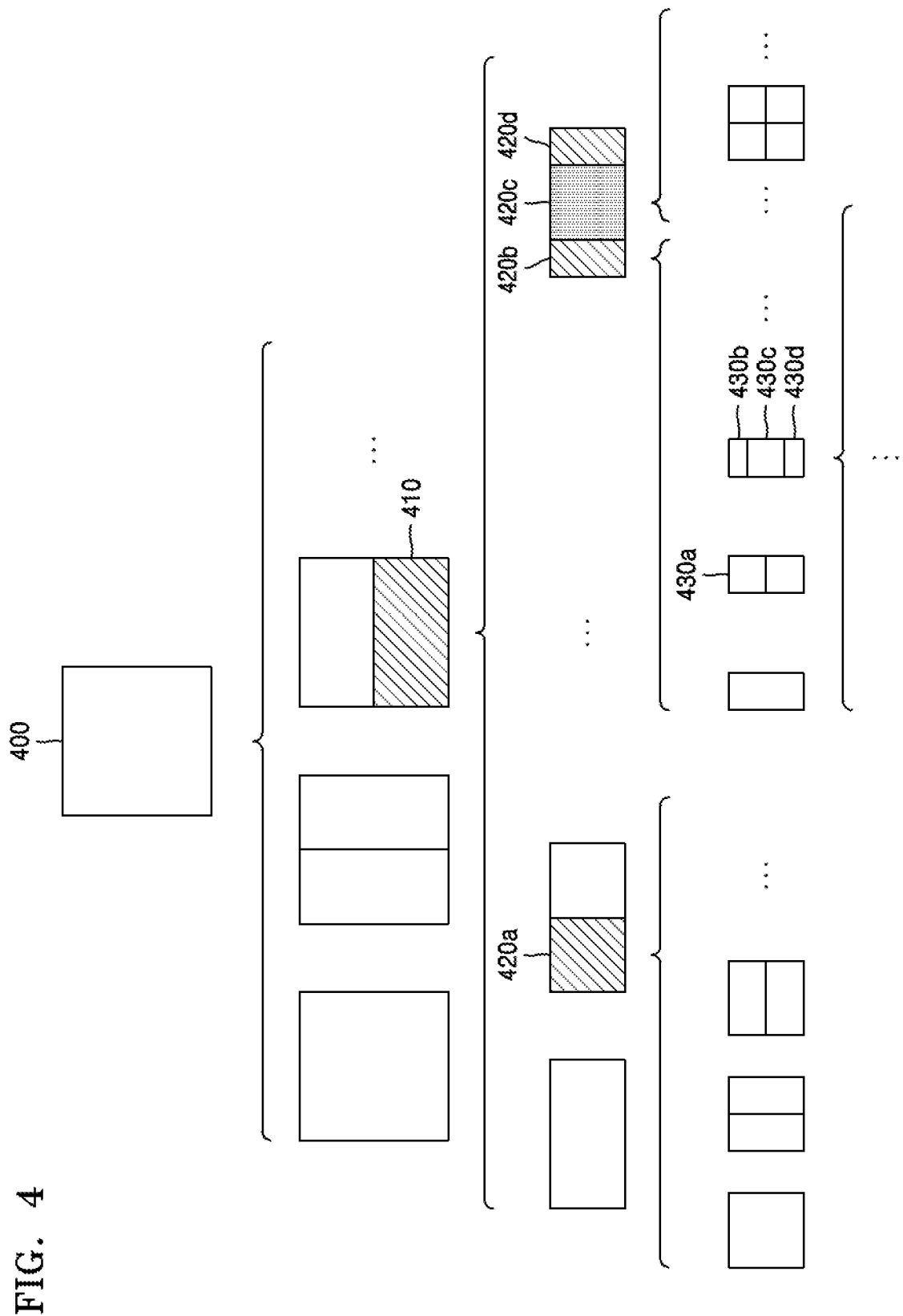
FIG. 4 illustrates a process of splitting a coding unit based on at least one of block shape information and split shape information, according to an embodiment.

FIG. 4 illustrates a process, performed by the image decoding device 150, of splitting a coding unit based on at least one of block shape information and split shape information according to an embodiment.

According to an embodiment, the image decoding device 150 may determine to split or not to split a square first coding unit 400 into coding units based on at least one of the block shape information and the split shape information. According to an embodiment, when the split shape information indicates to split the first coding unit 400 in a horizontal direction, the image decoding device 150 may determine a second coding unit 410 by splitting the first coding unit 400 in a horizontal direction. A first coding unit, a second coding unit, and a third coding unit used according to an embodiment are terms used to understand a relation before and after splitting a coding unit. For example, the second coding unit may be determined by splitting the first coding unit, and the third coding unit may be determined by splitting the second coding unit. It will be understood that a relationship among the first coding unit, the second coding unit, and the third coding unit applies to the following descriptions.

According to an embodiment, the image decoding device 150 may determine to split or not to split the determined second coding unit 410 into coding units, based on at least one of the block shape information and the split shape information. Referring to FIG. 4, the image decoding device 150 may or may not split the non-square second coding unit 410, which is determined by splitting the first coding unit 400, into one or more third coding units 420a, or 420b, 420c, and 420d based on at least one of the block shape information and the split shape information. The image decoding device 150 may obtain at least one of the block shape information and the split shape information, and may split a plurality of various-shaped second coding units (e.g., 410) by splitting the first coding unit 400, based on at least one of the obtained block shape information and split shape information, and the second coding unit 410 may be split by using a splitting method of the first coding unit 400 based on at least one of the block shape information and the split shape information. According to an embodiment, when the first coding unit 400 is split into the second coding units 410 based on at least one of the block shape information and the split shape information of the first coding unit 400, the second coding unit 410 may also be split into the third coding units 420a, or 420b, 420c, and 420d based on at least one of the block shape information and the split shape information of the second coding unit 410. That is, a coding unit may be recursively split based on at least one of the block shape information and the split shape information of each coding unit. A method that may be used to recursively split a coding unit will be described below through various embodiments.

According to an embodiment, the image decoding device 150 may split each of the third coding units 420a, or 420b, 420c, and 420d into coding units, based on at least one of the block shape information and the split shape information, or may determine not to split the second coding unit 410 based on at least one of the block shape information and the split shape information. According to an embodiment, the image decoding device 150 may split the non-square second coding unit 410 into the odd number of third coding units 420b, 420c, and 420d. The image decoding device 150 may put a certain restriction on a third coding unit from among the odd number of third coding units 420b, 420c, and 420d. For example, the image decoding device 150 may restrict the third coding unit 420c at a center location from among the odd number of third coding units 420b, 420c, and 420d to be no longer split or to be split a settable number of times. Referring to FIG. 4, the image decoding device 150 may restrict the third coding unit 420c, which is at the center location from among the odd number of third coding units 420b, 420c, and 420d included in the non-square second coding unit 410, to be no longer split, to be split by using a certain splitting method (e.g., split into only four coding units or split into a shape corresponding to that into which the second coding unit 410 is split), or to be split only a certain number of times (e.g., split only n times (where n>0)). However, the restrictions on the third coding unit 420c at the center location are not limited to the above-described examples, and may include various restrictions for decoding the third coding unit 420c at the center location differently from the other third coding units 420b and 420d.

According to an embodiment, the image decoding device 150 may obtain at least one of block shape information and split shape information, which is used to split a current coding unit, from a certain location in the current coding unit.

According to an embodiment, when a current coding unit is split into a certain number of coding units, the image decoding device 150 may select one of the coding units. Various methods that may be used to select one of a plurality of coding units will be described below through various embodiments.

According to an embodiment, the image decoding device 150 may split a current coding unit into a plurality of coding units, and may determine a coding unit at a certain location.

Figure 5:
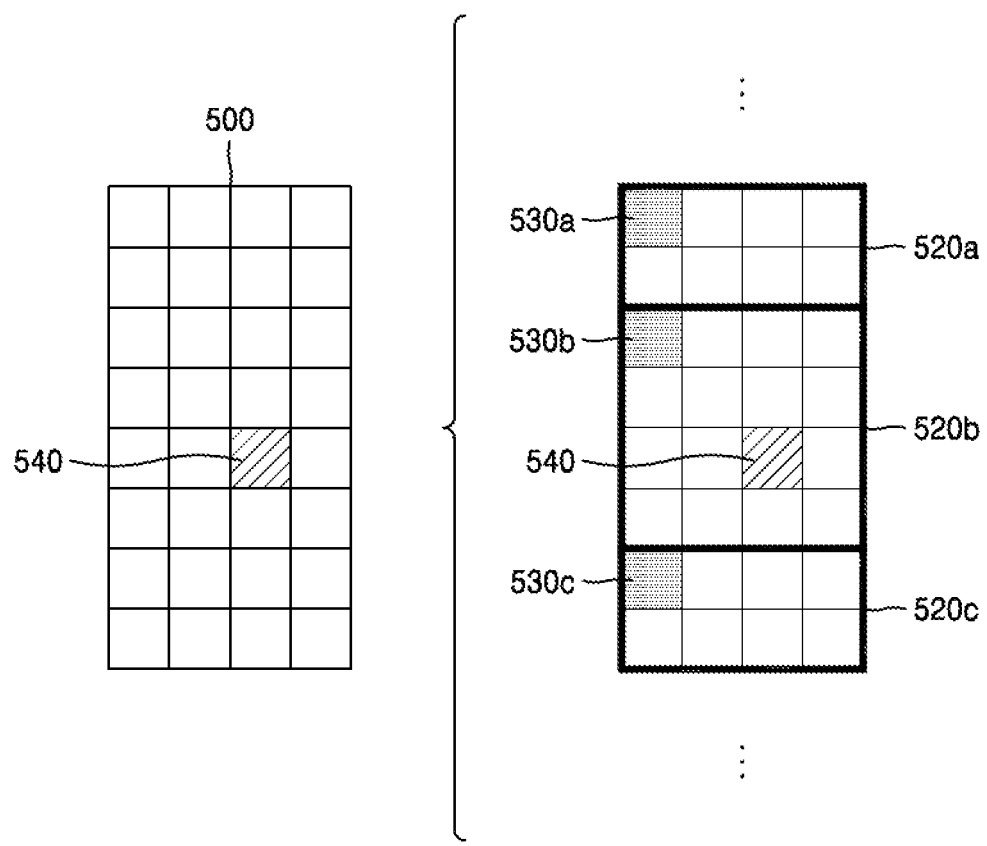
FIG. 5 illustrates a method of determining a certain coding unit from among an odd number of coding units, according to an embodiment.

FIG. 5 illustrates a method, performed by the image decoding device 150, of determining a coding unit of a certain location from among an odd number of coding units according to an embodiment.

According to an embodiment, the image decoding device 150 may use information indicating locations of an odd number of coding units to determine a coding unit at a center location from among the odd number of coding units. Referring to FIG. 5, the image decoding device 150 may determine an odd number of coding units 520a, 520b, and 520c by splitting a current coding unit 500. The image decoding device 150 may determine the coding unit 520b at a center location by using information about locations of the odd number of coding units 520a, 520b, and 520c. For example, the image decoding device 150 may determine the coding unit 520b of the center location by determining the locations of the coding units 520a, 520b, and 520c based on information indicating locations of certain samples included in the coding units 520a, 520b, and 520c. In detail, the image decoding device 150 may determine the coding unit 520b at the center location by determining the locations of the coding units 520a, 520b, and 520c based on information indicating locations of top left samples 530a, 530b, and 530c of the coding units 520a, 520b, and 520c.

According to an embodiment, the information indicating the locations of the top left samples 530a, 530b, and 530c, which are included in the coding units 520a, 520b, and 520c, respectively, may include information about locations or coordinates of the coding units 520a, 520b, and 520c in a picture. According to an embodiment, the information indicating the locations of the top left samples 530a, 530b, and 530c, which are respectively included in the coding units 520a, 520b, and 520c, respectively, may include information indicating widths or heights of the coding units 520a, 520b, and 520c included in the current coding unit 500, and the widths or heights may correspond to information indicating differences between the coordinates of the coding units 520a, 520b, and 520c in the picture. That is, the image decoding device 150 may determine the coding unit 520b at the center location by directly using the information about the locations or coordinates of the coding units 520a, 520b, and 520c in the picture, or by using the information about the widths or heights of the coding units, which correspond to difference values between the coordinates.

According to an embodiment, information indicating the location of the top left sample 530a of the upper coding unit 520a may include coordinates (xa, ya), information indicating the location of the top left sample 530b of the middle coding unit 520b may include coordinates (xb, yb), and information indicating the location of the top left sample 530c of the lower coding unit 520c may include coordinates (xc, yc). The image decoding device 150 may determine the middle coding unit 520b by using the coordinates of the top left samples 530a, 530b, and 530c which are included in the coding units 520a, 520b, and 520c, respectively. For example, when the coordinates of the top left samples 530a, 530b, and 530c are sorted in an ascending or descending order, the coding unit 520b including the coordinates (xb, yb) of the sample 530b at a center location may be determined as a coding unit at a center location from among the coding units 520a, 520b, and 520c determined by splitting the current coding unit 500. However, the coordinates indicating the locations of the top left samples 530a, 530b, and 530c may include coordinates indicating absolute locations in the picture, or may use coordinates (dxb, dyb) indicating a relative location of the top left sample 530b of the middle coding unit 520b and coordinates (dxc, dyc) indicating a relative location of the top left sample 530c of the lower coding unit 520c, with reference to the location of the top left sample 530a of the upper coding unit 520a. Also, a method of determining a coding unit at a certain location by using coordinates of a sample included in the coding unit as information indicating a location of the sample is not limited to the above-described method, and may include various arithmetic methods capable of using the coordinates of the sample.

According to an embodiment, the image decoding device 150 may split the current coding unit 500 into the plurality of coding units 520a, 520b, and 520c, and may select one of the coding units 520a, 520b, and 520c based on a certain criterion. For example, the image decoding device 150 may select the coding unit 520b, which has a size different from that of the others, from among the coding units 520a, 520b, and 520c.

According to an embodiment, the image decoding device 150 may determine the widths or heights of the coding units 520a, 520b, and 520c by using the coordinates (xa, ya) indicating the location of the top left sample 530a of the upper coding unit 520a, the coordinates (xb, yb) indicating the location of the top left sample 530b of the middle coding unit 520b, and the coordinates (xc, yc) indicating the location of the top left sample 530c of the lower coding unit 520c. The image decoding device 150 may determine sizes of the coding units 520a, 520b, and 520c by using the coordinates (xa, ya), (xb, yb), and (xc, yc) indicating the locations of the coding units 520a, 520b, and 520c.

According to an embodiment, the image decoding device 150 may determine the width of the upper coding unit 520a to be xb−xa and the height of the upper coding unit 520a to be yb−ya. According to an embodiment, the image decoding device 150 may determine the width of the middle coding unit 520b to be xc−xb and the height of the middle coding unit 520b to be yc−yb. According to an embodiment, the image decoding device 150 may determine the width or height of the lower coding unit 520c by using the width or height of the current coding unit 500 and the widths or heights of the upper and middle coding units 520a and 520b. The image decoding device 150 may determine a coding unit, which has a size different from that of the others, based on the determined widths and heights of the coding units 520a to 520c. Referring to FIG. 5, the image decoding device 150 may determine the middle coding unit 520b, which has a size different from the size of the upper and lower coding units 520a and 520c, as the coding unit of the certain location. However, the above-described method, performed by the image decoding device 150, of determining a coding unit having a size different from the size of the other coding units merely corresponds to an example of determining a coding unit at a certain location by using sizes of coding units, which are determined based on coordinates of samples, and thus various methods of determining a coding unit at a certain location by comparing sizes of coding units, which are determined based on coordinates of certain samples, may be used.

However, locations of samples considered to determine locations of coding units are not limited to the above-described top left locations, and information about arbitrary locations of samples included in the coding units may be used.

According to an embodiment, the image decoding device 150 may select a coding unit at a certain location from among an odd number of coding units determined by splitting a current coding unit, considering a shape of the current coding unit. For example, when the current coding unit has a non-square shape, a width of which is longer than a height, the image decoding device 150 may determine the coding unit at the certain location in a horizontal direction. That is, the image decoding device 150 may determine one of coding units at different locations in a horizontal direction and may put a restriction on the coding unit. When the current coding unit has a non-square shape, a height of which is longer than a width, the image decoding device 150 may determine the coding unit at the certain location in a vertical direction. That is, the image decoding device 150 may determine one of coding units at different locations in a vertical direction and may put a restriction on the coding unit.

According to an embodiment, the image decoding device 150 may use information indicating respective locations of an even number of coding units, to determine the coding unit at the certain location from among the even number of coding units. The image decoding device 150 may determine an even number of coding units by splitting the current coding unit, and may determine the coding unit at the certain location by using the information about the locations of the even number of coding units. An operation related thereto may correspond to the operation of determining a coding unit at a certain location (e.g., a center location) from among an odd number of coding units, which has been described in detail above with reference to FIG. 5, and thus detailed descriptions thereof are not provided here.

According to an embodiment, when a non-square current coding unit is split into a plurality of coding units, certain information about a coding unit at a certain location may be used in a splitting operation to determine the coding unit at the certain location from among the plurality of coding units. For example, the image decoding device 150 may use at least one of block shape information and split shape information, which is stored in a sample included in a coding unit at a center location, in a splitting operation to determine the coding unit at the center location from among the plurality of coding units determined by splitting the current coding unit.

Referring to FIG. 5, the image decoding device 150 may split the current coding unit 500 into the plurality of coding units 520a, 520b, and 520c based on at least one of the block shape information and the split shape information, and may determine the coding unit 520b at a center location from among the plurality of the coding units 520a, 520b, and 520c. Furthermore, the image decoding device 150 may determine the coding unit 520b at the center location, in consideration of a location from which at least one of the block shape information and the split shape information is obtained. That is, at least one of the block shape information and the split shape information of the current coding unit 500 may be obtained from a sample 540 at a center location of the current coding unit 500 and, when the current coding unit 500 is split into the plurality of coding units 520a, 520b, and 520c based on at least one of the block shape information and the split shape information, the coding unit 520b including the sample 540 may be determined as the coding unit at the center location. However, information used to determine the coding unit at the center location is not limited to at least one of the block shape information and the split shape information, and various kinds of information may be used to determine the coding unit at the center location.

According to an embodiment, certain information for identifying the coding unit at the certain location may be obtained from a certain sample included in a coding unit to be determined. Referring to FIG. 5, the image decoding device 150 may use at least one of the block shape information and the split shape information, which is obtained from a sample at a certain location in the current coding unit 500 (e.g., a sample at a center location of the current coding unit 500) to determine a coding unit at a certain location from among the plurality of the coding units 520a, 520b, and 520c determined by splitting the current coding unit 500 (e.g., a coding unit at a center location from among a plurality of split coding units). That is, the image decoding device 150 may determine the sample at the certain location by considering a block shape of the current coding unit 500, may determine the coding unit 520b including a sample, from which certain information (e.g., at least one of the block shape information and the split shape information) may be obtained, from among the plurality of coding units 520a, 520b, and 520c determined by splitting the current coding unit 500, and may put a certain restriction on the coding unit 520b. Referring to FIG. 5, according to an embodiment, the image decoding device 150 may determine the sample 540 at the center location of the current coding unit 500 as the sample from which the certain information may be obtained, and may put a certain restriction on the coding unit 520b including the sample 540, in a decoding operation. However, the location of the sample from which the certain information may be obtained is not limited to the above-described location, and may include arbitrary locations of samples included in the coding unit 520b to be determined for a restriction.

According to an embodiment, the location of the sample from which the certain information may be obtained may be determined based on a shape of the current coding unit 500. According to an embodiment, the block shape information may indicate whether the current coding unit has a square or non-square shape, and the location of the sample from which the certain information may be obtained may be determined based on the shape. For example, the image decoding device 150 may determine a sample located on a boundary for splitting at least one of a width and height of the current coding unit in half, as the sample from which the certain information may be obtained, by using at least one of information about the width of the current coding unit and information about the height of the current coding unit. As another example, when the block shape information of the current coding unit indicates a non-square shape, the image decoding device 150 may determine one of samples adjacent to a boundary for splitting a long side of the current coding unit in half, as the sample from which the certain information may be obtained.

According to an embodiment, when the current coding unit is split into a plurality of coding units, the image decoding device 150 may use at least one of the block shape information and the split shape information to determine a coding unit at a certain location from among the plurality of coding units. According to an embodiment, the image decoding device 150 may obtain at least one of the block shape information and the split shape information from a sample at a certain location in a coding unit, and may split the plurality of coding units, which are generated by splitting the current coding unit, by using at least one of the block shape information and the split shape information, which is obtained from the sample of the certain location in each of the plurality of coding units. That is, a coding unit may be recursively split based on at least one of the block shape information and the split shape information, which is obtained from the sample at the certain location in each coding unit. An operation of recursively splitting a coding unit has been described above with reference to FIG. 4, and thus detailed descriptions thereof will not be provided here.

According to an embodiment, the image decoding device 150 may determine one or more coding units by splitting the current coding unit, and may determine an order of decoding the one or more coding units based on a certain block (e.g., the current coding unit).

Figure 6:
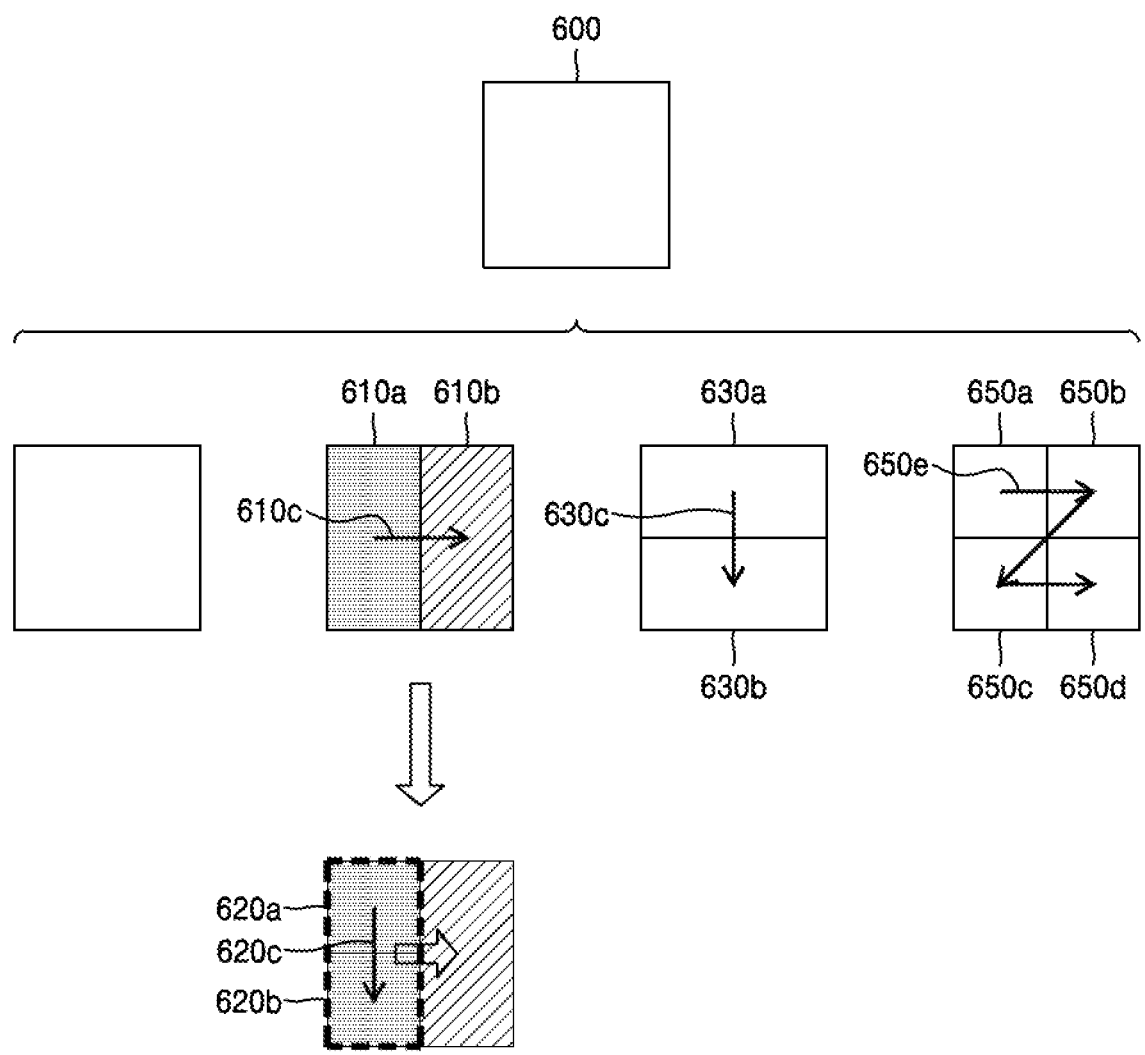
FIG. 6 illustrates an order of processing a plurality of coding units when the plurality of coding units are determined by splitting a current coding unit, according to an embodiment.

FIG. 6 illustrates an order of processing a plurality of coding units when the image decoding device 150 determines the plurality of coding units by splitting a current coding unit according to an embodiment.

According to an embodiment, the image decoding device 150 may determine second coding units 610a and 610b by splitting a first coding unit 600 in a vertical direction, may determine second coding units 630a and 630b by splitting the first coding unit 600 in a horizontal direction, or may determine second coding units 650a to 650d by splitting the first coding unit 600 in vertical and horizontal directions, based on block shape information and split shape information.

Referring to FIG. 6, the image decoding device 150 may determine to process the second coding units 610a and 610b, which are determined by splitting the first coding unit 600 in a vertical direction, in a horizontal direction order 610c. The image decoding device 150 may determine to process the second coding units 630a and 630b, which are determined by splitting the first coding unit 600 in a horizontal direction, in a vertical direction order 630c. The image decoding device 150 may determine to process the second coding units 650a to 650d, which are determined by splitting the first coding unit 600 in vertical and horizontal directions, in a certain order for processing coding units in a row and then processing coding units in a next row (e.g., in a raster scan order or a Z-scan order 650e).

According to an embodiment, the image decoding device 150 may recursively split coding units. Referring to FIG. 6, the image decoding device 150 may determine the plurality of second coding units 610a, 610b, 630a, 630b, 650a, 650b, 650c, and 650d by splitting the first coding unit 600, and may recursively split each of the determined plurality of second coding units 610a, 610b, 630a, 630b, 650a, 650b, 650c, and 650d. A splitting method of the plurality of second coding units 610a, 610b, 630a, 630b, 650a, 650b, 650c, and 650d may correspond to a splitting method of the first coding unit 600. Accordingly, each of the plurality of second coding units 610a, 610b, 630a, 630b, 650a, 650b, 650c, and 650d may be independently split into a plurality of coding units. Referring to FIG. 6, the image decoding device 150 may determine the second coding units 610a and 610b by splitting the first coding unit 600 in a vertical direction, and may determine to independently split or not to split each of the second coding units 610a and 610b.

According to an embodiment, the image decoding device 150 may determine third coding units 620a and 620b by splitting the left second coding unit 610a in a horizontal direction, and may not split the right second coding unit 610b.

According to an embodiment, a processing order of coding units may be determined based on an operation of splitting a coding unit. In other words, a processing order of split coding units may be determined based on a processing order of coding units immediately before being split. The image decoding device 150 may determine a processing order of the third coding units 620a and 620b determined by splitting the left second coding unit 610a, independently of the right second coding unit 610b. Because the third coding units 620a and 620b are determined by splitting the left second coding unit 610a in a horizontal direction, the third coding units 620a and 620b may be processed in a vertical direction order 620c. Because the left and right second coding units 610a and 610b are processed in the horizontal direction order 610c, the right second coding unit 610b may be processed after the third coding units 620a and 620b included in the left second coding unit 610a are processed in the vertical direction order 620c. An operation of determining a processing order of coding units based on a coding unit before being split is not limited to the above-described example, and various methods may be used to independently process coding units, which are split and determined to various shapes, in a certain order.

Figure 7:
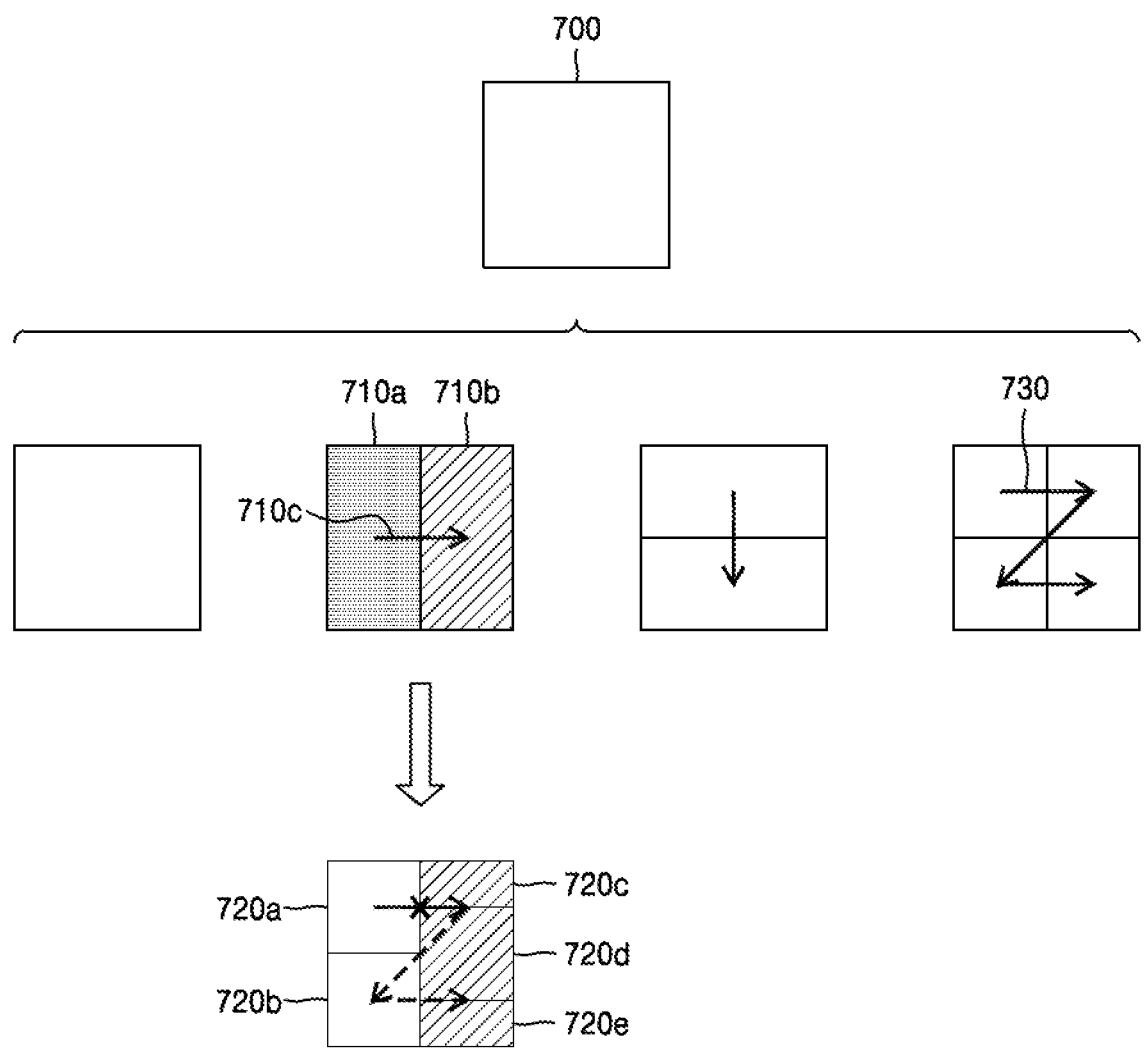
FIG. 7 illustrates a process of determining that a current coding unit is to be split into an odd number of coding units when the coding units are not processable in a certain order, according to an embodiment.

FIG. 7 illustrates a process, performed by the image decoding device 150, of determining that a current coding unit is to be split into an odd number of coding units when the coding units are not processable in a certain order according to an embodiment.

According to an embodiment, the image decoding device 150 may determine whether the current coding unit is split into an odd number of coding units, based on obtained block shape information and split shape information. Referring to FIG. 7, a square first coding unit 700 may be split into non-square second coding units 710a and 710b, and the second coding units 710a and 710b may be independently split into third coding units 720a and 720b, and 720c to 720e. According to an embodiment, the image decoding device 150 may determine the plurality of third coding units 720a and 720b by splitting the left second coding unit 710a in a horizontal direction, and may split the right second coding unit 710b into an odd number of third coding units 720c to 720e.

According to an embodiment, the image decoding device 150 may determine whether any coding unit is split into an odd number of coding units, by determining whether the third coding units 720a and 720b, and 720c to 720e are processable in a certain order. Referring to FIG. 7, the image decoding device 150 may determine the third coding units 720a and 720b, and 720c to 720e by recursively splitting the first coding unit 700. The image decoding device 150 may determine whether any of the first coding unit 700, the second coding units 710a and 710b, and the third coding units 720a and 720b, and 720c, 720d, and 720e is split into an odd number of coding units, based on at least one of block shape information and split shape information. For example, the right second coding unit 710b may be split into an odd number of third coding units 720c, 720d, and 720e. A processing order of a plurality of coding units included in the first coding unit 700 may be a certain order (e.g., a Z-scan order 730), and the image decoding device 150 may determine whether the third coding units 720c, 720d, and 720e, which are determined by splitting the right second coding unit 710b into an odd number of coding units, satisfy a condition for processing in the certain order.

According to an embodiment, the image decoding device 150 may determine whether the third coding units 720a and 720b, and 720c, 720d, and 720e included in the first coding unit 700 satisfy the condition for processing in the certain order, and the condition relates to whether at least one of a width and height of the second coding units 710a and 710b is split in half along a boundary of the third coding units 720a and 720b, and 720c, 720d, and 720e. For example, although the third coding units 720a and 720b determined by splitting the height of the non-square left second coding unit 710a in half may satisfy the condition, because boundaries of the third coding units 720c, 720d, and 720e determined by splitting the right second coding unit 710b into three coding units do not split the width or height of the right second coding unit 710b in half, it may be determined that the third coding units 720c, 720d, and 720e do not satisfy the condition. When the condition is not satisfied as described above, the image decoding device 150 may decide disconnection of a scan order, and determine that the right second coding unit 710b is split into an odd number of coding units, based on a result of the decision. According to an embodiment, when a coding unit is split into an odd number of coding units, the image decoding device 150 may put a certain restriction on a coding unit at a certain location among the split coding units, and the restriction or the certain location has been described above through various embodiments and thus detailed descriptions thereof will not be provided here.

Figure 8:
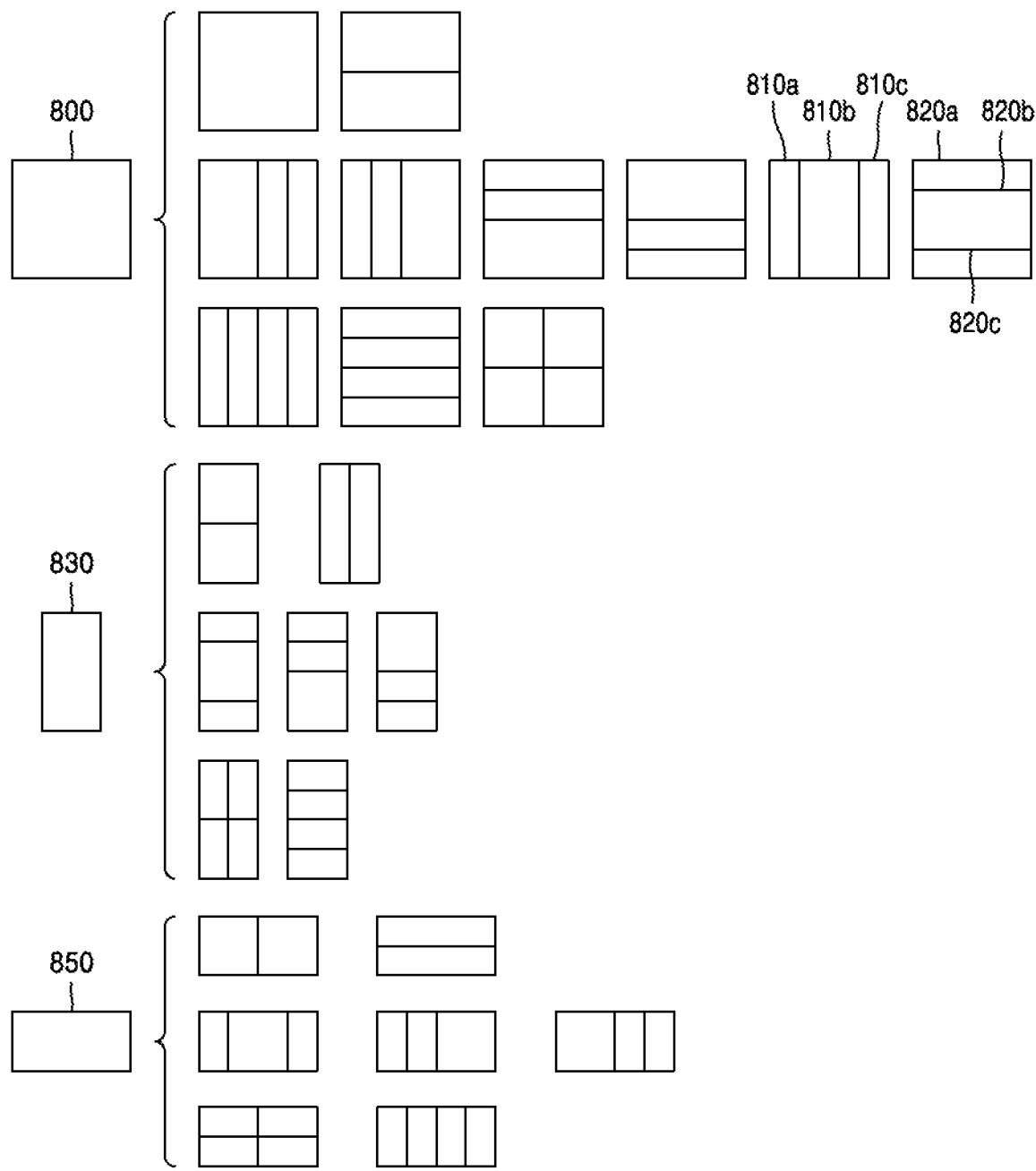
FIG. 8 illustrates a process of determining at least one coding unit by splitting a first coding unit, according to an embodiment.

FIG. 8 illustrates a process, performed by the image decoding device 150, of determining at least one coding unit by splitting a first coding unit 800 according to an embodiment. According to an embodiment, the image decoding device 150 may split the first coding unit 800, based on at least one of block shape information and split shape information, which is obtained by the receiver 160. The square first coding unit 800 may be split into four square coding units, or may be split into a plurality of non-square coding units. For example, referring to FIG. 8, when the block shape information indicates that the first coding unit 800 has a square shape and the split shape information indicates to split the first coding unit 800 into non-square coding units, the image decoding device 150 may split the first coding unit 800 into a plurality of non-square coding units. In detail, when the split shape information indicates to determine an odd number of coding units by splitting the first coding unit 800 in a horizontal direction or a vertical direction, the image decoding device 150 may split the square first coding unit 800 into an odd number of coding units, e.g., second coding units 810a, 810b, and 810c determined by splitting the square first coding unit 800 in a vertical direction or second coding units 820a, 820b, and 820c determined by splitting the square first coding unit 800 in a horizontal direction.

According to an embodiment, the image decoding device 150 may determine whether the second coding units 810a, 810b, 810c, 820a, 820b, and 820c included in the first coding unit 800 satisfy a condition for processing in a certain order, and the condition relates to whether at least one of a width and height of the first coding unit 800 is split in half along a boundary of the second coding units 810a, 810b, 810c, 820a, 820b, and 820c. Referring to FIG. 8, because boundaries of the second coding units 810a, 810b, and 810c determined by splitting the square first coding unit 800 in a vertical direction do not split the width of the first coding unit 800 in half, it may be determined that the first coding unit 800 does not satisfy the condition for processing in the certain order. In addition, because boundaries of the second coding units 820a, 820b, and 820c determined by splitting the square first coding unit 800 in a horizontal direction do not split the width of the first coding unit 800 in half, it may be determined that the first coding unit 800 does not satisfy the condition for processing in the certain order. When the condition is not satisfied as described above, the image decoding device 150 may decide disconnection of a scan order, and may determine that the first coding unit 800 is split into an odd number of coding units based on a result of the decision. According to an embodiment, when a coding unit is split into an odd number of coding units, the image decoding device 150 may put a certain restriction on a coding unit at a certain location from among the split coding units, and the restriction or the certain location has been described above through various embodiments and thus detailed descriptions thereof will not be provided here.

According to an embodiment, the image decoding device 150 may determine various-shaped coding units by splitting a first coding unit.

Referring to FIG. 8, the image decoding device 150 may split the square first coding unit 800 or a non-square first coding unit 830 or 850 into various-shaped coding units.

Figure 9:
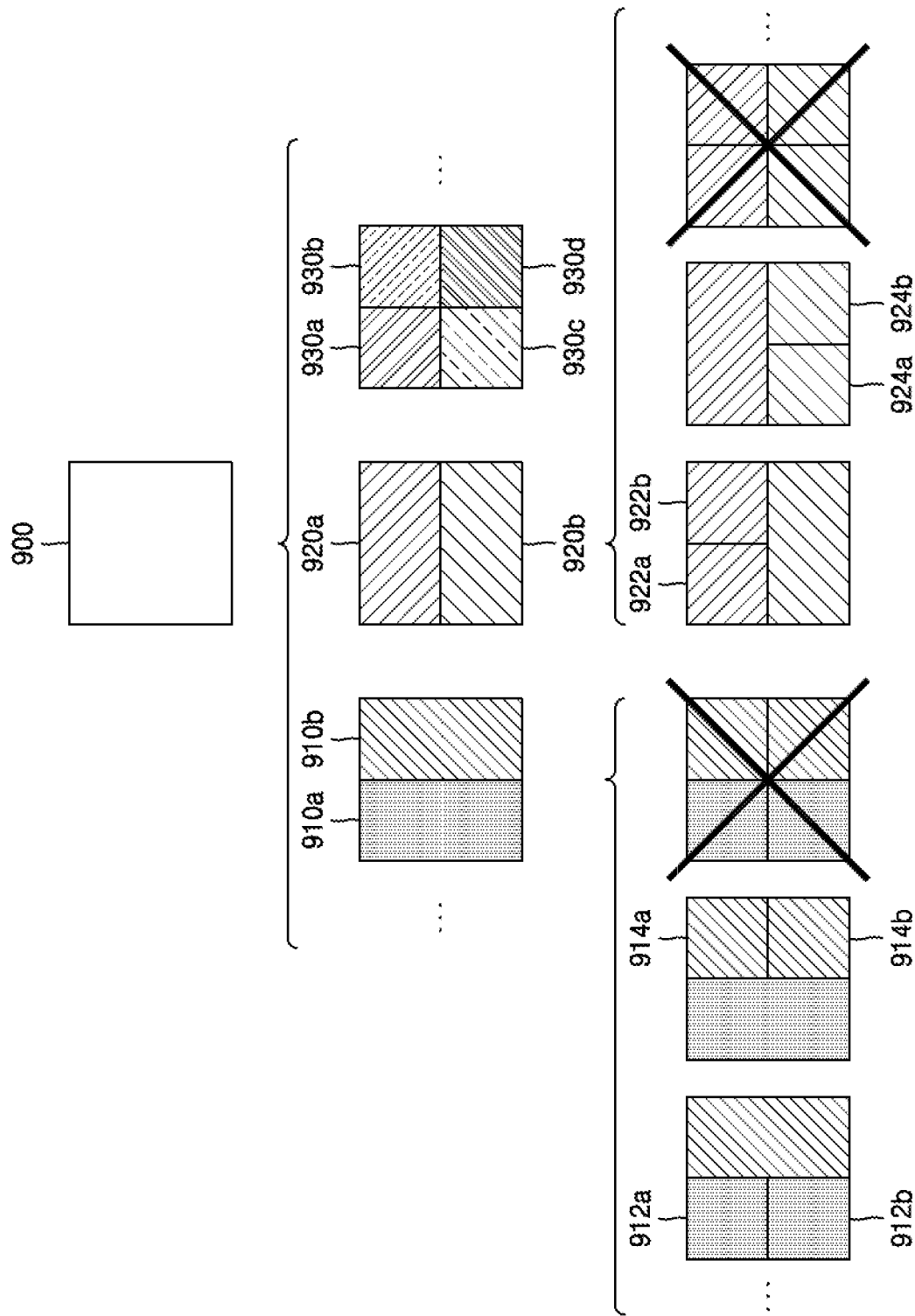
FIG. 9 illustrates that a shape into which a second coding unit is splittable is restricted when a non-square second coding unit determined by splitting a first coding unit satisfies a certain condition, according to an embodiment.

FIG. 9 illustrates that a shape into which a second coding unit is splittable by the image decoding device 150 is restricted when a non-square second coding unit, which is determined by splitting a first coding unit 900, satisfies a certain condition according to an embodiment.

According to an embodiment, the image decoding device 150 may determine to split the square first coding unit 900 into non-square second coding units 910a, 910b, 920a, and 920b, based on at least one of block shape information and split shape information, which is obtained by the receiver 160. The second coding units 910a, 910b, 920a, and 920b may be independently split. As such, the image decoding device 150 may determine to split or not to split the first coding unit 900 into a plurality of coding units, based on at least one of the block shape information and the split shape information of each of the second coding units 910a, 910b, 920a, and 920b. According to an embodiment, the image decoding device 150 may determine third coding units 912a and 912b by splitting the non-square left second coding unit 910a, which is determined by splitting the first coding unit 900 in a vertical direction, in a horizontal direction. However, when the left second coding unit 910a is split in a horizontal direction, the image decoding device 150 may restrict the right second coding unit 910b to not be split in a horizontal direction in which the left second coding unit 910*a* is split. When third coding units 914*a* and 914*b* are determined by splitting the right second coding unit 910*b* in the same direction, because the left and right second coding units 910*a* and 910*b* are independently split in a horizontal direction, the third coding units 912*a*, 912*b*, 914*a*, and 914*b* may be determined. However, this case serves equally as a case in which the image decoding device 150 splits the first coding unit 900 into four square second coding units 930*a*, 930*b*, 930*c*, and 930*d*, based on at least one of the block shape information and the split shape information, and may be inefficient in terms of image decoding.

According to an embodiment, the image decoding device 150 may determine third coding units 922*a*, 922*b*, 924*a*, and 924*b* by splitting the non-square second coding unit 920*a* or 920*b*, which is determined by splitting the first coding unit 900 in a horizontal direction, in a vertical direction. However, when a second coding unit (e.g., the upper second coding unit 920*a*) is split in a vertical direction, for the above-described reason, the image decoding device 150 may restrict the other second coding unit (e.g., the lower second coding unit 920*b*) to not be split in a vertical direction in which the upper second coding unit 920*a* is split.

Figure 10:
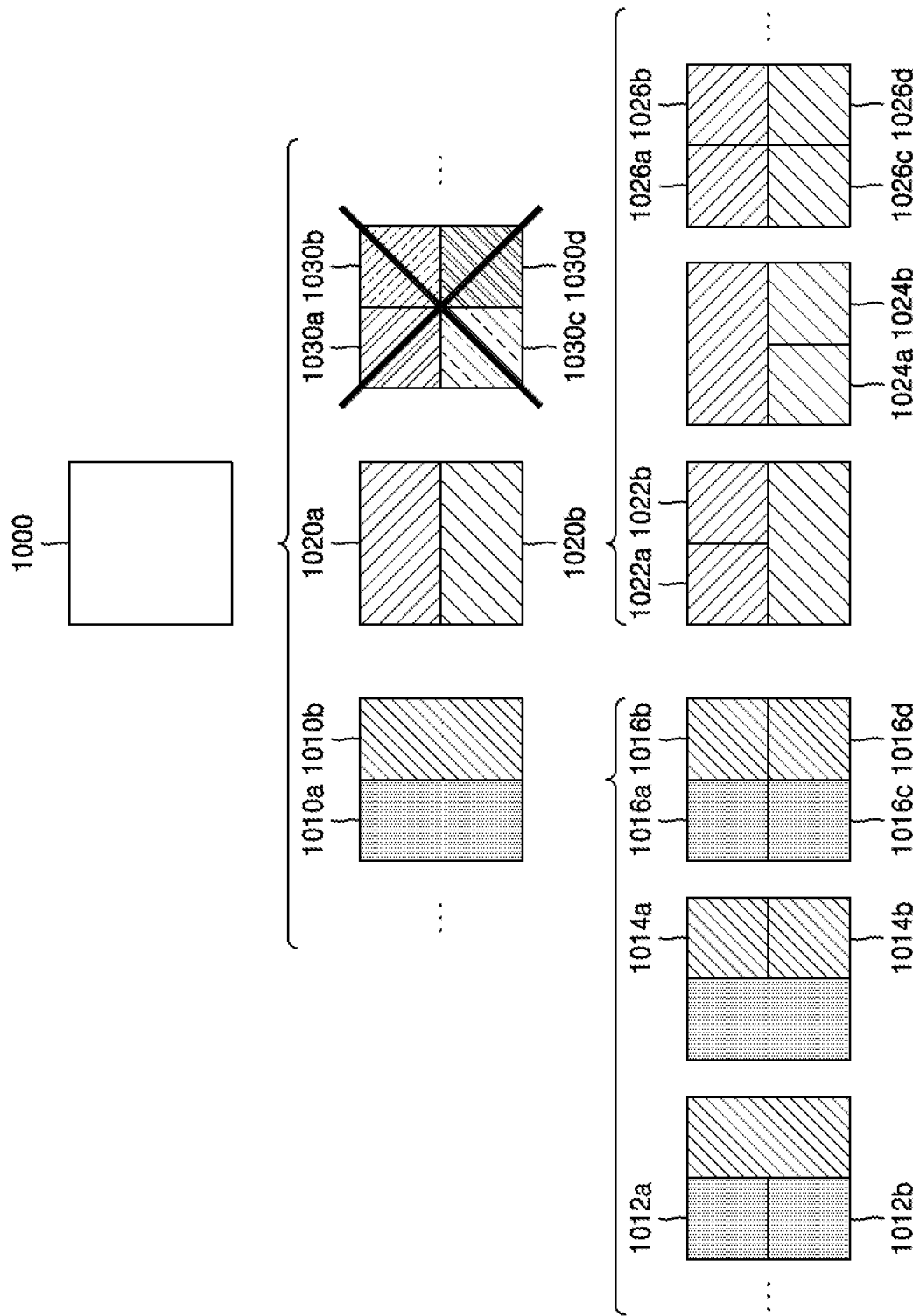
FIG. 10 illustrates a process of splitting a square coding unit when split shape information indicates that the square coding unit is not to be split into four square coding units, according to an embodiment.

FIG. 10 illustrates a process, performed by the image decoding device 150, of splitting a square coding unit when split shape information indicates that the square coding unit is not to be split into four square coding units according to an embodiment.

According to an embodiment, the image decoding device 150 may determine second coding units 1010*a*, 1010*b*, 1020*a*, 1020*b*, etc. by splitting a first coding unit 1000 based on at least one of block shape information and split shape information. The split shape information may include information about various methods of splitting a coding unit but, the information about various splitting methods may not include information for splitting a coding unit into four square coding units. According to such split shape information, the image decoding device 150 may not split the first square coding unit 1000 into four square second coding units 1030*a*, 1030*b*, 1030*c*, and 1030*d*. The image decoding device 150 may determine the non-square second coding units 1010*a*, 1010*b*, 1020*a*, 1020*b*, etc., based on the split shape information.

According to an embodiment, the image decoding device 150 may independently split the non-square second coding units 1010*a*, 1010*b*, 1020*a*, 1020*b*, etc. Each of the second coding units 1010*a*, 1010*b*, 1020*a*, 1020*b*, etc. may be recursively split in a certain order, and this splitting method may correspond to a method of splitting the first coding unit 1000 based on at least one of the block shape information and the split shape information.

For example, the image decoding device 150 may determine square third coding units 1012*a* and 1012*b* by splitting the left second coding unit 1010*a* in a horizontal direction, and may determine square third coding units 1014*a* and 1014*b* by splitting the right second coding unit 1010*b* in a horizontal direction. Furthermore, the image decoding device 150 may determine square third coding units 1016*a*, 1016*b*, 1016*c*, and 1016*d* by splitting both the left and right second coding units 1010*a* and 1010*b* in a horizontal direction. In this case, coding units having the same shape as the four square second coding units 1030*a*, 1030*b*, 1030*c*, and 1030*d* split from the first coding unit 1000 may be determined.

As another example, the image decoding device 150 may determine square third coding units 1022*a* and 1022*b* by splitting the upper second coding unit 1020*a* in a vertical direction, and may determine square third coding units 1024*a* and 1024*b* by splitting the lower second coding unit 1020*b* in a vertical direction. Furthermore, the image decoding device 150 may determine square third coding units 1026*a*, 1026*b*, 1026*c*, and 1026*d* by splitting both the upper and lower second coding units 1020*a* and 1020*b* in a vertical direction. In this case, coding units having the same shape as the four square second coding units 1030*a*, 1030*b*, 1030*c*, and 1030*d* split from the first coding unit 1000 may be determined.

Figure 11:
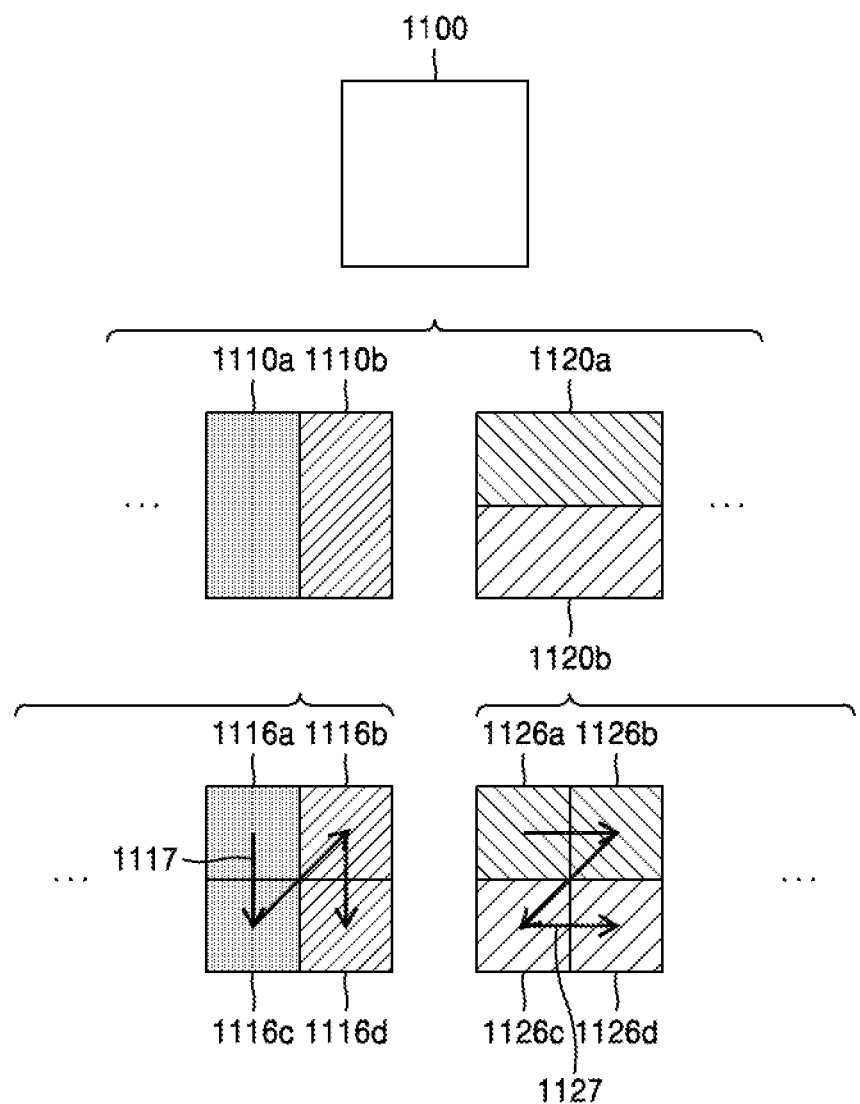
FIG. 11 illustrates that a processing order between a plurality of coding units may be changed depending on a process of splitting a coding unit, according to an embodiment.

FIG. 11 illustrates that a processing order between a plurality of coding units may be changed depending on a process of splitting a coding unit according to an embodiment.

According to an embodiment, the image decoding device 150 may split a first coding unit 1100 based on block shape information and split shape information. When the block shape information indicates a square shape and the split shape information indicates to split the first coding unit 1100 in at least one of horizontal and vertical directions, the image decoding device 150 may determine second coding units 1110*a*, 1110*b*, 1120*a*, 1120*b*, etc. by splitting the first coding unit 1100. Referring to FIG. 11, the non-square second coding units 1110*a*, 1110*b*, 1120*a*, and 1120*b* determined by splitting the first coding unit 1100 in only a horizontal direction or vertical direction may be independently split based on the block shape information and the split shape information of each coding unit. For example, the image decoding device 150 may determine third coding units 1116*a*, 1116*b*, 1116*c*, and 1116*d* by splitting the second coding units 1110*a* and 1110*b*, which are generated by splitting the first coding unit 1100 in a vertical direction, in a horizontal direction, and may determine third coding units 1126*a*, 1126*b*, 1126*c*, and 1126*d* by splitting the second coding units 1120*a* and 1120*b*, which are generated by splitting the first coding unit 1100 in a horizontal direction, in a horizontal direction. An operation of splitting the second coding units 1110*a*, 1110*b*, 1120*a*, and 1120*b* has been described above with reference to FIG. 9, and thus detailed descriptions thereof will not be provided here.

According to an embodiment, the image decoding device 150 may process coding units in a certain order. An operation of processing coding units in a certain order has been described above with reference to FIG. 6, and thus detailed descriptions thereof will not be provided here. Referring to FIG. 11, the image decoding device 150 may determine four square third coding units 1116*a*, 1116*b*, 1116*c*, and 1116*d*, and 1126*a*, 1126*b*, 1126*c*, and 1126*d* by splitting the square first coding unit 1100. According to an embodiment, the image decoding device 150 may determine processing orders of the third coding units 1116*a*, 1116*b*, 1116*c*, and 1116*d*, and 1126*a*, 1126*b*, 1126*c*, and 1126*d* based on a splitting method of the first coding unit 1100.

According to an embodiment, the image decoding device 150 may determine the third coding units 1116*a*, 1116*b*, 1116*c*, and 1116*d* by splitting the second coding units 1110*a* and 1110*b* generated by splitting the first coding unit 1100 in a vertical direction, in a horizontal direction, and may process the third coding units 1116*a*, 1116*b*, 1116*c*, and 1116*d* in a processing order 1117 for initially processing the third coding units 1116*a* and 1116*c*, which are included in the left second coding unit 1110*a*, in a vertical direction and then processing the third coding unit 1116*b* and 1116*d*, which are included in the right second coding unit 1110*b*, in a vertical direction.

According to an embodiment, the image decoding device 150 may determine the third coding units 1126*a*, 1126*b*, 1126*c*, and 1126*d* by splitting the second coding units 1120*a* and 1120b generated by splitting the first coding unit 1100 in a horizontal direction, in a vertical direction, and may process the third coding units 1126a, 1126b, 1126c, and 1126d in a processing order 1127 for initially processing the third coding units 1126a and 1126b, which are included in the upper second coding unit 1120a, in a horizontal direction and then processing the third coding unit 1126c and 1126d, which are included in the lower second coding unit 1120b, in a horizontal direction.

Referring to FIG. 11, the square third coding units 1116a, 1116b, 1116c, and 1116d, and 1126a, 1126b, 1126c, and 1126d may be determined by splitting the second coding units 1110a, 1110b, 1120a, and 1120b, respectively. Although the second coding units 1110a and 1110b are determined by splitting the first coding unit 1100 in a vertical direction differently from the second coding units 1120a and 1120b which are determined by splitting the first coding unit 1100 in a horizontal direction, the third coding units 1116a, 1116b, 1116c, and 1116d, and 1126a, 1126b, 1126c, and 1126d split therefrom eventually show same-shaped coding units split from the first coding unit 1100. As such, by recursively splitting a coding unit in different manners based on at least one of the block shape information and the split shape information, the image decoding device 150 may process a plurality of coding units in different orders even when the coding units are eventually determined to be the same shape.

FIG. 12 illustrates a process of determining a depth of a coding unit as a shape and a size of the coding unit change, when the coding unit is recursively split such that a plurality of coding units are determined, according to an embodiment.

According to an embodiment, the image decoding device 150 may determine the depth of the coding unit based on a certain criterion. For example, the certain criterion may be the length of a long side of the coding unit. When the length of a long side of a coding unit before being split is 2n times (n>0) the length of a long side of a split current coding unit, the image decoding device 150 may determine that a depth of the current coding unit is increased from a depth of the coding unit before being split, by n. In the following descriptions, a coding unit having an increased depth is expressed as a coding unit of a deeper depth.

Referring to FIG. 12, according to an embodiment, the image decoding device 150 may determine a second coding unit 1202, a third coding unit 1204, etc. of deeper depths by splitting a square first coding unit 1200 based on block shape information indicating a square shape (e.g., the block shape information may be expressed as '0: SQUARE'). Assuming that the size of the square first coding unit 1200 is 2N×2N, the second coding unit 1202 determined by splitting a width and height of the first coding unit 1200 in ½^1 may have a size of N×N. Furthermore, the third coding unit 1204 determined by splitting a width and height of the second coding unit 1202 in ½ may have a size of N/2×N/2. In this case, a width and height of the third coding unit 1204 are 1/2² times those of the first coding unit 1200. When a depth of the first coding unit 1200 is D, a depth of the second coding unit 1202, the width and height of which are 1/2¹ times those of the first coding unit 1200, may be D+1, and a depth of the third coding unit 1204, the width and height of which are 1/2² times those of the first coding unit 1200, may be D+2.

According to an embodiment, the image decoding device 150 may determine a second coding unit 1212 or 1222, a third coding unit 1214 or 1224, etc. of deeper depths by splitting a non-square first coding unit 1210 or 1220 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding device 150 may determine the second coding unit 1202, 1212, or 1222 by splitting at least one of a width and height of the first coding unit 1210 having a size of N×2N. That is, the image decoding device 150 may determine the second coding unit 1202 having a size of N×N or the second coding unit 1222 having a size of N×N/2 by splitting the first coding unit 1210 in a horizontal direction, or may determine the second coding unit 1212 having a size of N/2×N by splitting the first coding unit 1210 in horizontal and vertical directions.

According to an embodiment, the image decoding device 150 may determine the second coding unit 1202, 1212, or 1222 by splitting at least one of a width and height of the first coding unit 1220 having a size of 2N×N. That is, the image decoding device 150 may determine the second coding unit 1202 having a size of N×N or the second coding unit 1212 having a size of N/2×N by splitting the first coding unit 1220 in a vertical direction, or may determine the second coding unit 1222 having a size of N×N/2 by splitting the first coding unit 1220 in horizontal and vertical directions.

According to an embodiment, the image decoding device 150 may determine the third coding unit 1204, 1214, or 1224 by splitting at least one of a width and height of the second coding unit 1202 having a size of N×N. That is, the image decoding device 150 may determine the third coding unit 1204 having a size of N/2×N/2, the third coding unit 1214 having a size of N/2×N/2, or the third coding unit 1224 having a size of N/2×N/2 by splitting the second coding unit 1202 in vertical and horizontal directions.

According to an embodiment, the image decoding device 150 may determine the third coding unit 1204, 1214, or 1224 by splitting at least one of a width and height of the second coding unit 1212 having a size of N/2×N. That is, the image decoding device 150 may determine the third coding unit 1204 having a size of N/2×N/2 or the third coding unit 1224 having a size of N/2×N/2 by splitting the second coding unit 1212 in a horizontal direction, or may determine the third coding unit 1214 having a size of N/2×N/2 by splitting the second coding unit 1212 in vertical and horizontal directions.

According to an embodiment, the image decoding device 150 may determine the third coding unit 1204, 1214, or 1224 by splitting at least one of a width and height of the second coding unit 1214 having a size of N×N/2. That is, the image decoding device 150 may determine the third coding unit 1204 having a size of N/2×N/2 or the third coding unit 1214 having a size of N/2×N/2 by splitting the second coding unit 1212 in a vertical direction, or may determine the third coding unit 1224 having a size of N/2×N/2 by splitting the second coding unit 1212 in vertical and horizontal directions.

According to an embodiment, the image decoding device 150 may split a square coding unit (e.g., 1200, 1202, or 1204) in a horizontal or vertical direction. For example, the image decoding device 150 may determine the first coding unit 1210 having a size of N×2N by splitting the first coding unit 1200 having a size of 2N×2N in a vertical direction, or may determine the first coding unit 1220 having a size of 2N×N by splitting the first coding unit 1200 in a horizontal direction. According to an embodiment, when a depth is determined based on the length of a longest side of a coding unit, a depth of a coding unit determined by splitting the first coding unit 1200, 1202, or 1204 having a size of 2N×2N in a horizontal or vertical direction may be the same as the depth of the first coding unit 1200, 1202, or 1204.

According to an embodiment, a width and height of the third coding unit 1214 or 1224 may be ½ times those of the first coding unit 1210 or 1220. When a depth of the first coding unit 1210 or 1220 is D, a depth of the second coding unit 1212 or 1214, the width and height of which are ½ times those of the first coding unit 1210 or 1220, may be D+1, and a depth of the third coding unit 1214 or 1224, the width and height of which are ½ times those of the first coding unit 1210 or 1220, may be D+2.

Figure 13:
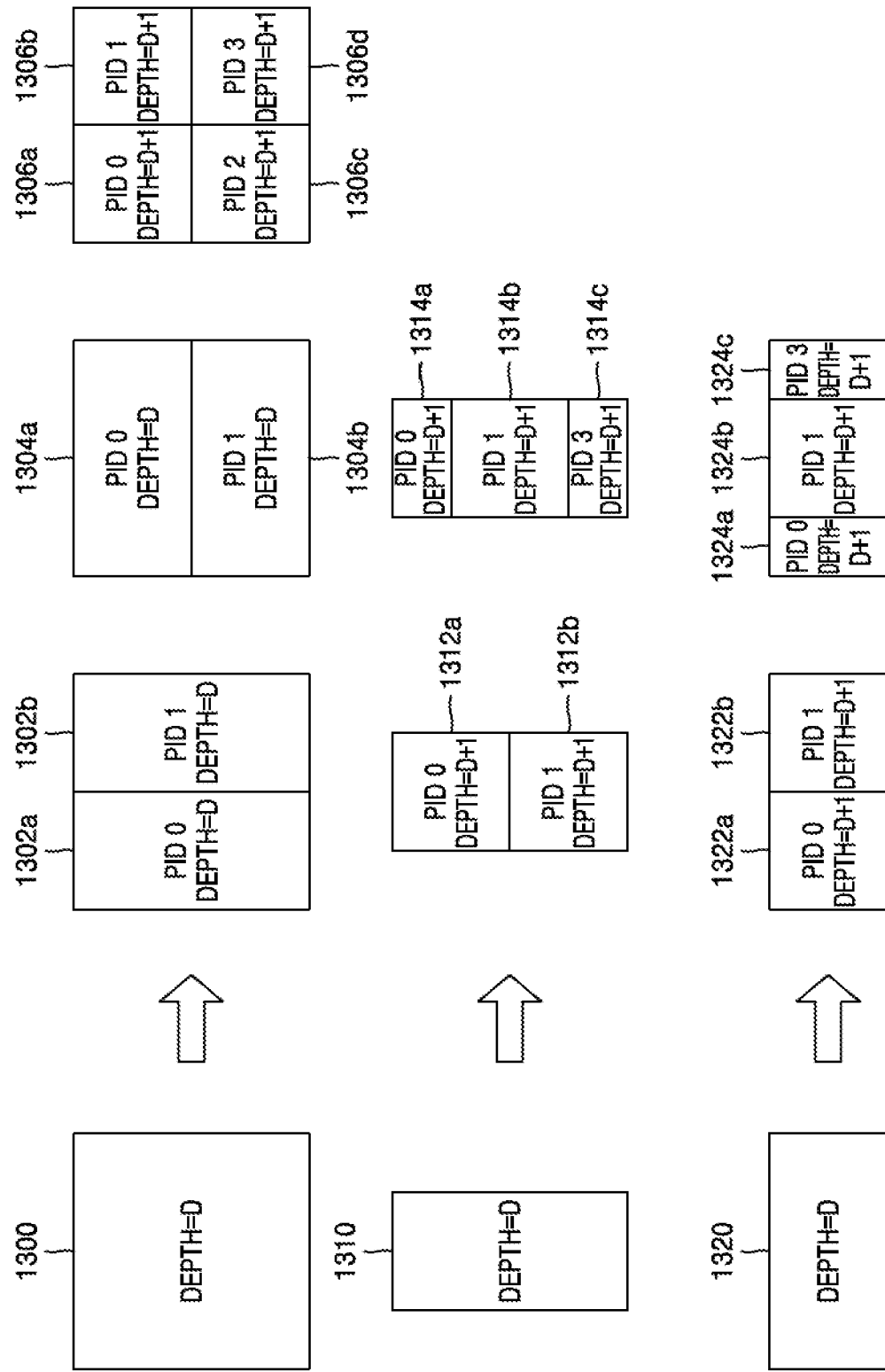
FIG. 13 illustrates depths that are determinable based on shapes and sizes of coding units, and part indexes (PIDs) that are for distinguishing the coding units, according to an embodiment.

FIG. 13 illustrates depths that are determinable based on shapes and sizes of coding units, and part indexes (PIDs) that are for distinguishing the coding units according to an embodiment.

According to an embodiment, the image decoding device 150 may determine various-shaped second coding units by splitting a square first coding unit 1300. Referring to FIG. 13, the image decoding device 150 may determine second coding units 1302a and 1302b, 1304a and 1304b, and 1306a, 1306b, 1306c, and 1306d by splitting the first coding unit 1300 in at least one of vertical and horizontal directions based on split shape information. That is, the image decoding device 150 may determine the second coding units 1302a and 1302b, 1304a and 1304b, and 1306a, 1306b, 1306c, and 1306d, based on the split shape information of the first coding unit 1300.

According to an embodiment, a depth of the second coding units 1302a and 1302b, 1304a and 1304b, and 1306a, 1306b, 1306c, and 1306d, which are determined based on the split shape information of the square first coding unit 1300, may be determined based on the length of a long side thereof. For example, because the length of a side of the square first coding unit 1300 equals the length of a long side of the non-square second coding units 1302a and 1302b, and 1304a and 1304b, the first coding unit 1300 and the non-square second coding units 1302a and 1302b, and 1304a and 1304b may have the same depth, e.g., D. However, when the image decoding device 150 splits the first coding unit 1300 into the four square second coding units 1306a, 1306b, 1306c, and 1306d based on the split shape information, because the length of a side of the square second coding units 1306a, 1306b, 1306c, and 1306d is ½ times the length of a side of the first coding unit 1300, a depth of the second coding units 1306a, 1306b, 1306c, and 1306d may be D+1 which is deeper than the depth D of the first coding unit 1300 by 1.

According to an embodiment, the image decoding device 150 may determine a plurality of second coding units 1312a and 1312b, and 1314a, 1314b, and 1314c by splitting a first coding unit 1310, a height of which is longer than a width, in a horizontal direction based on the split shape information. According to an embodiment, the image decoding device 150 may determine a plurality of second coding units 1322a and 1322b, and 1324a, 1324b, and 1324c by splitting a first coding unit 1320, a width of which is longer than a height, in a vertical direction based on the split shape information.

According to an embodiment, a depth of the second coding units 1312a, 1312b, 1314a, 1314b, 1316a, 1316b, 1316c, and 1316d, which are determined based on the split shape information of the non-square first coding unit 1310 or 1320, may be determined based on the length of a long side thereof. For example, because the length of a side of the square second coding units 1312a and 1312b is ½ times the length of a side of the first coding unit 1310 having a non-square shape, a height of which is longer than a width, a depth of the square second coding units 1302a, 1302b, 1304a, and 1304b is D+1 which is deeper than the depth D of the non-square first coding unit 1310 by 1.

Furthermore, the image decoding device 150 may split the non-square first coding unit 1310 into an odd number of second coding units 1314a, 1314b, and 1314c based on the split shape information. The odd number of second coding units 1314a, 1314b, and 1314c may include the non-square second coding units 1314a and 1314c and the square second coding unit 1314b. In this case, because the length of a long side of the non-square second coding units 1314a and 1314c and the length of a side of the square second coding unit 1314b are ½ times the length of a side of the first coding unit 1310, a depth of the second coding units 1314a, 1314b, and 1314c may be D+1 which is deeper than the depth D of the first coding unit 1310 by 1. The image decoding device 150 may determine depths of coding units split from the non-square first coding unit 1320, a width of which is longer than a height, by using the above-described method of determining depths of coding units split from the first coding unit 1310.

According to an embodiment, the image decoding device 150 may determine PIDs for identifying split coding units, based on a size ratio between the coding units when an odd number of split coding units do not have equal sizes. Referring to FIG. 13, the coding unit 1314b of a center location among the odd number of split coding units 1314a, 1314b, and 1314c may have a width which is equal to that of the other coding units 1314a and 1314c and a height which is two times that of the other coding units 1314a and 1314c. That is, in this case, the coding unit 1314b at the center location may include two of the other coding unit 1314a or 1314c. Therefore, when a PID of the coding unit 1314b at the center location is 1 based on a scan order, a PID of the coding unit 1314c located next to the coding unit 1314b may be increased by 2 and thus may be 3. That is, discontinuity in PID values may be present. According to an embodiment, the image decoding device 150 may determine whether an odd number of split coding units do not have equal sizes based on whether discontinuity is present in PIDs for identifying the split coding units.

According to an embodiment, the image decoding device 150 may determine whether to use a specific splitting method based on PID values for identifying a plurality of coding units determined by splitting a current coding unit. Referring to FIG. 13, the image decoding device 150 may determine an even number of coding units 1312a and 1312b or an odd number of coding units 1314a, 1314b, and 1314c by splitting the first coding unit 1310 having a rectangular shape, a height of which is longer than a width. The image decoding device 150 may use PIDs to identify respective coding units. According to an embodiment, the PID may be obtained from a sample of a certain location (e.g., a top left sample) of each coding unit.

According to an embodiment, the image decoding device 150 may determine a coding unit at a certain location from among the split coding units, by using the PIDs for distinguishing the coding units. According to an embodiment, when the split shape information of the first coding unit 1310 having a rectangular shape, a height of which is longer than a width, indicates to split a coding unit into three coding units, the image decoding device 150 may split the first coding unit 1310 into three coding units 1314a, 1314b, and 1314c. The image decoding device 150 may assign a PID to each of the three coding units 1314a, 1314b, and 1314c. The image decoding device 150 may compare PIDs of an odd number of split coding units to determine a coding unit at a center location from among the coding units. The image decoding device 150 may determine the coding unit 1314*b* having a PID corresponding to a middle value among the PIDs of the coding units, as the coding unit at the center location from among the coding units determined by splitting the first coding unit 1310. According to an embodiment, the image decoding device 150 may determine PIDs for distinguishing split coding units, based on a size ratio between the coding units when the split coding units do not have equal sizes. Referring to FIG. 13, the coding unit 1314*b* generated by splitting the first coding unit 1310 may have a width which is equal to that of the other coding units 1314*a* and 1314*c* and a height which is two times that of the other coding units 1314*a* and 1314*c*. In this case, when the PID of the coding unit 1314*b* at the center location is 1, the PID of the coding unit 1314*c* located next to the coding unit 1314*b* may be increased by 2 and thus may be 3. When the PID is not uniformly increased as described above, the image decoding device 150 may determine that a coding unit is split into a plurality of coding units including a coding unit having a size different from that of the other coding units. According to an embodiment, when the split shape information indicates to split a coding unit into an odd number of coding units, the image decoding device 150 may split a current coding unit in such a manner that a coding unit of a certain location (e.g., a coding unit of a center location) among an odd number of coding units has a size different from that of the other coding units. In this case, the image decoding device 150 may determine the coding unit of the center location, which has a different size, by using PIDs of the coding units. However, the PID and the size or location of the coding unit of the certain location to be determined are not limited to the above-described examples, and various PIDs and various locations and sizes of coding units may be used.

According to an embodiment, the image decoding device 150 may use a certain data unit where a coding unit starts to be recursively split.

Figure 14:
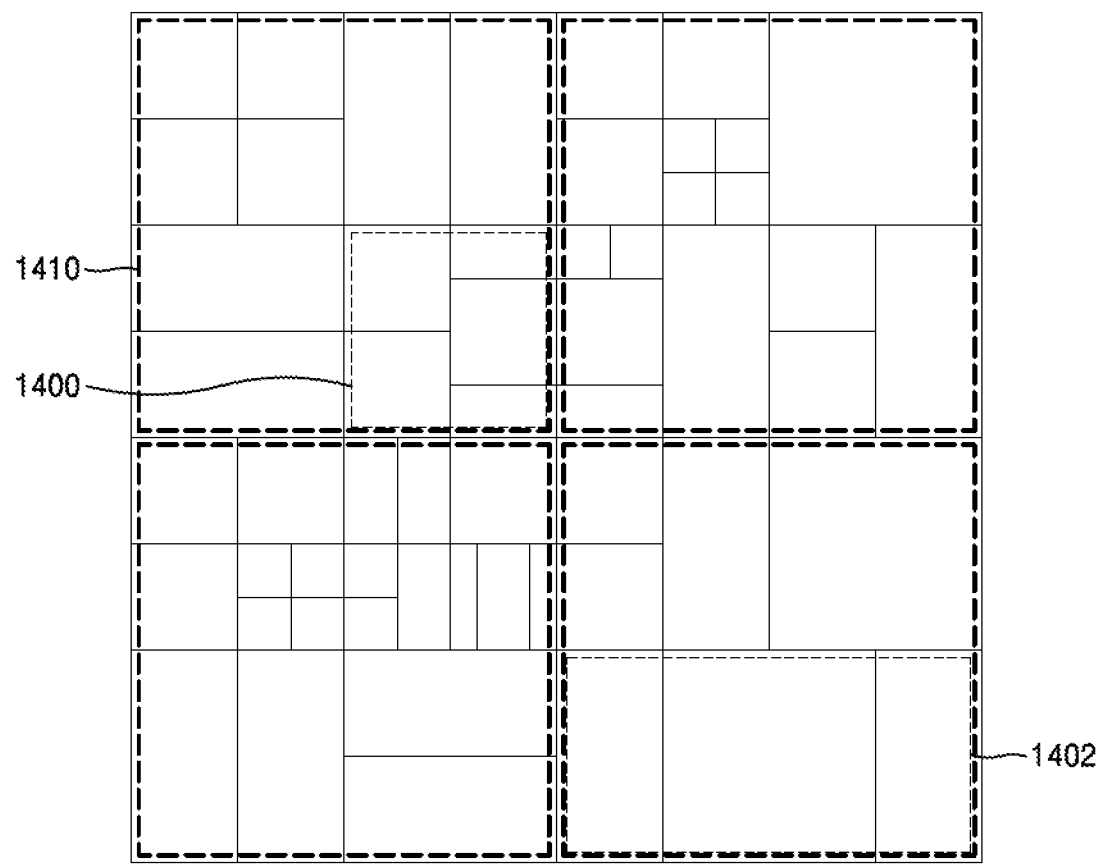
FIG. 14 illustrates that a plurality of coding units are determined based on a plurality of certain data units included in a picture, according to an embodiment.

FIG. 14 illustrates that a plurality of coding units are determined based on a plurality of certain data units included in a picture according to an embodiment.

According to an embodiment, a certain data unit may be defined as a data unit where a coding unit starts to be recursively split by using at least one of block shape information and split shape information. That is, the certain data unit may correspond to a coding unit of an uppermost depth, which is used to determine a plurality of coding units split from a current picture. In the following descriptions, for convenience of explanation, the certain data unit is referred to as a reference data unit.

According to an embodiment, the reference data unit may have a certain size and a certain shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding device 150 may split the current picture into a plurality of reference data units. According to an embodiment, the image decoding device 150 may split the plurality of reference data units, which are split from the current picture, by using split shape information for each reference data unit. The operation of splitting the reference data unit may correspond to a splitting operation using a quadtree structure.

According to an embodiment, the image decoding device 150 may previously determine a minimum size allowed for the reference data units included in the current picture. Accordingly, the image decoding device 150 may determine various reference data units having sizes equal to or greater than the minimum size, and may determine one or more coding units by using the split shape information and block shape information with reference to the determined reference data units.

Referring to FIG. 14, the image decoding device 150 may use a square reference coding unit 1400 or a non-square reference coding unit 1402. According to an embodiment, the shape and size of reference coding units may be determined based on various data units capable of including one or more reference coding units (e.g., sequences, pictures, slices, slice segments, largest coding units, or the like).

According to an embodiment, the receiver 160 of the image decoding device 150 may obtain, from a bitstream, at least one of reference coding unit shape information and reference coding unit size information with respect to each of the various data units. An operation of determining one or more coding units included in the square reference coding unit 1400 has been described above in relation to the operation of splitting the current coding unit 300 of FIG. 10, and an operation of determining one or more coding units included in the non-square reference coding unit 1402 has been described above in relation to the operation of splitting the current coding unit 1100 or 1150 of FIG. 11, and thus, detailed descriptions thereof will not be provided here.

According to an embodiment, the image decoding device 150 may use a PID for identifying the size and shape of reference coding units, to determine the size and shape of reference coding units according to some data units previously determined based on a certain condition. That is, the receiver 160 may obtain, from the bitstream, only the PID for identifying the size and shape of reference coding units with respect to each slice, slice segment, or largest coding unit which is a data unit satisfying a certain condition (e.g., a data unit having a size equal to or smaller than a slice) among the various data units (e.g., sequences, pictures, slices, slice segments, largest coding units, or the like). The image decoding device 150 may determine the size and shape of reference data units with respect to each data unit, which satisfies the certain condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding device 150 may determine at least one of the size and shape of reference coding units included in a data unit serving as a unit for obtaining the PID, by selecting the previously determined at least one of the size and shape of reference coding units based on the PID.

According to an embodiment, the image decoding device 150 may use one or more reference coding units included in one largest coding unit. That is, a largest coding unit split from an image may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding device 150 may determine the reference coding units by splitting the largest coding unit n times based on a quadtree structure, and may split the reference coding unit based on at least one of the block shape information and the split shape information according to various embodiments.

Figure 15:
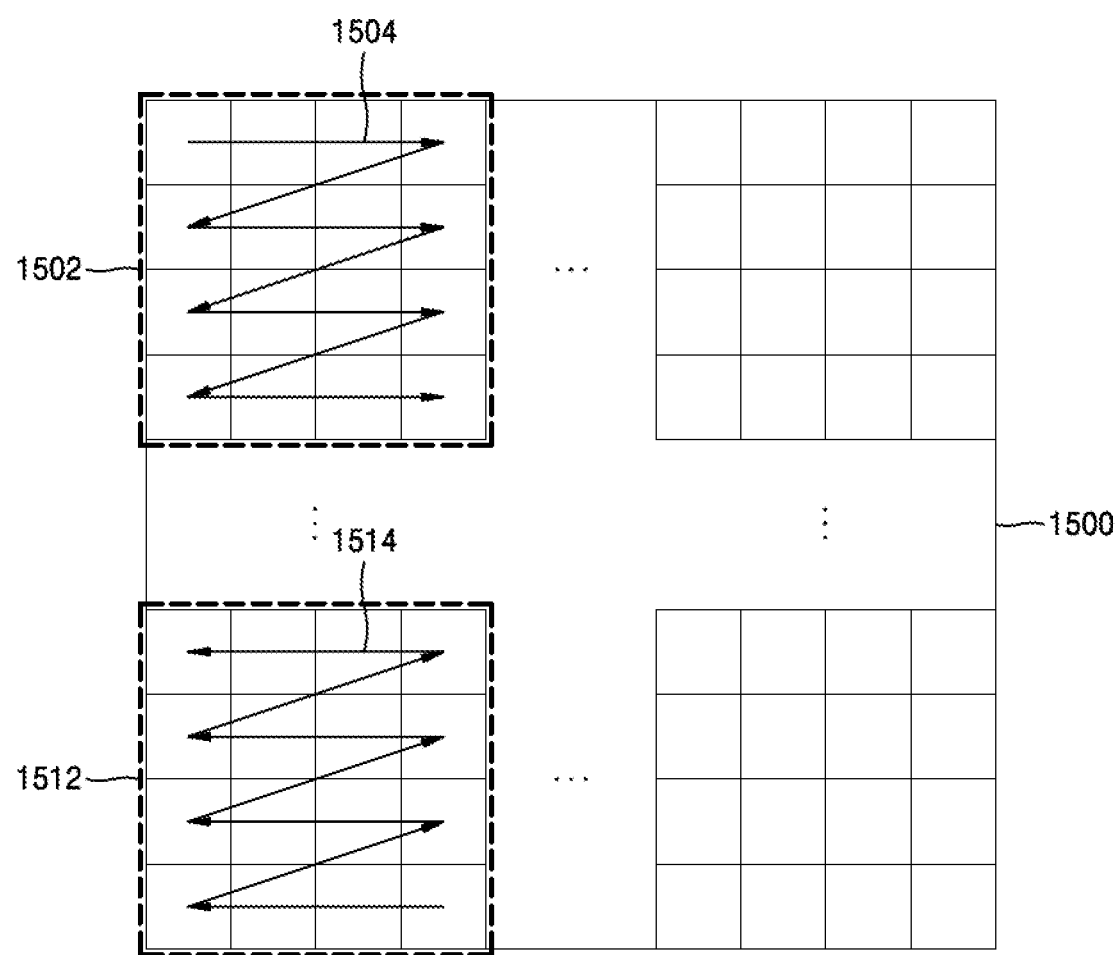
FIG. 15 illustrates a processing block serving as a unit for determining a determination order of reference coding units included in a picture, according to an embodiment.

FIG. 15 illustrates a processing block serving as a unit for determining a determination order of reference coding units included in a picture 1500 according to an embodiment.

According to an embodiment, the image decoding device 150 may determine one or more processing blocks split from a picture. The processing block is a data unit including one or more reference coding units split from an image, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan, Z-scan, N-scan, up-right diagonal scan, horizontal scan, and vertical scan, but is not limited to the above-mentioned scan orders.

According to an embodiment, the image decoding device 150 may obtain processing block size information and may determine the size of one or more processing blocks included in the image. The image decoding device 150 may obtain the processing block size information from a bitstream and may determine the size of one or more processing blocks included in the image. The size of processing blocks may be a certain size of data units, which is indicated by the processing block size information.

According to an embodiment, the receiver 160 of the image decoding device 150 may obtain the processing block size information from the bitstream according to each specific data unit. For example, the processing block size information may be obtained from the bitstream in a data unit such as an image, sequence, picture, slice, or slice segment. That is, the receiver 160 may obtain the processing block size information from the bitstream according to each of the various data units, the image decoding device 150 may determine the size of one or more processing blocks, which are split from the picture, by using the obtained processing block size information, and the size of the processing blocks may be integer times that of the reference coding units.

According to an embodiment, the image decoding device 150 may determine the size of processing blocks 1502 and 1512 included in the picture 1500. For example, the image decoding device 150 may determine the size of processing blocks based on the processing block size information obtained from the bitstream. Referring to FIG. 15, according to an embodiment, the image decoding device 150 may determine a width of the processing blocks 1502 and 1512 to be four times the width of the reference coding units, and may determine a height of the processing blocks 1502 and 1512 to be four times the height of the reference coding units. The image decoding device 150 may determine a determination order of one or more reference coding units in one or more processing blocks.

According to an embodiment, the image decoding device 150 may determine the processing blocks 1502 and 1512, which are included in the picture 1500, based on the size of processing blocks, and may determine a determination order of one or more reference coding units included in the processing blocks 1502 and 1512. According to an embodiment, determination of reference coding units may include determination of the size of the reference coding units.

According to an embodiment, the image decoding device 150 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding device 150 may obtain, from the bitstream, the determination order information of reference coding units according to each specific data unit. For example, the receiver 160 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding device 150 may determine one or more reference coding units based on the determined determination order.

According to an embodiment, the receiver 160 may obtain the determination order information of reference coding units from the bitstream as information related to the processing blocks 1502 and 1512, and the image decoding device 150 may determine a determination order of one or more reference coding units included in the processing blocks 1502 and 1512 and determine one or more reference coding units, which are included in the picture 1500, based on the determination order. Referring to FIG. 15, the image decoding device 150 may determine determination orders 1504 and 1514 of one or more reference coding units in the processing blocks 1502 and 1512, respectively. For example, when the determination order information of reference coding units is obtained with respect to each processing block, different kinds of the determination order information of reference coding units may be obtained for the processing blocks 1502 and 1512. When the determination order 1504 of reference coding units in the processing block 1502 is a raster scan order, reference coding units included in the processing block 1502 may be determined according to the raster scan order. On the contrary, when the determination order 1514 of reference coding units in the other processing block 1512 is a backward raster scan order, reference coding units included in the processing block 1512 may be determined according to the backward raster scan order.

A method of splitting an image into largest coding units and splitting a largest coding unit into coding units having a hierarchical tree structure has been described with reference to FIGS. 1 through 15. An ultimate motion vector expression (UMVE) mode for deriving a motion vector for inter prediction will be described with reference to FIGS. 16 through 28.

Inter prediction is a prediction method of predicting a current block from a reference block that is similar to the current block and is obtained from a reference picture of a current picture. In order to inter predict the current block, a motion vector indicating a spatial difference between the current block and the reference block and the reference picture referenced by the current picture are determined. The current block is predicted by referring to the determined reference block according to the motion vector and the reference picture. A UMVE mode of the present disclosure is an inter prediction mode for efficiently encoding and/or decoding a motion vector.

In a UMVE mode, a UMVE candidate list is determined from blocks spatially adjacent to a current block or blocks temporally adjacent to the current block. A base motion vector and a reference picture of the current block are determined from UMVE candidates of the current block selected from the UMVE candidate list. A motion vector of the current block is generated by correcting the base motion vector of the current block according to a correction distance and a correction direction.

Figure 16:
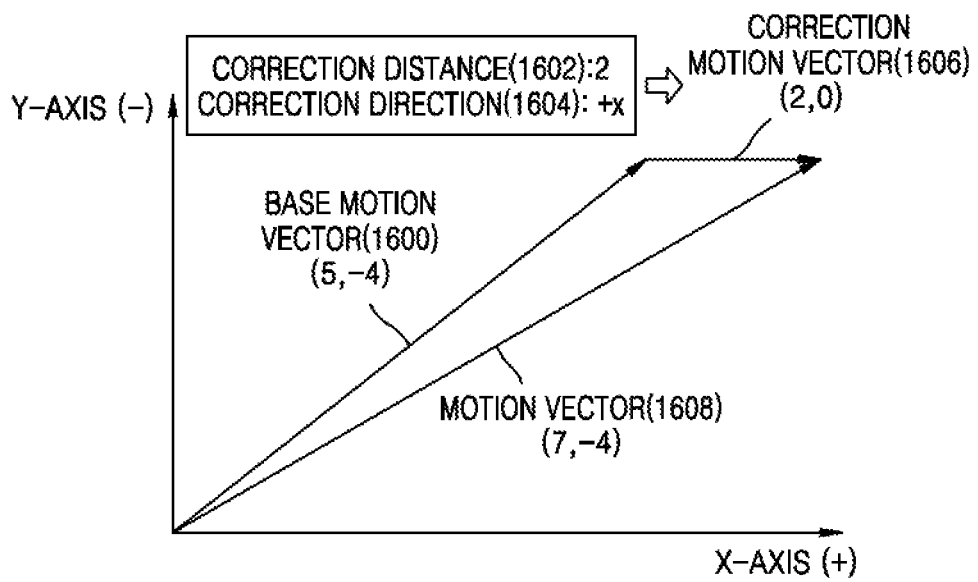
FIG. 16 is a diagram for describing an inter prediction method according to an ultimate motion vector expression (UMVE) mode.

Inter prediction according to a UMVE mode will be described in detail with reference to FIG. 16. Referring to FIG. 16, a base motion vector 1600 obtained from UMVE candidates of a current block is (5, −4). However, when a reference block indicated by the base motion vector 1600 is inaccurate, coding efficiency of the current block may be reduced. Accordingly, in the UMVE mode, the base motion vector 1600 may be corrected according to a correction distance 1602 and a correction direction 1604.

For example, when the correction distance 1602 is 2 and the correction direction 1604 is +x, a correction motion vector 1606 for correcting the base motion vector 1600 is determined to be (2, 0). A resultant vector (7, −4) of the base motion vector 1600 and the correction motion vector 1606 is determined as a motion vector 1608 of the current block. Accordingly, the current block may be predicted by using the motion vector 1608 indicating an accurate reference block. Accordingly, because the base motion vector 1600 is corrected in the UMVE mode, the accuracy of prediction may be improved.

In the UMVE mode, in order to reduce a size of information required to correct the base motion vector 1600, the correction distance 1602 and the correction direction 1604 have a limited number of candidates. For example, when the correction distance 1602 is determined from among eight correction distance candidates, correction distance information indicating the correction distance 1602 may be represented by using bits ranging from 1 bit to 7 bits according to truncated unary code. Likewise, when the correction direction 1604 is determined from among four correction direction candidates +x, −x, +y, and −y, correction direction information indicating the correction direction 1604 may be represented by using 2 bits. Accordingly, the number of bits required to determine the correction motion vector 1606 is limited to 9 bits. Hence, in the UMVE mode, because the number of bits required to determine the correction motion vector 1606 is limited to a certain number or less, compression efficiency may be improved.

Figure 17:
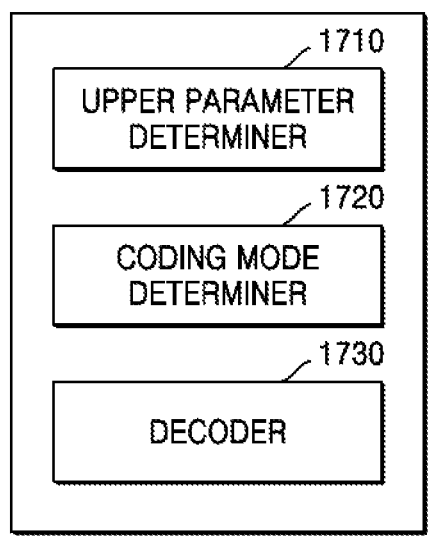
FIG. 17 is a block diagram of a video decoding device for performing decoding according to a UMVE mode.

FIG. 17 is a block diagram of a video decoding device 1700 for performing decoding according to a UMVE mode.

The video decoding device 1700 includes an upper parameter determiner 1710, a coding mode determiner 1720, and a decoder 1730. Although the upper parameter determiner 1710, the coding mode determiner 1720, and the decoder 1730 are separate elements in FIG. 17, according to an embodiment, the upper parameter determiner 1710, the coding mode determiner 1720, and the decoder 1730 may be implemented as one element.

Although the upper parameter determiner 1710, the coding mode determiner 1720, and the decoder 1730 are elements located in one device in FIG. 17, devices responsible for functions of the upper parameter determiner 1710, the coding mode determiner 1720, and the decoder 1730 do not need to be physically adjacent to one another. Accordingly, according to an embodiment, the upper parameter determiner 1710, the coding mode determiner 1720, and the decoder 1730 may be distributed.

The upper parameter determiner 1710, the coding mode determiner 1720, and the decoder 1730 may be implemented by using one processor according to an embodiment. Also, the upper parameter determiner 1710, the coding mode determiner 1720, and the decoder 1730 may be implemented by using a plurality of processors according to an embodiment.

The upper parameter determiner 1710 may determine whether a UMVE mode is allowed for an upper data unit of a current block. Examples of the upper data unit may include a sequence, a picture, a slice, and a slice segment of the current block. For example, the upper parameter determiner 1710 may determine whether the UMVE mode is allowed for a picture unit.

The upper parameter determiner 1710 may determine whether the UMVE mode is allowed for each upper data unit. For example, the upper parameter determiner 1710 may determine whether the UMVE mode is allowed for a current sequence. The upper parameter determiner 1710 may determine whether the UMVE mode is allowed for a current picture included in the current sequence. Likewise, the upper parameter determiner 1710 may determine whether the UMVE mode is allowed for a current slice included in the current picture.

When the UMVE mode is not allowed for the current sequence, the upper parameter determiner 1710 may determine that the UMVE mode is not allowed for all pictures included in the current sequence. Likewise, when the UMVE mode is not allowed for the current picture, the upper parameter determiner 1710 may determine that the UMVE mode is not allowed for all slices included in the current picture.

The upper parameter determiner 1710 obtains an UMVE enabled flag indicating whether the UMVE mode is allowed for the upper data unit of the current block from a bitstream. When the UMVE enabled flag indicates that the UMVE mode is allowed for the upper data unit, the coding mode determiner 1720 determines whether the UMVE mode is applied to all blocks included in the upper data unit. In contrast, when the UMVE enabled flag indicates that the UMVE mode is not allowed for the upper data unit, the coding mode determiner 1720 determines that the UMVE mode is not applied to all blocks included in the upper data unit.

When the UMVE enabled flag is 1, the UMVE enabled flag may be interpreted as allowing the UMVE mode for the upper data unit. In contrast, when the UMVE enabled flag is 0, the UMVE enabled flag may be interpreted as not allowing the UMVE mode for the upper data unit. According to an embodiment, the meaning of the UMVE enabled flag may be interpreted in the opposite way.

The upper parameter determiner 1710 may obtain the UMVE enabled flag for each upper data unit. When whether the UMVE mode is allowed is determined for each picture unit, the upper parameter determiner 1710 may obtain the UMVE enabled flag for each picture unit. However, when whether the UMVE mode is allowed is determined hierarchically in an order of a sequence unit, a picture unit, and a slice unit, the upper parameter determiner 1710 may obtain the UMVE enabled flag for the sequence unit, the UMVE enabled flag for the picture unit, and the UMVE enabled flag for the slice unit.

In another embodiment, the UMVE enabled flag may indicate whether a default setting of the UMVE mode is applied to the upper data unit. For example, when the UMVE enabled flag is 0, the UMVE enabled flag may be interpreted as applying the default setting of the UMVE mode to the upper data unit. In contrast, when the UMVE enabled flag is 1, the UMVE enabled flag may be interpreted as not applying the default setting of the UMVE mode to the upper data unit. When the UMVE enabled flag is not obtained, the upper parameter determiner 1710 may apply the default setting of the UMVE mode to the upper data unit.

The default setting of the UMVE mode may be to not allow the UMVE mode for the upper data unit. Alternatively, the default setting of the UMVE mode may be to apply only the UMVE mode to the upper data unit in a specific condition. The default setting of the UMVE mode may be differently set according to each sequence unit, picture unit, and slice unit.

The upper parameter determiner 1710 may determine whether the UMVE mode of the upper data unit is allowed without the UMVE enabled flag according to a specific condition. For example, when the current picture is a last picture of a group of pictures (GoP), the upper parameter determiner 1710 may apply the default setting of the UMVE mode to the upper data unit without the UMVE enabled flag. As another example, the upper parameter determiner 1710 may apply the default setting of the UMVE mode to the upper data unit without the UMVE enabled flag according to a temporal layer depth of the current picture.

The upper parameter determiner 1710 may determine whether another inter prediction mode is allowed according to whether the UMVE mode is allowed for the upper data unit. For example, when the UMVE mode is allowed according to the UMVE enabled flag, certain inter prediction modes may not be allowed for the upper data unit. The certain inter prediction modes may include a decoder-side motion vector derivation (DMVD) mode, a decoder-side motion vector refinement (DMVR) mode, a skip mode, a direct mode, and a merge mode.

For example, in the UMVE mode, information about a motion vector is obtained from the bitstream, while in the DMVD mode or the DMVR mode, a motion vector is derived without obtaining information about the motion vector from the bitstream. Accordingly, according to an embodiment, when the UMVE mode is allowed for the upper data unit, the upper parameter determiner 1710 may determine that the DMVD mode or the DMVR mode is not allowed for the upper data unit.

As another example, when the UMVE mode is allowed for the upper data unit, the upper parameter determiner 1710 may determine that the skip mode for skipping the information about the motion vector, the direct mode, and the merge mode are not allowed.

According to another embodiment, when the UMVE mode is allowed for the upper data unit, the upper parameter determiner 1710 may obtain enabled flags of the certain inter prediction modes from the bitstream for the upper data unit. According to another embodiment, when the UMVE mode is allowed for the upper data unit, the upper parameter determiner 1710 may not obtain enabled flags of the certain inter prediction modes and may apply a default setting of the certain inter prediction modes to the upper data unit. The certain inter prediction modes may include a decoder-side motion vector derivation (DMVD) mode, a decoder-side motion vector refinement (DMVR) mode, a skip mode, a direct mode, a merge mode, an overlapped block motion compensation (OBMC) mode, an illumination compensation (IC) mode, and an affine mode.

When the UMVE mode is allowed for the upper data unit, the upper parameter determiner 1710 may additionally obtain construction information about the UMVE mode applied to the upper data unit. Additional information about the UMVE mode obtained by the upper parameter determiner 1710 will now be described.

The upper parameter determiner 1710 may obtain UMVE candidate number information indicating the number of UMVE candidates of the UMVE mode allowed for the upper data unit from the bitstream. The decoder 1730 determines as many UMVE candidates as the number indicated by the UMVE candidate number information.

Also, the upper parameter determiner 1710 may obtain correction distance candidate number information indicating the number of correction distance candidates allowed for the upper data unit from the bitstream. The decoder 1730 determines as many correction distance candidates as the number indicated by the correction distance candidate number information.

Also, the upper parameter determiner 1710 may obtain correction direction candidate number information indicating the number of correction direction candidates allowed for the upper data unit from the bitstream. The decoder 1730 determines as many correction direction candidates as the number indicated by the correction direction candidate number information.

The UMVE candidate number information may indicate a difference between a minimum UMVE candidate number and a UMVE candidate number used in the upper data unit. For example, when the minimum UMVE candidate number is 4 and the UMVE candidate number used in the upper data unit is 5, the UMVE candidate number information may indicate 1. The correction distance candidate number information and the correction direction candidate number information may also indicate a difference between a minimum number and a candidate number used in the upper data unit, like the UMVE candidate number information.

The upper parameter determiner 1710 may obtain UMVE candidate list construction information indicating a method of constructing a UMVE candidate list from the bitstream. The UMVE candidate list construction information may indicate that the UMVE candidate list of the UMVE mode is constructed based on a motion vector candidate list used in the merge mode.

Alternatively, the UMVE candidate list construction information may indicate that the motion vector candidate list only for the UMVE mode is constructed. For example, the motion vector candidate list only for the UMVE mode may be constructed by statistically analyzing motion vector information used to decode the current picture. When a left block and an upper block of the current block are likely to be selected as UMVE candidates, the left block and the upper block of the current block may be preferentially included in the UMVE candidate list.

Alternatively, the UMVE candidate list construction information may indicate that a motion vector candidate list generated by combining the motion vector candidate list used in the merge mode and the motion vector candidate list only for the UMVE mode is constructed.

When the UMVE candidate list construction information may not be obtained or the UMVE candidate list is intrinsically determined, the upper parameter determiner 1710 selects a UMVE candidate list construction method according to the default setting.

The upper parameter determiner 1710 may obtain correction distance range information of a plurality of blocks of the upper data unit from the bitstream. The decoder 1730 determines a correction distance of a base motion vector based on a correction distance range indicated by the correction distance range information.

For example, the correction distance range information may indicate a minimum value of correction distance candidates. When the minimum value of the correction distance candidates indicated by the correction distance range information is 1 and the number of the correction distance candidates indicated by the correction distance number candidate information is 4, the correction distance candidates may be determined to be {1, 2, 4, 8}.

Also, the correction distance range information may indicate a size difference between the correction distance candidates. For example, the correction distance range information may indicate whether values of the correction distance candidates increase arithmetically or exponentially. When values of the correction distance candidates increase arithmetically, the correction distance candidates may be determined to be {1, 2, 3, 4, 5, . . . }. When values of the correction distance candidates increase exponentially, the correction distance candidates are determined to be {1, 2, 4, 8, 16, . . . }.

Also, the correction distance range information may indicate one from among a plurality of pre-determined correction distance candidate sets. For example, the correction distance range information may indicate one from among a first correction distance candidate set {1, 2, 4, 8}, a second correction distance candidate set {1, 2, 3, 4}, and a third correction distance candidate set {4, 8, 16, 32}.

The upper parameter determiner 1710 may obtain correction distance change information of the plurality of blocks of the upper data unit from the bitstream. The correction distance change information indicates whether a range of correction distance candidates changes according to a temporal distance between the current picture and a reference picture. Accordingly, when the correction distance change information indicates that the range of the correction distance candidates changes, the decoder 1730 may determine the range of the correction distance candidates according to the temporal distance between the current picture and the reference picture.

In general, when the current block refers to a reference block of the reference picture temporally far from the current picture, an error of the base motion vector is likely to be high. In contrast, when the current block refers to a reference block of the reference picture temporally close to the current picture, an error of the base motion vector is likely to be low. Hence, when a correction distance candidate set is determined in proportion to the temporal distance between the current picture and the reference picture, the accuracy of prediction of the motion vector may be improved.

For example, when the temporal distance between the current picture and the reference picture is small, the minimum value of the correction distance candidates may be determined to be ½. When the temporal distance between the current picture and the reference picture is intermediate, the minimum value of the correction distance candidates may be determined to be 1. When the temporal distance between the current picture and the reference picture is large, the minimum value of the correction distance candidates may be determined to be 2.

The temporal distance between the current picture and the reference picture may be determined according to one or more threshold values. For example, when the number of threshold values is 3, the minimum value of the correction distance candidates may be determined by comparing the temporal distance between the current picture and the reference picture with three threshold values.

The upper parameter determiner 1710 may determine the minimum value of the correction distance candidates of the upper data unit according to the temporal distance between the current picture and the reference picture and a correction distance candidate minimum value of the correction distance range information. In detail, because the correction distance candidate minimum value of the correction distance range information changes according to the temporal distance between the current picture and the reference picture, the minimum value of the correction distance candidates of the upper data unit may be determined.

When the correction distance change information may not be obtained or whether a correction distance changes is intrinsically determined, the upper parameter determiner 1710 determines whether the correction distance changes according to the default setting.

The upper parameter determiner 1710 may obtain prediction direction change permission information of the plurality of blocks of the upper data unit from the bitstream. The current block obtains information about a prediction direction of the reference picture along with information about the base motion vector from a UMVE candidate selected from the UMVE candidate list. When change of the prediction direction is not allowed according to the prediction direction change permission information, a prediction direction of the UMVE candidate is applied to the current block. However, in contrast, when change of the prediction direction is allowed according to the prediction direction change permission information, a prediction direction different from that of the UMVE candidate may be applied to the current block.

The prediction direction indicates one of list 0 uni-prediction, list 1 uni-prediction, and bi-prediction using both list 0 and list 1. While only one reference block of list 0 or list 1 is used for prediction of the current block in uni-prediction, both a reference block of list 0 and a reference block of list 1 are used in bi-prediction. Hence, the accuracy of bi-prediction is likely to be higher than that of uni-prediction. Accordingly, when change of the prediction direction is allowed, even if the UMVE candidate indicates uni-prediction, the prediction direction of the UMVE mode may be determined to be bi-prediction, thereby improving coding efficiency according to the UMVE mode.

Accordingly, when change of the prediction direction is allowed according to the prediction direction change permission information, the decoder 1730 may change a prediction direction of the current block. For example, when change of the prediction direction is allowed, even if the prediction direction of the UMVE candidate is list 0 uni-prediction, the prediction direction of the current block may be determined to be list 1 uni-prediction or bi-prediction.

The upper parameter determiner 1710 may obtain main prediction direction information of the upper data unit from the bitstream. The main prediction direction information indicates whether there is a main prediction direction of the upper data unit. Also, when there is a main prediction direction of the upper data unit, the main prediction direction information indicates the main prediction direction of the upper data unit. When the main prediction direction of the upper data unit is set, blocks which are included in the upper data unit and to which the UMVE mode is applied are predicted according to the main prediction direction. For example, when the main prediction direction is determined to be bi-prediction, blocks to which the UMVE mode is applied may be bi-predicted. Accordingly, even when the prediction direction of the UMVE candidate is uni-prediction, the prediction direction of the current block may be determined to be bi-prediction.

The upper parameter determiner 1710 may obtain both the prediction direction change permission information and the main prediction direction information. When the prediction direction change permission information indicates that change of the prediction direction is allowed and the main prediction direction information indicates that the main prediction direction is set, prediction direction information obtained by the decoder 1730 indicates whether the prediction direction of the current block is the main prediction direction. For example, when the main prediction direction is bi-prediction and the prediction direction information indicates that the prediction direction of the current block is the main prediction direction, the prediction direction of the current block is determined to be bi-prediction. When the main prediction direction is bi-prediction and the prediction direction information indicates that the prediction direction of the current block is not the main prediction direction, the prediction direction of the current block is determined to be list 0 uni-prediction or list 1 uni-prediction which is an auxiliary prediction direction according to the prediction direction information.

The upper parameter determiner 1710 may obtain multiple correction permission information indicating whether the corrected base motion vector may be corrected multiple times from the bitstream. When the base motion vector may be corrected multiple times according to the multiple correction permission information, the decoder 1730 may correct the base motion vector multiple times.

When the UMVE mode is allowed for the upper data unit, the coding mode determiner 1720 determines whether the UMVE mode is applied to the current block. The coding mode determiner 1720 may obtain a UMVE flag indicating whether the UMVE mode is applied to the current block from the bitstream. For example, when the UMVE flag indicates that the UMVE mode is applied to the current block, the coding mode determiner 1720 may determine that the prediction mode of the current block is the UMVE mode. In contrast, when the UMVE flag indicates that the UMVE mode is not applied to the current block, the coding mode determiner 1720 does not determine that the prediction mode of the current block is the UMVE mode.

When the UMVE mode is applied to the current block, the coding mode determiner 1720 may determine that another inter prediction mode is not applied to the current block. For example, when the UMVE mode is applied to the current block according to the UMVE flag, certain inter prediction modes may not be applied to the current block. The certain inter prediction modes may include a DMVD mode, a DMVR mode, a skip mode, a direct mode, a merge mode, an OBMC mode, an IC mode, and an affine mode. In contrast, when the UMVE mode is applied to the current block, the coding mode determiner 1720 may determine that a specific prediction mode is applied to the current block.

Also, when the UMVE mode is not applied to the current block, the coding mode determiner 1720 may determine that another intra prediction mode is to be applied to the current block. Examples of the other intra prediction mode may include a DMVD mode, a DMVR mode, a merge mode, an OBMC mode, an IC mode, and an affine mode.

When the UMVE mode is applied to the current block, the decoder 1730 may determine the base motion vector of the current block from the UMVE candidates. The decoder 1730 may determine the UMVE candidate list according to the UMVE candidate list construction method according to the UMVE candidate list construction information. The number of the UMVE candidates included in the UMVE candidate list may be determined according to the UMVE candidate number information.

The decoder 1730 may obtain a UMVE index indicating UMVE candidates including the reference picture and the base motion vector of the current block from the UMVE candidate list from the bitstream. The decoder 1730 may determine the reference picture and the base motion vector of the current block according to the UMVE index.

The decoder 1730 may determine the correction distance and the correction direction for correction of the base motion vector. The base motion vector is corrected for the accuracy of prediction in the UMVE mode. Accordingly, in order to determine a correction motion vector for correction of the base motion vector, the decoder 1730 determines a correction distance indicating a size of the correction motion vector and a correction direction indicating a direction of the correction motion vector.

The decoder 1730 may determine correction distance candidates according to the correction distance candidate number information, the correction distance range information, and the correction distance change information of the upper data unit. The decoder 1730 may determine the number of correction distance candidates according to the correction distance candidate number information. The decoder 1730 may determine a size difference between the correction distance candidates and a minimum value of the correction distance candidates according to the correction distance range information. Also, when the correction distance change information indicates change of a range of the correction distance candidates, the decoder 1730 may determine the range of the correction distance candidates according to a distance between the current picture and the reference picture. For example, the minimum value of the correction distance candidates may be changed by comparing the distance between the current picture and the reference picture with a certain threshold value. Accordingly, the range of the correction distance candidates may be determined according to the changed minimum value.

The decoder 1730 may obtain correction distance information indicating the correction distance of the base motion vector from the bitstream. The correction distance information indicates correction distance candidates corresponding to the correction distance of the base motion vector from among a certain number of correction distance candidates. The decoder 1730 may determine the correction distance of the base motion vector according to the correction distance candidates indicated by the correction distance information.

The decoder 1730 may determine correction direction candidates according to the correction direction candidate number information of the upper data unit. The decoder 1730 determines the correction direction from a certain number of correction direction candidates.

The decoder 1730 may obtain correction direction information indicating the correction direction of the base motion vector from the bitstream. The correction direction information indicates correction direction candidates corresponding to the correction direction of the base motion vector from among the certain number of correction direction candidates. The decoder 1730 may determine the correction direction of the base motion vector according to the correction direction candidates indicated by the correction direction information.

The decoder 1730 may determine the motion vector of the current block by correcting the base motion vector according to the determined correction distance and the determined correction direction. For example, when the correction distance is 2 and the correction direction is +x, a motion vector obtained by increasing an x-value by 2 from the base motion vector is used for prediction of the current block.

Figure 18:
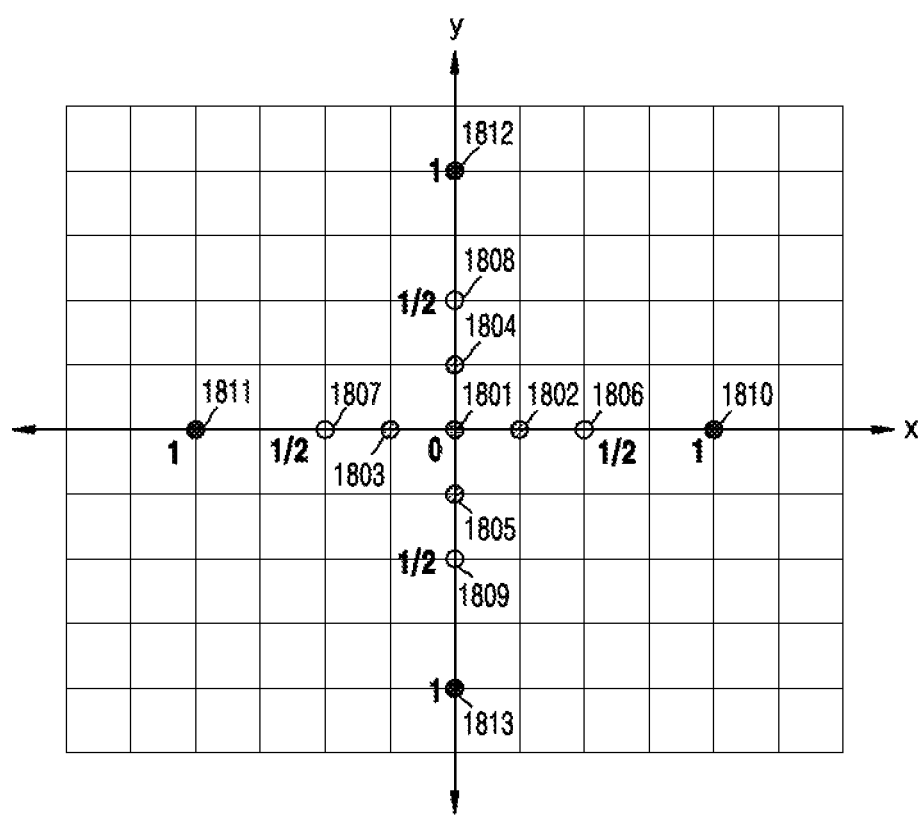
FIG. 18 illustrates motion vector candidates of a UMVE mode having a diamond distribution based on a base motion vector.
Figure 19:
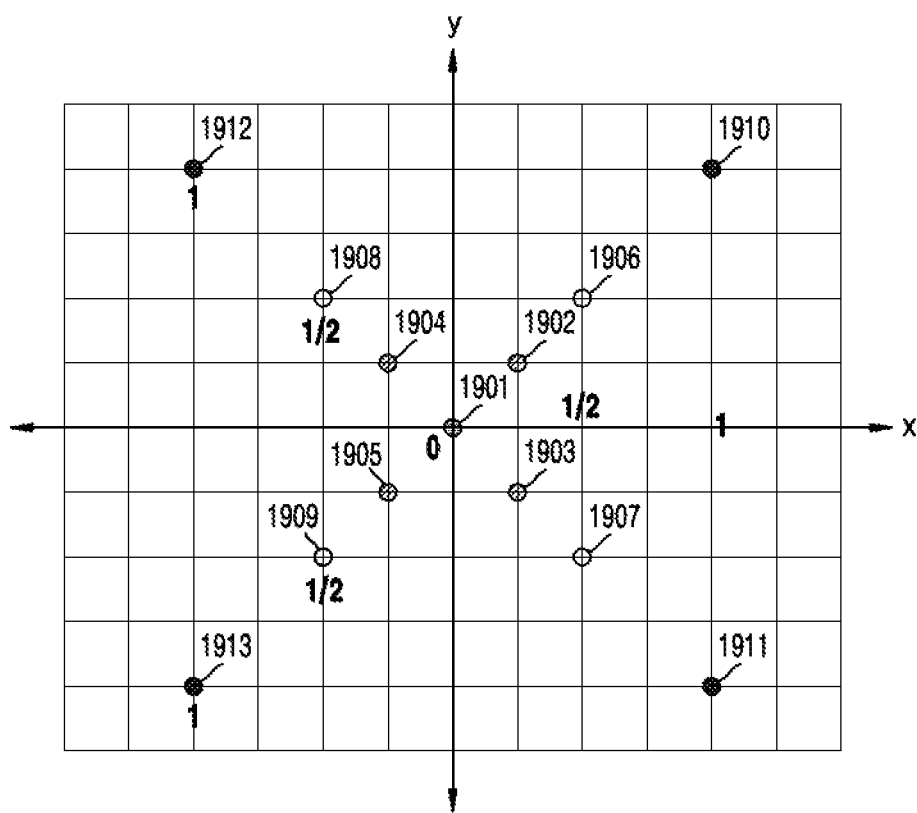
FIG. 19 illustrates motion vector candidates of a UMVE mode having a rectangular distribution based on a base motion vector.
Figure 20:
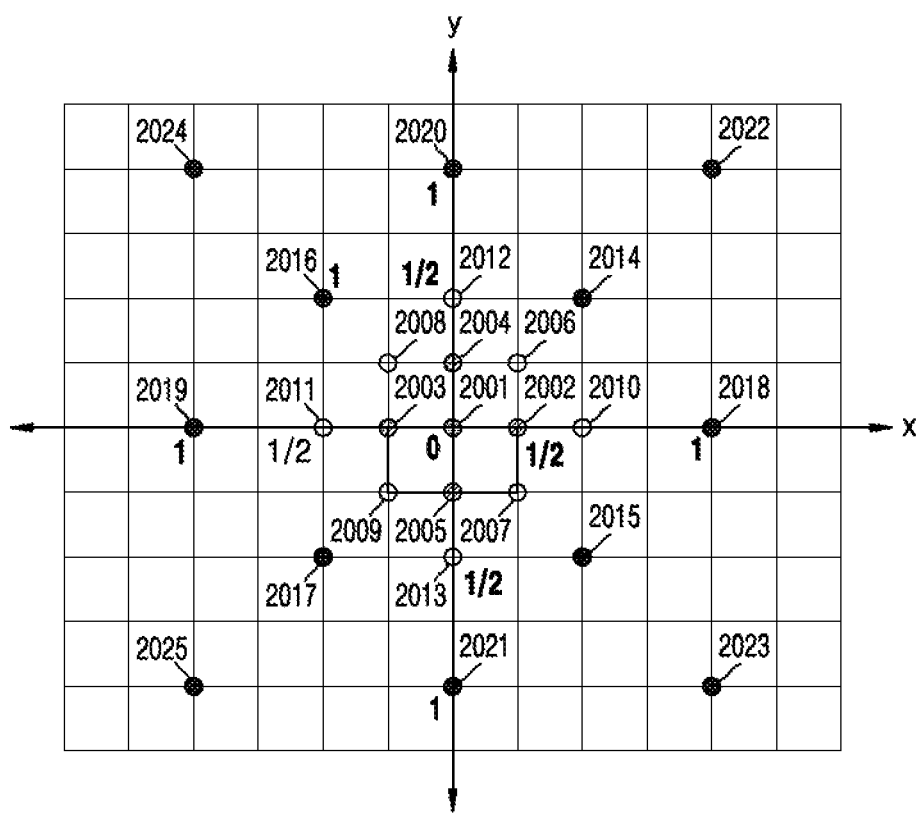
FIG. 20 is a diagram illustrating a UMVE mode having different numbers of motion vector candidates for each group, according to an embodiment.
Figure 21:
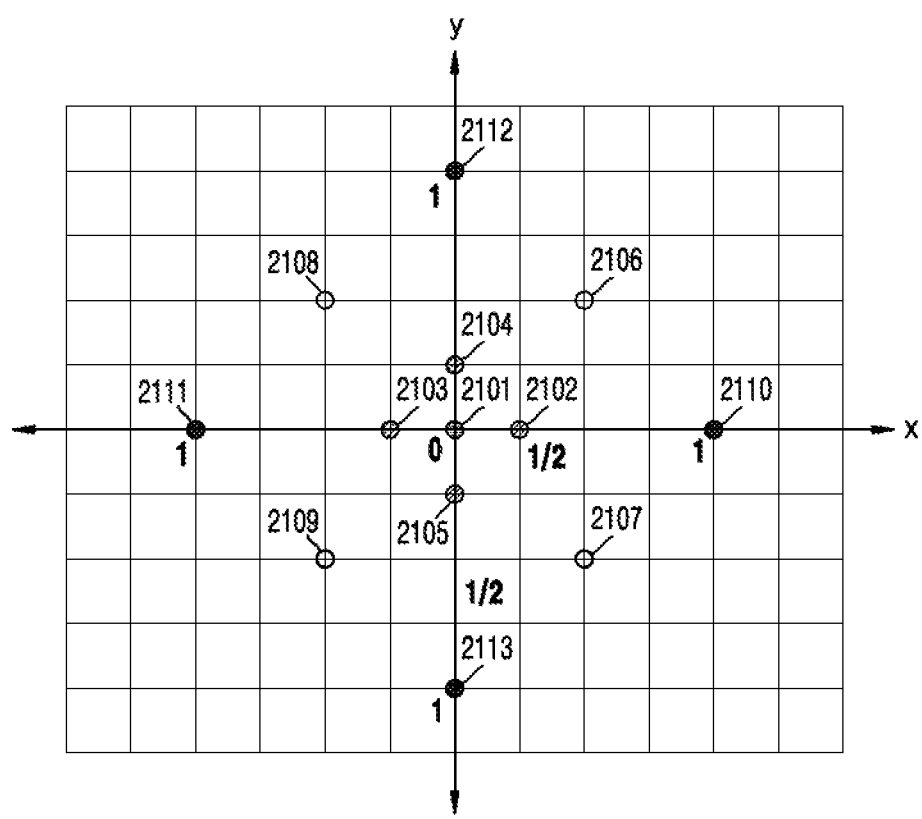
FIG. 21 is a diagram illustrating a UMVE mode having different distribution shapes of motion vector candidates for each group.

FIGS. 18 through 21 are diagrams for describing a process of determining a motion vector of a current block in a UMVE mode. In FIGS. 18 and 21, coordinates of a base motion vector are set to (base_x, base_y). A correction motion vector according to a correction distance and a correction direction of a UMVE mode is described based on (base_x, base_y).

Referring to FIG. 18, the decoder 1730 may determine motion vector candidates having a diamond distribution based on the base motion vector.

The decoder 1730 may determine motion vector candidates (base_x+¼, base_y) 1802, (base_x−¼, base_y) 1803, (base_x, base_y+¼) 1804, and (base_x, base_y−¼) 1805) at a ¼ pixel distance from a base motion vector (base_x, base_y) 1801 as a first candidate group.

The decoder 1730 may determine motion vector candidates (base_x+½, base_y) 1806, (base_x−½, base_y) 1807, (base_x, base_y+½) 1808, and (base_x, base_y−½) 1809 at a ½ pixel distance from the base motion vector (base_x, base_y) 1801 as a second candidate group.

The decoder 1730 may determine motion vector candidates (base_x+1, base_y) 1810, (base_x−1, base_y) 1811, (base_x, base_y+1) 1812, and (base_x, base_y−1) 1813 at a 1 pixel distance from the base motion vector (base_x, base_y) 1801 as a third candidate group.

The decoder 1730 may select one from among the first candidate group through the third candidate group according to a correction distance. The decoder 1730 may determine one motion vector candidate from among candidate groups according to the correction direction as a motion vector of a current block.

Referring to FIG. 19, the decoder 1730 may determine prediction motion vector candidates having a quadrangular distribution based on a base motion vector.

Likewise, the decoder 1730 may determine motion vector candidates (base_x+¼, base_y+¼) 1902, (base_x+¼, base_y−¼) 1903, (base_x−¼, base_y+¼) 1904, and (base_x−¼, base_y−¼) 1905 at a ¼ pixel distance from a base motion vector (base_x, base_y) 1901 as a first candidate group.

The decoder 1730 may determine motion vector candidates (base_x+½, base_y+½) 1906, (base_x+½, base_y−½) 1907, (base_x−½, base_y+½) 1908, and (base_x−½, base_y−½) 1909 at a ½ pixel distance from the base motion vector (base_x, base_y) 1901 as a second candidate group.

The decoder 1730 may determine motion vector candidates (base_x+1, base_y+1) 1910, (base_x+1, base_y−1) 1911, (base_x−1, base_y+1) 1912, and (base_x−1, base_y−1) 1913 at a 1 pixel distance from the base motion vector (base_x, base_y) 1901 as a third candidate group.

Referring to FIG. 20, the decoder 1730 may determine each group by using different numbers of motion vector candidates. Although an interval between pixels is a ¼ pixel distance, for convenience, component values of vector candidates are scaled four times.

In detail, the decoder 1730 may determine eight motion vector candidates (base_x+¼, base_y/4) 2002, (base_x−¼, base_y) 2003, (base_x, base_y+¼) 2004, (base_x, base_y−¼) 2005, (base_x+¼, base_y+¼) 2006, (base_x+¼, base_y−¼) 2007, (base_x−¼, base_y+¼) 2008, and (base_x−¼, base_y−¼) 2009 at a ¼ pixel distance from a base motion vector as a first candidate group.

Also, the decoder 1730 may determine eight motion vector candidates (base_x+½, base_y) 2010, (base_x−½, base_y) 2011, (base_x, base_y+½) 2012, (base_x, base_y−1/2) 2013, (base_x+½, base_y+½) 2014, (base_x+½, base_y−½) 2015, (base_x−½, base_y+½) 2016, and (base_x−½, base_y−½) 2017 at a ½ pixel distance from the base motion vector as a second candidate group.

The decoder 1730 may determine eight motion vector candidates (base_x+1, base_y) 2018, (base_x−1, base_y) 2019, (base_x, base_y+1) 2020, (base_x, base_y−1) 2021, (base_x+1, base_y+1) 2022, (base_x+1, base_y−1) 2023, (base_x−1, base_y+1) 2024, and (base_x−1, base_y−1) 2025 at a 1 pixel distance from the base motion vector as a third candidate group.

Referring to FIG. 21, the decoder 1730 may determine distribution shapes of motion vector candidates included in candidate groups according to the candidate groups in various ways. In detail, the decoder 1730 may determine motion vector candidates 2102, 2103, 2104, and 2105 having a diamond distribution based on a base motion vector 2101 as a first candidate group. Also, the decoder 1730 may determine motion vector candidates 2106, 2107, 2108, and 2109 having a quadrangular distribution based on the base motion vector 2101 as a second candidate group. Also, the decoder 1730 may determine motion vector candidates 2110, 2111, 2112, and 2113 having a diamond distribution based on the base motion vector 2101 as a third candidate group. As shown in FIG. 21, a distribution shape of motion vector candidates of each candidate group may be determined to be any of various distribution shapes in addition to those of FIG. 21.

The decoder 1730 may determine one or more base motion vectors. When there are two base motion vectors, motion vector candidates may be generated by using each of the base motion vectors.

The decoder 1730 may perform bi-prediction. When bi-prediction is performed on a base motion vector by using reference pictures of list 0 and list 1, motion vectors of each prediction direction may be corrected according to a temporal distance between a current picture and a reference picture.

For example, when the reference picture of list 0 and the reference picture of list 1 are located in the same direction from the current picture, correction directions of a base motion vector of list 0 and a base motion vector of list 1 are determined to be the same. In contrast, when the reference picture of list 0 and the reference picture of list 1 are located in opposite directions from the current picture, a correction direction of the base motion vector of list 0 is determined to be opposite to a correction direction of the base motion vector of list 1.

Also, a correction distance of the base motion vector of list 0 and a correction distance of the base motion vector of list 1 are determined in proportion to a temporal distance between the current picture and the current picture of list 0 and a temporal distance between the current picture and the reference picture of list 1. Accordingly, when the temporal distance between the current picture and the reference picture of list 0 is twice the temporal distance between the current picture and the reference picture of list 1, a correction distance of the base motion vector of list 0 is determined to be twice a correction distance of the base motion vector of list 0.

A correction distance and a correction direction indicated by correction distance information and correction direction information obtained from a bitstream may be applied to the base motion vector of list 0.

The correction distance and the correction direction used for correction of the base motion vector of list 0 may be changed in consideration of a distance between the current picture and the reference picture of list 0 and a distance between the current picture and the reference picture of list 1. The changed correction distance and the changed correction direction may be applied to the base motion vector of list 1.

According to an embodiment, in contrast, the correction distance and the correction direction indicated by the correction distance information and the correction direction information may be applied to the base motion vector of list 1, and the changed correction distance and the changed correction direction may be applied to the base motion vector of list 0.

FIG. 22 illustrates a method of correcting two base motion vectors according to bi-prediction according to an embodiment. In FIG. 22, a base motion vector 2202 of list 0 is (0, −1). A base motion vector 2212 of list 1 is (0, 2).

A correction distance and a correction direction in a UMVE mode are applied to both the base motion vector 2202 of list 0 and the base motion vector 2212 of list 1. When the correction distance for the base motion vector 2202 of list 0 is 1 and the correction direction for the base motion vector 2202 is −y, a motion vector 2204 of list 0 becomes (0, −2).

A reference picture of list 0 and a reference picture of list 1 are located in opposite directions from a current picture. Accordingly, the correction direction of the base motion vector 2212 of list 1 is determined to be opposite to the correction direction of the base motion vector 2202 of list 0. Hence, the correction direction of the base motion vector 2212 of list 1 is determined to be +y.

The reference picture of list 0 and the reference picture of list 1 are located at the same temporal distance from the current picture. Accordingly, the correction distance of the base motion vector 2212 of list 1 is determined to be the same as the correction distance of the base motion vector 2202 of list 0. Hence, the correction distance of the base motion vector 2212 of list 1 is determined to be 1.

Accordingly, the motion vector 2214 of list 1 is determined to be (0, 3) whose y component is greater by 1 from that of the base motion vector 2212 of list 1.

When the correction distance of the base motion vector 2202 of list 0 is 2, a motion vector 2206 of list 0 is determined to be (0, −3), and a motion vector 2216 of list 1 is determined to be (0, 4). Also, when the correction distance of the base motion vector 2202 of list 0 is 4, a motion vector 2208 of list 0 is determined to be (0, −5) and a motion vector 2218 of list 1 is determined to be (0, 6).

When change of a prediction direction is allowed according to prediction direction change permission information, the decoder 1730 may obtain prediction direction information from a bitstream and may change a prediction direction of a current block according to the prediction direction information. The prediction direction information may indicate whether to change the prediction direction. When the prediction direction information does not indicate change of the prediction direction, the current block is predicted according to a prediction direction of a UMVE candidate.

However, when the prediction direction information indicates change of the prediction direction, the current block is predicted according to a prediction direction different from that of the UMVE candidate.

Additionally, the prediction direction information may indicate a changed prediction direction. For example, when the prediction direction of the UMVE candidate is list 0 uni-prediction, the prediction direction information may indicate one of list 1 uni-prediction and bi-prediction. Accordingly, the prediction direction information may indicate whether the prediction direction changes and the changed prediction direction.

When the prediction direction does not change, the prediction direction information may be set to 0. When the prediction direction changes, the prediction direction information may be set to 10 or 11 according to the changed prediction direction. For example, when the prediction direction of the UMVE candidate is list 0 uni-prediction and the prediction direction of the current block is list 0 uni-prediction, the prediction direction information may be set to 0.

When the prediction direction of the current block is bi-prediction or list 1 uni-prediction, the prediction direction information may be set to 10 or 11. According to an embodiment, when the prediction direction of the UMVE candidate is uni-prediction and the prediction direction of the current block is bi-prediction, the prediction direction information may be set to 10. According to an embodiment, when the prediction direction of the UMVE candidate is uni-prediction and the prediction direction of the current block is uni-prediction of another direction, the prediction direction information may be set to 11.

As another example, when the prediction direction of the UMVE candidate is list 1 uni-prediction and the prediction direction of the current block is list 1 uni-prediction, the prediction direction information may be set to 0.

When the prediction direction of the current block is bi-prediction or list 0 uni-prediction, the prediction direction information may be set to 10 or 11. According to an embodiment, when the prediction direction of the UMVE candidate is uni-prediction and the prediction direction of the current block is bi-prediction, the prediction direction information may be set to 10. According to an embodiment, when the prediction direction of the UMVE candidate is uni-prediction and the prediction direction of the current block is uni-prediction of another direction, the prediction direction information may be set to 11.

As another example, when the prediction direction of the UMVE candidate is bi-prediction and the prediction direction of the current block is bi-prediction, the prediction direction information may be set to 0.

When the prediction direction of the current block is list 0 uni-prediction or list 1 uni-prediction, the prediction direction information may be set to 10 or 11. According to an embodiment, when the prediction direction of the UMVE candidate is bi-prediction and the prediction direction of the current block is list 0 uni-prediction, the prediction direction information may be set to 10. According to an embodiment, when the prediction direction of the UMVE candidate is bi-prediction and the prediction direction of the current block is list 1 uni-prediction, the prediction direction information may be set to 11.

When the prediction direction information indicates change of the prediction direction, the decoder 1730 may change a motion vector of the UMVE candidate according to the changed prediction direction. For example, when the prediction direction of the UMVE candidate is list 0 uni-prediction and the prediction direction of the current block is list 1 uni-prediction, a motion vector of list 0 is corrected to be suitable for prediction according to the reference picture of list 1. In detail, the motion vector of list 0 may be modified by being scaled according to a ratio between a temporal distance between the current picture and the reference picture of list 0 and a temporal distance between the current picture and the reference picture of list 1.

For example, when the motion vector of list 0 is (8, 6) and the ratio between the temporal distance between the current picture and the reference picture of list 0 and the temporal distance between the current picture and the reference picture of list 0 is 2:1, a motion vector of list 1 may be determined to be (4, 3). When the ratio between the temporal distances is 2:−1, that is, when the reference picture of list 1 and the reference picture of list 0 are located in different directions from the current picture, the motion vector of list 1 may be determined to be (−4, −3).

When the prediction direction of the UMVE candidate is list 0 uni-prediction and the prediction direction of the current block is bi-prediction, the motion vector of list 1 may be obtained based on the motion vector of list 0 of the UMVE candidate. The motion vector of list 1 may be obtained by scaling a motion vector of the reference picture of list 0 according to the ratio between the temporal distance between the current picture and the reference picture of list 0 and the temporal distance between the current picture and the reference picture of list 1. The reference picture of list 1 may be determined to be a picture located at a specific order of list 1. The motion vector and the reference picture of list 0 and the motion vector and the reference picture of list 1 may all be used for prediction of the current block.

Likewise, even when the prediction direction of the UMVE candidate is list 1 uni-prediction and the prediction direction of the current block is bi-prediction, the motion vector of list 0 may be obtained from the motion vector of list 1. The reference picture of list 0 may be determined to be a picture located at a specific order of list 0. The motion vector and the reference picture of list 0 and the motion vector and the reference picture of list 1 may all be used for prediction of the current block.

When the prediction direction of the UMVE candidate is bi-prediction and the prediction direction of the current block is list 0 uni-prediction, the current block is predicted by using only the motion vector and the reference picture of list 0 from among the motion vector and the reference picture of list 0 and the motion vector and the reference picture of list 1. In contrast, when the prediction direction before change is bi-prediction and the changed prediction direction is list 1 uni-prediction, the current block is predicted by using only the motion vector and the reference picture of list 1 from among the motion vector and the reference picture of list 0 and the motion vector and the reference picture of list 1.

When main prediction direction information is obtained, the decoder 1730 may change the motion vector of the UMVE candidate according to a main prediction indication indicated by the main prediction direction information. When the main prediction direction of the current picture and a reference prediction direction of the UMVE candidate are the same, the current block is predicted according to the motion vector and the reference picture of the UMVE candidate. However, when the main prediction direction of the current picture and a reference prediction direction of the UMVE candidate are different from each other, the motion vector of the UMVE candidate changes according to the main prediction direction. Change of the motion vector and the reference picture of the UMVE candidate according to the main prediction direction is performed in the same manner as change of the motion vector and the reference picture of the UMVE candidate according to the prediction direction information.

According to an embodiment, when the main prediction direction information is obtained and change of the prediction direction is allowed according to prediction direction change permission information, the decoder 1730 may change the prediction direction of the current block according to the prediction direction information. When the main prediction direction information is set, the prediction direction information indicates the prediction direction of the current block from among the main prediction direction and two auxiliary prediction directions. When the prediction direction information indicates the main prediction direction, the current block is predicted according to the main prediction direction. However, when the prediction direction information indicates an auxiliary prediction direction, the current block is predicted according to the prediction direction indicated by the prediction direction information from among the two auxiliary prediction directions. When the main prediction direction information is set, in the prediction direction information, 0 may be allocated to the main prediction direction, 10 may be applied to a first auxiliary prediction direction, and 11 may be allocated to a second auxiliary prediction direction. The two auxiliary prediction directions for the main prediction direction may be determined according to an embodiment by using various methods.

When a base motion vector may be corrected multiple times according to multiple correction permission information, the decoder 1730 may correct a corrected base motion vector once more. Accordingly, the decoder 1730 may obtain additional correction distance information and additional correction direction information from a bitstream. The decoder 1730 may correct the base motion vector once more based on an additional correction distance determined according to the additional correction distance information and an addition correction direction determined according to the additional correction direction information.

When the correction distance is equal to or greater than a threshold value, the decoder 1730 may obtain the additional correction distance information and the additional correction direction information. The additional correction distance and the additional correction direction respectively indicated by the additional correction distance information and the additional correction direction information may be limited according to the correction distance and the correction direction. For example, the additional correction distance may be determined to be less than the correction distance. Alternatively, the additional correction direction may be determined to be different from the correction direction.

The decoder 1730 may reconstruct the current block based on a motion vector and a reference picture of the current block. When the prediction direction of the current block is list 0 uni-prediction or list 1 uni-prediction, the decoder 1730 may predict the current block by using one motion vector and one reference picture. When the prediction direction of the current block is bi-prediction, the decoder 1730 may predict the current block by using the motion vector and the reference picture of list 0 and the motion vector and the reference picture of list 1.

The decoder 1730 may reconstruct the current block according to a prediction result of the current block. The decoder 1730 may reconstruct the current block according to a residual block of the current block and a prediction block.

The residual block of the current block indicates a difference value between the prediction block and a reconstruction block of the current block.

UMVE candidate number information of UMVE candidates decoded by the video decoding device 1700, correction distance candidate number information, correction direction candidate number information, UMVE candidate list construction information, correction distance range information, main prediction direction information, UMVE index, correction distance information, and correction direction information, prediction direction information, additional correction distance information, and additional correction direction information may be binarized according to fixed length coding or truncated unary coding.

Functions of the upper parameter determiner 1710, the coding mode determiner 1720, and the decoder 1730 may be performed by the decoder 170 of FIG. 1B.

FIGS. 23 through 25 illustrate a method of selecting an inter mode tool for a reference picture and a motion vector of a current block according to an embodiment. FIGS. 23 through 25 each illustrate a syntax structure of a coding unit. According to a syntax structure according to an embodiment, when a skip mode or a direct mode is applied to a current block, a UMVE mode may be selected. ae(v) in FIGS. 23 through 25 denotes that syntax elements of the same row are entropy decoded. Accordingly, cu_skip_flag [x0][y0] and cu_skip_umve[x0] [y0] of FIG. 23, cu_direct [x0] [y0] and affine_dir[x0] [y0] of FIG. 24, and cu_direct [x0][y0] and cu_direct_umve[x0][y0] of FIG. 25 entropy decoded.

A method of selecting an inter mode tool of the current block in the skip mode is illustrated in FIG. 23. In the skip mode, most pieces of encoding information required to reconstruct the current block are skipped and the current block is reconstructed by using only some pieces of encoding information. Accordingly, because encoding information required to reconstruct the current block is skipped, coding efficiency may be improved.

According to the embodiment of FIG. 23, the inter mode tool may be used in the skip mode. According to an embodiment, in the skip mode, a umve mode, an affine mode, and a merge mode may be used. According to an embodiment, cu_skip_flag[x0][y0] indicating whether the sip mode is applied to the current block is obtained. When the skip mode is applied to the current block (if(cu_skip-_flag[x0][y0])), cu_skip_umve[x0][y0] indicating whether the inter mode tool of the current block is the umve mode is obtained. When the umve mode is applied to the current block (if(cu_skip_umve[x0][y0]), cu_mode=SKIP_UMVE), information about an adjacent block including a reference picture and a base motion vector of a current picture, and correction distance information and correction direction information about correction of the base motion vector are obtained (mvp_idx_umve(x0, y0, identical_list0_list1 flag)). When the umve mode is not applied to the current block, the affine mode (cu_mode=SKIP_AFFINE) or the merge mode (cu_mode =SKIP) may be applied to the current block.

In the embodiment of FIG. 23, whether a mode is applied is determined in an order of the umve mode, the affine mode, and the merge mode. However, one of ordinary skill in the art may easily change a type of the inter mode tool used in the skip mode. Also, one of ordinary skill in the art may change a determination order of the inter mode tool used in the skip mode.

FIG. 24 illustrates a method of selecting an inter mode tool of a current block in a direct mode, when a slice type of a current slice including the current block is P-type. In the direct mode, some pieces of encoding information required to determine a motion vector of the current block are skipped. Accordingly, because encoding information required to determine the motion vector of the current block is reduced, coding efficiency may be improved.

According to the embodiment of FIG. 24, when the slice type of the current slice is P-type, a umve mode and an affine mode may be used in the direct mode. According to an embodiment, cu_direct[x0][y0] indicating whether the direct mode is applied to the current block is obtained. When the direct mode is applied to the current block (if(cu_direct [x0][y0])), affine_dir[x0] [y0] indicating whether the inter mode tool of the current block is the affine mode is obtained. When the affine mode is not applied to the current block (if(!affine_dir[x0][y0])), it is determined that the umve mode is applied to the current block (cu_mode=DIR_UMVE). When the umve mode is applied to the current block, information about an adjacent block including a reference picture and a base motion vector of a current picture and correction distance information and correction direction information about correction of the base motion vector are obtained (mvp_idx_umve(x0, y0, identical_list0_list1 flag)).

In the embodiment of FIG. 24, whether a mode is applied is determined in an order of the affine mode and the umve mode. However, one of ordinary skill in the art may easily change a type of the inter mode tool used in the direct mode. Also, one of ordinary skill in the art may change a determination order of the inter mode tool used in the direct mode.

FIG. 25 illustrates a method of selecting an inter mode tool of a current block in a direct mode, when a slice type of a current slice including the current block is B-type.

According to the embodiment of FIG. 25, when the slice type of the current slice is B-type, a umve mode, an affine mode, and a merge mode may be used. According to an embodiment, cu_direct[x0] [y0] indicating whether the direct mode is applied to the current block is obtained. When the direct mode is applied to the current block (if(cu_direct [x0] [y0])), cu_direct_umve[x0] [y0] indicating whether the inter mode tool of the current block is the umve mode is obtained. When the umve mode is applied to the current block (if(cu_direct_umve[x0] [y0]), cu_mode=DIR_UMVE), information about an adjacent block including a reference picture and a base motion vector of a current picture and correction distance information and correction direction information about correction of the base motion vector are obtained (mvp_idx_umve(x0, y0, identical_list0_list1 flag)). When the umve mode is not applied to the current block, the affine mode (cu_mode=DIR_AFFINE) or the merge mode (cu_mode=DIR) may be applied to the current block.

In the embodiment of FIG. 25, whether a mode is applied is determined in an order of the umve mode, the affine mode, and the merge mode. However, one of ordinary skill in the art may easily change a type of the inter mode tool used in the direct mode. Also, one of ordinary skill in the art may change a determination order of the inter mode tool used in the direct mode.

Figure 26:
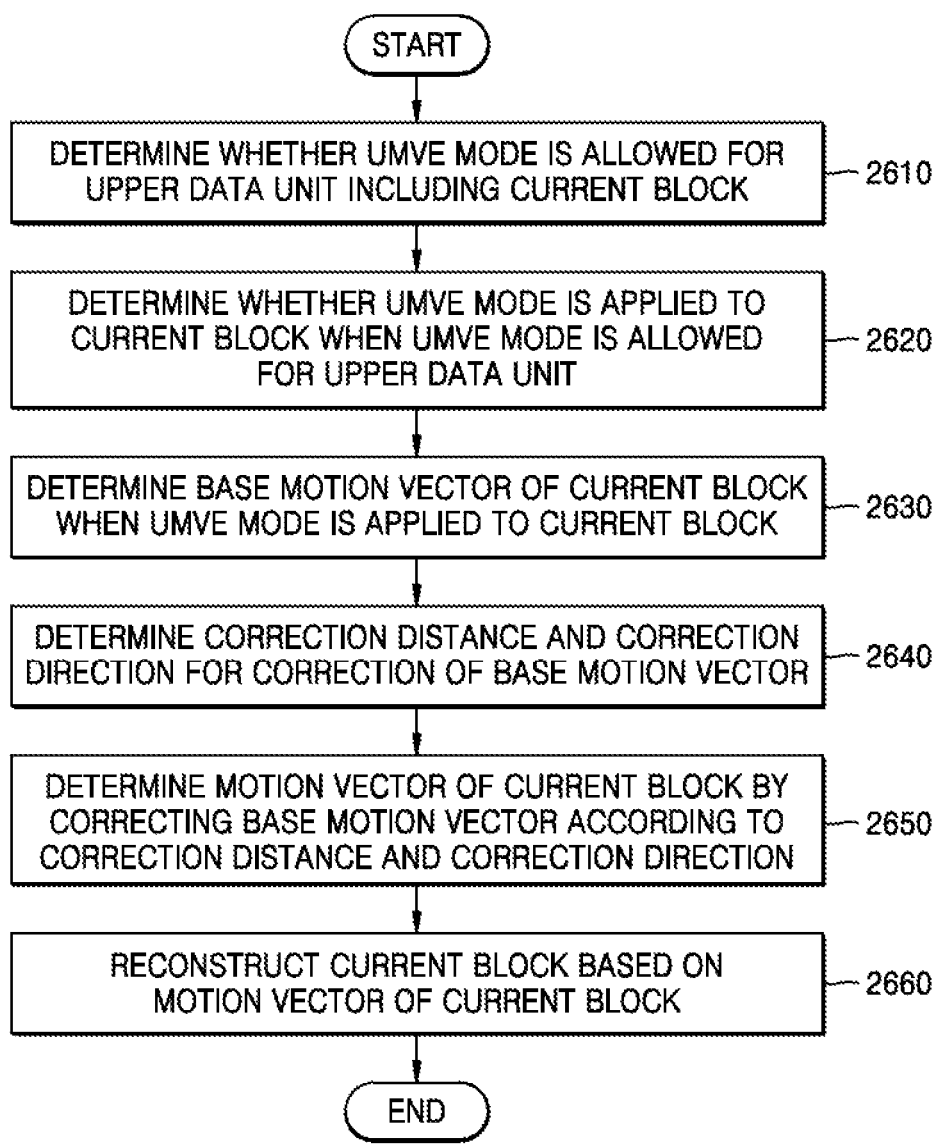
FIG. 26 is a flowchart of a decoding method according to a UMVE mode.

FIG. 26 is a flowchart of a decoding method according to a UMVE mode of the video decoding device 1700 of FIG. 17.

In operation 2610, it is determined whether a UMVE mode is allowed for an upper data unit including a current block. Whether the UMVE mode is allowed for the upper data unit may be determined according to a UMVE enabled flag obtained from a bitstream.

When the UMVE mode is allowed for the upper data unit, UMVE candidate number information indicating the number of UMVE candidates of the UMVE mode allowed for the upper data unit and UMVE candidate list construction information indicating a method of constructing a motion vector candidate list referenced by a plurality of blocks of the upper data unit may be obtained.

Correction distance candidate number information indicating the number of correction distance candidates may be obtained from the bitstream. Correction distance range information of the plurality of blocks of the upper data unit may be obtained. Also, correction distance change information of the plurality of blocks of the upper data unit may be obtained.

Correction direction candidate number information indicating the number of correction direction candidates may be obtained from the bitstream.

Prediction direction change permission information of the plurality of blocks of the upper data unit may be obtained from the bitstream. Main prediction direction information indicating a main prediction direction of the upper data unit may be obtained from the bitstream.

In operation 2620, when the UMVE mode is allowed for the upper data unit, it is determined whether the UMVE mode is applied to the current block. Whether the UMVE mode is applied to the current block may be determined according to a UMVE flag obtained from the bitstream. When the UMVE mode is not applied to the current block, an inter prediction mode other than the UMVE mode may be applied to the current block.

The number of UMVE candidates of the current block indicated by the UMVE candidate number information may be determined. A method of constructing a UMVE candidate list may be determined according to the UMVE candidate list construction information. The UMVE candidate list of the current block may be constructed according to the number of UMVE candidates and the method of constructing the UMVE candidate list.

Also, the number of correction distance candidates of the current block indicated by the correction distance candidate number information may be determined. Correction distance candidates may be determined based on a correction distance range indicated by the correction distance range information. Also, when the correction distance change information indicates that a correction distance of a base motion vector adaptively changes according to a distance between a current picture and a reference picture of the current block, the correction distance range may change according to the distance between the current picture and the reference picture of the current block.

Also, the number of correction direction candidates of the current block indicated by the correction direction candidate number information may be determined.

When the UMVE mode is applied to the current block and the prediction direction change permission information indicates that change of a prediction direction is allowed, prediction direction information may be obtained from the bitstream.

In operation 2630, when the UMVE mode is applied to the current block, the base motion vector of the current block is determined. A UMVE candidate is determined in the determined UMVE candidate list. The reference picture and the base motion vector may be extracted from an adjacent block of the current block indicated by the UMVE candidate.

In operation 2640, a correction distance and a correction direction for correction of the base motion vector are determined. The correction distance of the base motion vector may be determined from among the correction distance candidates according to the correction distance information obtained from the bitstream. The correction direction of the base motion vector may be determined from among the correction direction candidates according to the correction direction information obtained from the bitstream.

The corrected base motion vector may be additionally corrected according to an additional correction distance and an additional correction direction. According to an embodiment, when the correction distance is equal to or greater than a threshold value, additional correction of the base motion vector may be performed. The additional correction distance may be determined to be less than the correction distance.

In operation 2650, a motion vector of the current block is determined by correcting the base motion vector according to the correction distance and the correction direction. The motion vector and the reference picture of the current block may be changed according to the prediction direction indicated by the prediction direction information. When the main prediction direction is determined for the upper data unit, the prediction direction information may indicate a prediction direction of the current block from among the main prediction direction and two auxiliary prediction directions. When the main prediction direction is not determined for the upper data unit, the prediction direction information may indicate the prediction direction of the current block from among a prediction direction of the UMVE candidate and remaining two prediction directions.

In operation 2660, the current block is reconstructed based on the motion vector of the current block.

An inter prediction method according to a UMVE mode performed by the video decoding device 1700 of FIG. 17 may be applied to the decoding method according to a UMVE mode of FIG. 26.

Figure 27:
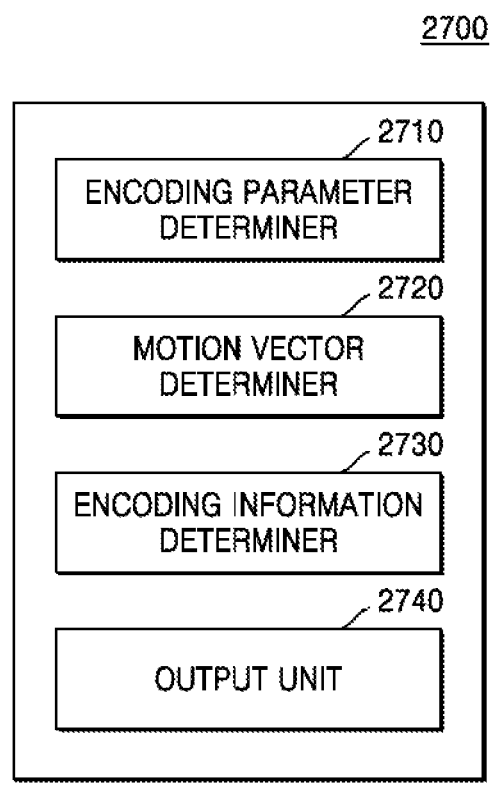
FIG. 27 is a block diagram of a video encoding device for performing inter prediction according to a UMVE mode.

FIG. 27 is a block diagram of a video encoding device 2700 for performing inter prediction according to a UMVE mode.

The video encoding device 2700 includes an encoding parameter determiner 2710, a motion vector determiner 2720, an encoding information determiner 2730, and an output unit 2740. Although the encoding parameter determiner 2710, the motion vector determiner 2720, the encoding information determiner 2730, and the output unit 2740 are separate elements in FIG. 27, according to an embodiment, the encoding parameter determiner 2710, the motion vector determiner 2720, the encoding information determiner 2730, and the output unit 2740 may be implemented as one element.

Although the encoding parameter determiner 2710, the motion vector determiner 2720, the encoding information determiner 2730, and the output unit 2740 are elements in one device in FIG. 27, devices responsible for functions of the encoding parameter determiner 2710, the motion vector determiner 2720, the encoding information determiner 2730, and the output unit 2740 do not need to be physically adjacent to one another. Accordingly, according to an embodiment, the encoding parameter determiner 2710, the motion vector determiner 2720, the encoding information determiner 2730, and the output unit 2740 may be distributed.

The encoding parameter determiner 2710, the motion vector determiner 2720, the encoding information determiner 2730, and the output unit 2740 may be implemented by using one processor according to an embodiment. Also, the encoding parameter determiner 2710, the motion vector determiner 2720, the encoding information determiner 2730, and the output unit 2740 may be implemented by using a plurality of processors according to an embodiment.

The encoding parameter determiner 2710 determines whether a UMVE mode is allowed for an upper data unit including a current block. The encoding parameter determiner 2710 may determine whether the UMVE mode is allowed according to a frequency of using the UMVE mode in the upper data unit. Alternatively, the encoding parameter determiner 2710 may determine whether the UMVE mode is allowed according to characteristics of an image.

The motion vector determiner 2720 determines a motion vector of the current block. The motion vector determiner 2720 may obtain a plurality of motion vectors from neighboring blocks around the current block. The motion vector determiner 2720 may determine the motion vector of the current block by scanning surroundings of the plurality of motion vectors. The motion vector determiner 2720 may determine an optimal motion vector as the motion vector of the current block according to rate-distortion optimization.

When the UMVE mode is allowed for the upper data unit, the encoding information determiner 2730 determines whether the UMVE mode is applied to the current block according to the motion vector. The encoding information determiner 2730 may determine whether the motion vector of the current block determined by the motion vector determiner 2720 may be derived by using the UMVE mode. When the motion vector of the current block may be derived by using the UMVE mode, the encoding information determiner 2730 may determine to apply the UMVE mode to the current block. Alternatively, when a minimum error between the motion vector of the current block and the motion vector according to the UMVE mode is equal to or less than a threshold value, the encoding information determiner 2730 may determine to apply the UMVE mode to the current block.

When the UMVE mode is applied to the current block, the encoding information determiner 2730 determines a base motion vector of the current block and a correction distance and a correction direction for correction of the base motion vector according to the motion vector of the current block. The encoding information determiner 2730 may determine the correction distance and the correction direction according to a difference between the motion vector of the current block and the base motion vector of the current block.

The output unit 2740 outputs a bitstream including encoding information according to the UMVE mode of the current block. The encoding information may include a UMVE enabled flag, a UMVE flag, UMVE candidate number information, correction distance candidate number information, correction direction candidate number information, UMVE candidate list construction information, correction distance range information, correction distance change information, prediction direction change permission information, main prediction direction information, and multiple correction permission information.

Functions of the encoding parameter determiner 2710, the motion vector determiner 2720, and the encoding information determiner 2730 may be performed by the encoder 110 of FIG. 1A. A function of the output unit 2740 may be performed by the bitstream generator 120 of FIG. 1A.

Figure 28:
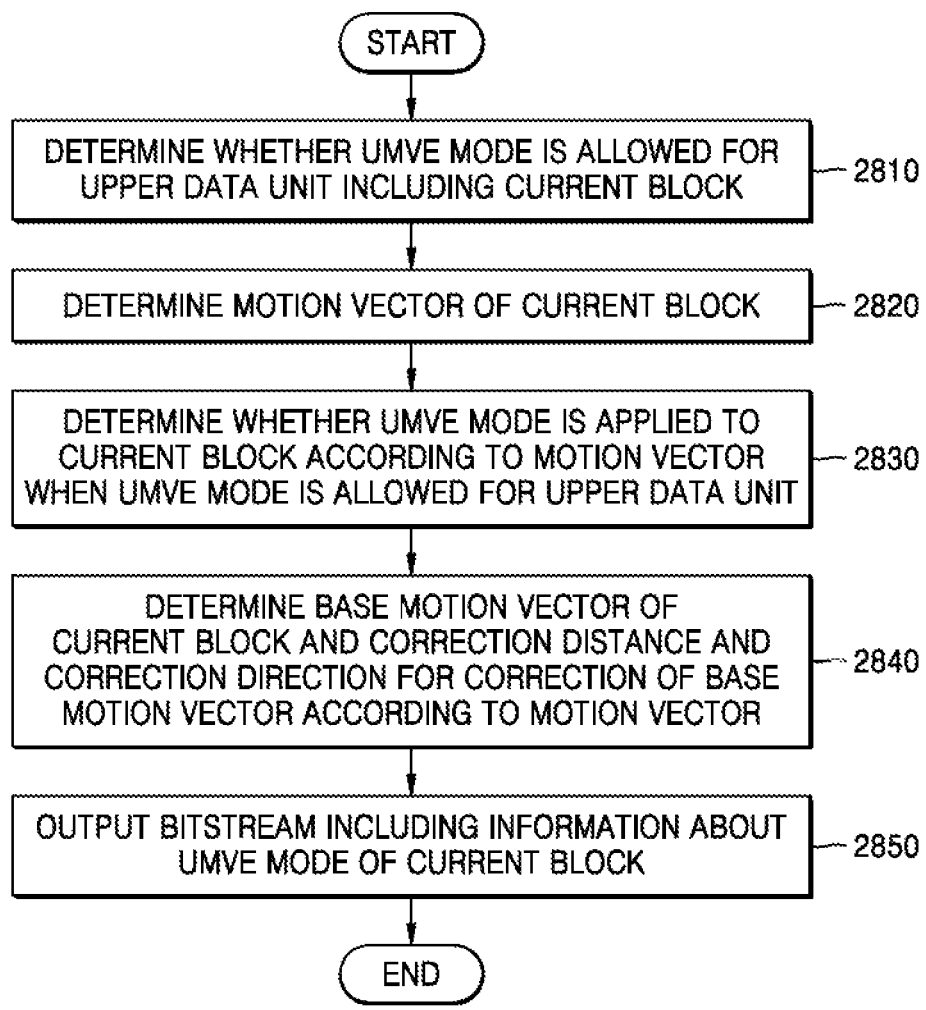
FIG. 28 illustrates a flowchart of an encoding method according to a UMVE mode.

FIG. 28 illustrates a flowchart of an encoding method according to a UMVE mode of the video encoding device 2700 of FIG. 27.

In operation 2810, it is determined whether a UMVE mode is allowed for an upper data unit including a current block. It may be determined whether the UMVE mode is allowed according to a frequency of using the UMVE mode in the upper data unit. Alternatively, it may be determined whether the UMVE mode is allowed according to characteristics of an image.

In operation 2820, a motion vector of the current block is determined. A plurality of motion vectors may be obtained from neighboring blocks around the current block. The motion vector of the current block may be determined by scanning surroundings of the plurality of motion vectors. An optimal motion vector may be determined as the motion vector of the current block according to rate-distortion optimization.

In operation 2830, when the UMVE mode is allowed for the upper data unit, it is determined whether the UMVE mode is applied to the current block according to the motion vector. It may be determined whether the motion vector of the current block may be derived by using the UMVE mode. When the motion vector of the current block may be derived by using the UMVE mode, the UMVE mode may be determined to be applied to the current block. Alternatively, when a minimum error between the motion vector of the current block and the motion vector according to the UMVE mode is equal to or less than a threshold value, the UMVE mode may be determined to be applied to the current block.

In operation 2840, a base motion vector of the current block and a correction distance and a correction direction for correction of the base motion vector are determined according to the motion vector. The correction distance and the correction direction may be determined according to a difference between the motion vector of the current block and the base motion vector of the current block.

In operation 2850, a bitstream including information about the UMVE mode of the current block is output.

An inter prediction method according to a UMVE mode performed by the video encoding device 2700 of FIG. 27 may be applied to the encoding method according to a UMVE mode of FIG. 28.

According to a video encoding method based on coding units having a tree structure described with reference to FIGS. 1 through 28, image data in a spatial domain is encoded according to the coding units having the tree structure, and according to a video decoding method based on the coding units having the tree structure, decoding is performed according to largest coding units and the image data in the spatial domain is reconstructed, and thus a video such as a picture and a picture sequence may be reconstructed. The reconstructed video may be played by a playback device, may be stored in a storage medium, and may be transmitted through a network.

Meanwhile, the embodiments of the present disclosure may be implemented as a computer-executable program, and may be implemented in a general-purpose digital computer that operates the program using a computer-readable recording medium.

It will be understood by one of ordinary skill in the art that, while optimal embodiments of the present disclosure have been described, various substitutes, modifications, and amendments, may be made to the one or more embodiments. That is, the substitutes, modifications, and amendments do not depart from the scope of the present disclosure and are encompassed in the present disclosure. Hence, the embodiments should be considered in a descriptive sense only and not for purposes of limitation.

The invention claimed is:

1. A video decoding method comprising:
obtaining, from a bitstream, correction distance range information indicating one of a plurality of correction distance candidate sets;

obtaining, from the bitstream, information about a correction distance and information about a correction direction;
determining a current correction distance by using the information about the correction distance and the correction distance range information;
determining a current correction direction by using the information about the correction direction; and
determining a motion vector of a current block by correcting a base motion vector according to the current correction distance and the current correction direction, wherein:
one correction distance set from among the plurality of correction distance candidate sets comprises a preset number of correction distance candidates,
a correction distance set is selected, from among the plurality of correction distance candidate sets, according to the correction distance range information,
the correction distance is indicated by the information about the correction distance, among the preset number of correction distance candidates included in the selected correction distance set, and
a first correction distance candidate set, among the plurality of correction distance candidate sets, includes correction distance candidates $\{1, 2\}$, and a second correction distance candidate set, among the plurality of correction distance candidate sets, does not include the correction distance candidates $\{1, 2\}$.

2. A video encoding method comprising:
generating correction distance range information indicating one of a plurality of correction distance candidate sets;
determining a motion vector of a current block;
determining a current correction distance and a current correction direction to represent the motion vector of the current block from a base motion vector;
generating information about a correction distance for indicating the current correction distance based on a correction distance set;
generating information about a correction direction for indicating the current correction direction; and
outputting a bitstream comprising the correction distance range information, the information about the correction distance, and the information about the correction direction, wherein:
one correction distance set from among the plurality of correction distance candidate sets comprises a preset number of correction distance candidates,
the correction distance set is one among the plurality of correction distance candidate sets,
the information about the correction distance indicates the correction distance among the preset number of correction distance candidates included in the correction distance set, and
a first correction distance candidate set, among the plurality of correction distance candidate sets, includes correction distance candidates $\{1, 2\}$, and a second correction distance candidate set, among the plurality of correction distance candidate sets, does not include the correction distance candidates $\{1, 2\}$.

3. A method of transmitting a bitstream generated by encoding a video, the method comprising:
generating a correction distance range information indicating one of a plurality of correction distance candidate sets;
determining a motion vector of a current block;
determining a current correction distance and a current correction direction to represent the motion vector of the current block from a base motion vector;
generating information about the correction distance for indicating the current correction distance based on a correction distance set;
generating information about the correction direction for indicating the current correction direction; and
outputting the bitstream comprising the correction distance range information, the information about the correction distance, and the information about the correction direction, wherein:
one correction distance set from among the plurality of correction distance candidate sets comprises a preset number of correction distance candidates,
the correction distance set is one among the plurality of correction distance candidate sets,
the information about the correction distance indicates the correction distance among the preset number of correction distance candidates included in the correction distance set, and
a first correction distance candidate set, among the plurality of correction distance candidate sets, includes correction distance candidates $\{1, 2\}$, and a second correction distance candidate set, among the plurality of correction distance candidate sets, does not include the correction distance candidates $\{1, 2\}$.

* * * * *